United States Patent [19]

Shaffer et al.

[11] Patent Number: 5,848,131
[45] Date of Patent: *Dec. 8, 1998

[54] AUTOMATIC INFORMATION AND ROUTING SYSTEM FOR TELEPHONIC SERVICES

[75] Inventors: James D. Shaffer, Rancho Santa Fe, Calif.; George G. Moore, Great Falls, Va.

[73] Assignee: Murex Securities, Ltd., Douglas, Isle of Man

[*] Notice: This patent issued on a continued prosecution application filed under 37 CFR 1.53(d), and is subject to the twenty year patent term provisions of 35 U.S.C. 154(a)(2).

[21] Appl. No.: 598,392

[22] Filed: Feb. 8, 1996

Related U.S. Application Data

[63] Continuation-in-part of Ser. No. 365,325, Dec. 28, 1994, Pat. No. 5,506,897, which is a continuation of Ser. No. 20,653, Feb. 22, 1993, abandoned.

[51] Int. Cl.$^6$ ...................................................... H04M 3/42
[52] U.S. Cl. ............................ 379/88; 379/67.1; 379/201; 379/211; 379/220
[58] Field of Search ...................................... 379/127, 142, 379/201, 202, 207, 210, 211, 216, 220, 221, 230, 265, 67.1, 88.2, 88.19, 93.01, 88.22; 395/2.4; 704/231

[56] References Cited

U.S. PATENT DOCUMENTS

| | | | |
|---|---|---|---|
| 3,614,328 | 10/1971 | McNaughton et al. | 370/270 |
| 4,191,860 | 3/1980 | Weber | 379/211 |
| 4,611,094 | 9/1986 | Asmuth et al. | 379/207 |
| 4,757,267 | 7/1988 | Riskin | 379/113 |
| 4,797,818 | 1/1989 | Cotter | 379/94 |
| 4,924,510 | 5/1990 | Le | 379/201 |
| 4,954,958 | 9/1990 | Savage et al. | 364/444.2 |
| 5,001,710 | 3/1991 | Gawrys et al. | 370/271 |

(List continued on next page.)

OTHER PUBLICATIONS

Applied Telematics, Inc., "InstaLink" brochure, Undated.
James L. Peterson, Abraham Silberschatz, "Operating System Concepts," Second Edition, Section 3.3.3, pp. 70–71, Undated.
"Topological Integrated Geographic Encoding and Referencing System/ Zone Improvement Plan," Oct. 1991, pp. 3–5.
Targus Information Corporation, "DART Intelligent Call Processing" brochure, Mar. 19, 1993.
Targus Information Corporation, "DART Intelligent Call Processing" brochure, Jan. 17, 1995.

*Primary Examiner*—Krista Zele
*Assistant Examiner*—Scott Wolinsky
*Attorney, Agent, or Firm*—Knobbe, Martens, Olson & Bear, LLP

[57] ABSTRACT

A system and method for automatically and seamlessly routing telephone calls across a telephone network. The system includes a telephone switch having a computer, a master file and client file stored in the computer. The master file is dynamically linked to the client file at routing time to produce a selected client telephone number which is transmitted across the telephone network. The system utilizes Automatic Number Identification to identify the calling party. The master file has a plurality of records having a telephone number and a spatial key and is updated frequently. The client file has a plurality of records having a spatial key and a client telephone number. Methods of generating client file records for both radius and polygon defined service areas through an automated computer process are included in the present invention. Another embodiment of the system utilizes a location ID in place of the client telephone number of the client file. A client location file containing client-specific information on an individual service location basis is additionally utilized. The client-specific service location information may be recited to the caller via a voice response unit and the call may optionally be routed to the service location. The client service locations may be unattended by a human and may not have a telephone associated with the location.

85 Claims, 29 Drawing Sheets

U.S. PATENT DOCUMENTS

| | | | |
|---|---|---|---|
| 5,018,191 | 5/1991 | Catron et al. | 379/100 |
| 5,023,904 | 6/1991 | Kaplan et al. | 379/91 |
| 5,029,196 | 7/1991 | Morganstein | 379/67 |
| 5,033,079 | 7/1991 | Carton et al. | 379/100 |
| 5,095,505 | 3/1992 | Finucane et al. | 379/219 |
| 5,136,636 | 8/1992 | Wegrzynowicz | 379/201 |
| 5,163,087 | 11/1992 | Kaplan | 379/94 |
| 5,390,232 | 2/1995 | Freeman et al. | 379/201 |
| 5,465,286 | 11/1995 | Clare et al. | 379/216 |
| 5,533,107 | 7/1996 | Irwin et al. | |
| 5,548,637 | 8/1996 | Heller et al. | 379/210 |
| 5,588,048 | 12/1996 | Neville | 379/220 |
| B1 4,757,267 | 5/1991 | Riskin | 379/113 |

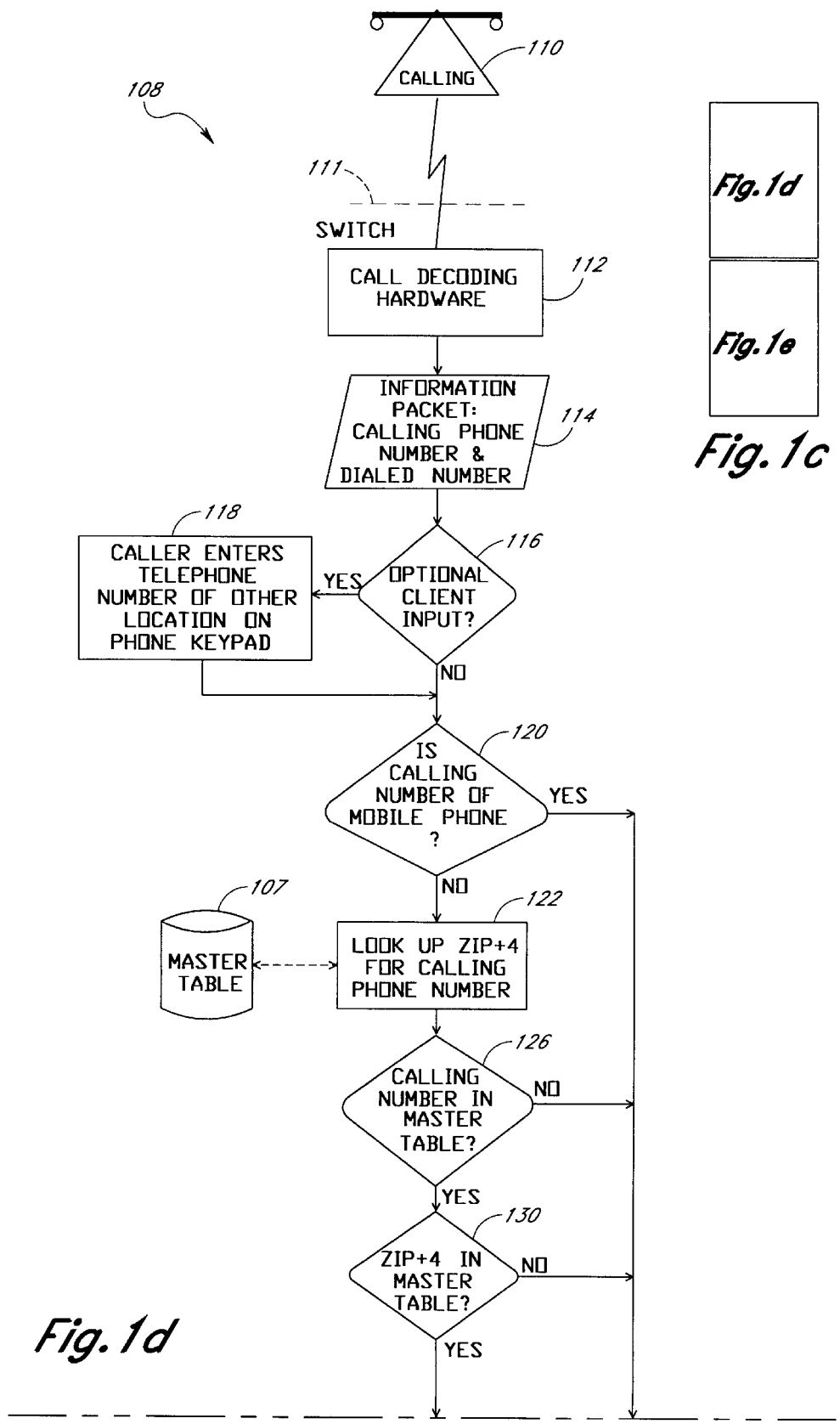

AUTOMATIC INFORMATION AND ROUTING SYSTEM FOR TELEPHONIC SERVICES

RELATED APPLICATION

This is a continuation-in-part of application Ser. No. 08/365,325, filed on Dec. 28, 1994 and issued as U.S. Pat. No. 5,506,897 on Apr. 9, 1996, which is a continuation of 08/020,653, filed Feb. 22, 1993, now abandoned.

BACKGROUND OF THE INVENTION

Field of the Invention

The present invention generally relates to telephonic services and routing technologies and, more specifically, to a system for automatically providing information about a client location and optionally routing telephone calls.

Background of the Invention

In the increasingly competitive business world, there have been various attempts to automatically route telephone calls made to an "1-800" number or equivalent for a local store, franchise, branch, dealer or service company (henceforth, service location), whose service area encompasses the caller location for the product or service associated with the "1-800" number. For example, a person would dial 1-800-Italian from any telephone in the United States, and the phone would ring at the MyPizza (a fictitious business) service location that delivers pizza to the location of the calling telephone.

There have been several previous simplistic attempts to automatically route calls to a service location that is geographically proximate to the caller. These routing technologies are based on routing the incoming call to a location with the same telephone area code and prefix as the originating call, to the same 5-digit zip code, to all zip codes that have the same city name, or a combination of the above. There are many different terms used to describe the various components of a 10-digit telephone number. In the telecommunications industry, it is called the NPA-NXX-XXXX, where the NPA is the area code, the NXX is the prefix or exchange and the XXXX is the suffix or line number. For example, in the 10-digit telephone number 619-942-9999, 619 is the NPA or area code; 942 is the NXX, prefix or exchange; and 9999 is the XXXX, suffix or line number. Usually all telephone numbers with the same area code and prefix are serviced by the same wire center. A wire center is the geographical area serviced by a single telephone company office. The wire center is usually one switch, but can be multiple switches, and usually provides service to about ten exchanges. By definition of the telephone companies, wire centers do not overlap.

A. Prior Routing System Structure

The earth is a sphere, and any point on its surface can be defined by a latitude and longitude spherical coordinate system developed several centuries ago. Using this coordinate system, spherical trigonometry, and a computer, it is possible to calculate the distance between any two locations on the earth and determine if one location lies within a specified radius of another or determine if a location is contained within an irregular service area defined as a spherical polygon.

Several years ago, AT&T instituted the technology of passing the calling telephone number along the telephone network, by use of Automatic Number Identification (ANI), to facilitate billing. The "Caller ID" feature, available on some telephone networks, utilizes the ANI technology to identify the telephone number of the calling party. Since a modern telephone switch is just a special purpose computer, it is a simple process for the switch handling the call to look up in a record table (of over one hundred million records) the calling telephone number with an assigned service location telephone number and route the call to the service telephone number.

However, there were some fairly formidable problems that needed to be solved before this routing process could be a commercially viable and practical service. The first problem was initially determining the latitude and longitude of every telephone number in the United States and keeping them updated when twenty percent of the consumer population moves every year and businesses are continually opening and closing locations. The second problem was performing the multitude of spherical trigonometric calculations which is several orders of magnitude beyond today's most powerful computers that are required to create the calling telephone number to the service location telephone number tables and to keep them updated in a constantly changing environment.

Several key databases and technologies are necessary to solve these problems. The United States Census Bureau, as part of the 1990 census, built a national latitude and longitude cartographic map of the United States called TIGER (Topological Integrated Geographical Encoding and Referencing) that contains almost every street link in the United States. A street link is a street segment intersected by other streets at each end. The TIGER record for all street links contains the latitude and longitude coordinates at each end of the street segment accurate to within plus or minus thirty feet and, for most street segments, the starting and ending address ranges for each side of the street. Where the Census Bureau did not complete the address ranges, private companies have filled in the gaps and are updating TIGER as new streets are built.

In the past, the U.S. Postal Service (the "Post Office") divided the U.S. into postal delivery areas called zip (zone improvement plan) codes to help automate the routing of mail. At the nine digit level (called "zip+4"), these zip codes usually correspond to a single side of a street link. In addition to geographically dividing the United States into small postal delivery areas, the Post Office also set standards for the naming of places and streets. For direct mailers to get discounts, they had to standardize their mailing addresses to match the Post Office's naming conventions and provide a zip+4 code. To facilitate the process of postal address standardization and zip+4 coding, the Post Office provides a national Zip+4 Address Coding Guide and has certified several commercially available software packages that correctly address standardize and zip+4 code 99 percent plus of the address records on a Post Office test file.

Recently, the Post Office and some private companies have matched the Post Office's Zip+4 Address Coding Guide with TIGER and have created files containing zip+4 codes with latitude and longitude centroids (a zip+4 centroid is the approximate geographical mid-point of a zip+4 code). This type of file is referred to as a zip+4 latitude and longitude centroid file 100 (FIG. 1a). These centroids are accurate 95 percent of the time to within plus or minus 105 feet in relation to a house or business receiving mail at a street address assigned to a given zip+4 code. Today, it is a very reliable and economical process to address standardize and zip+4 code a list identifying physical locations, such as a master list of phone numbers of the present invention.

Other changes and improvements in telecommunications technology were needed to make the automated telephone call routing process a commercially viable and practical service. Improvements in the telecommunication infrastructure in the U.S. have changed the telecommunication cost structure. Presently the cost of a telephone call from Los Angeles to New York is about the same as for a call from Los Angeles to San Diego. Therefore, the physical location of a central routing switch is no longer critical, or in other words, can be anywhere in the continental U.S.

Another improvement of telecommunications technology is the advent of Geographic Information Systems, commonly called GIS. These systems allow the aggregation and display of almost any data for any area, any size or shape, anywhere in the United States by interactive maps. The popularity of these systems has lead to the development of sophisticated techniques and algorithms to handle geographically based information. Of primary interest is the linking of the geographic information to telephone numbers, especially at the 10-digit level.

The complex process of spherical trigonometric distance calculations on billions of possible permutations has been alleviated by making the process less computer intensive. Instead of performing complex trigonometric spherical calculations, a technique that is less than one-thousandth as computer intensive is used. This technique is based on doing a polyconic projection from each service location and performing simple two dimensional distance squared tests. There are approximately 68.9404 miles per degree latitude. However, the miles per degree longitude varies with the latitude. At a given latitude, the miles per degree longitude is equal to the cosine of the latitude multiplied by 68.9404. By using the service location as the latitude point and knowing the latitude and longitude of calling points, it is easy to obtain a delta latitude and longitude, translate them into miles, and perform a simple distance calculation, i.e., "distance=SQRT(X2+Y2)". This polyconic projection technique results in a distance calculation error of approximately 12 feet for two locations that are 100 miles apart at 40 degrees latitude. However, additional reduction of the computational effort is necessary to have a practical, efficient, and commercially viable routing process.

B. Prior Routing System Operation

Previous technologies for routing "1-800" telephone number calls to a service location have one or more of the following three problems:

(1) Many such routing systems are very coarse in their level of precision and cannot handle small service areas with legally defined franchise territories like pizza delivery. A much more precise system is desired that is accurate to within 105 feet rather than previous accuracies to within 10miles. Such a system would utilize very precise distance calculations made possible by knowing the physical location on the earth, most typically expressed as a latitude and longitude, of nearly every non-mobile telephone in the United States. Other coordinate systems could be used in other countries. A business also may like the ability to route a telephone call to a specific franchise territory, which may be an irregularly shaped polygon.

(2) Another problem in routing systems is that they divide the United States into many large arbitrarily defined areas and there is no ability to route a call to the closest service location if the closest location is not located in the same artificially created area as the caller. In many instances, a caller located near the border of an exchange area or 5-digit zip code is much closer to a service location with a different zip code or telephone prefix than the one to which it is routed. A seamless system is desired that does not use artificially created areas such as telephone wire centers, telephone prefixes, or 5-digit zip codes where calls can only be routed within their area. A business may want an option of choosing to route a call to the closest branch or to any branch, for example, in a 5 mile radius of the caller.

(3) Finally, known routing systems often rely on third party telephone directories that are always outdated due to publishing, key entry, and optical character recognition (OCR) scanning time lags and which do not include unlisted numbers. Over 30 percent of the U.S. telephone numbers are unlisted, which includes public pay phones and multiple lines going into businesses and households where only one line is listed. Because consumers and businesses throughout the country change locations on a daily basis, a system is desired that correctly routes a much higher percentage of calls than the previous attempts. In the U.S., such a system would require direct access to the AT&T universe of telephone numbers. Such a system would preferably utilize daily updated and unlisted telephone numbers and involve passing information between regulated telephone databases maintained by the telephone companies and client databases maintained by third parties.

These three deficiencies result in lower customer service and satisfaction, higher costs because of manual exception handling for calls that cannot be routed due to a variety of reasons, costs of misrouting, and high on-going maintenance costs. Manual exception handling generally requires operator intervention in the "1-800" call.

Other previous systems require the consumer to enter their zip code or telephone prefix on the Touch Tone keypad in response to voice prompting from the system. Based on the caller-entered data on the keypad, the telephone call is forwarded to a destination telephone. Other similar systems will simply inform the consumer, by a voice message, of another telephone number for the local dealer, which must be manually dialed rather than forwarding the call automatically. A system is desired that does not require any additional customer interaction or input. Such a system would be totally automatic by utilizing, at a minimum, the 10-digit telephone numbers in the standard telephone packet that can only be accessed and utilized by regulated telephone companies on a national basis. The telephone packet includes the complete origin and destination telephone numbers.

The basis of an automatic telephone routing system must include a means to automatically identify the telephone number of the calling party. Such a system is disclosed by Kaplan, U.S. Pat. No. 5,163,087. This system translates an Automatic Number Identification (ANI) of the calling party into a customer database key previously defined by the called party. The database key, e.g., customer account number, is then provided to the called party instead of the ANI information such that a computer at the called business can process the key to look up and present customer information to an agent of the business. This system assumes that the caller has called this business at a previous time to provide information to the agent of the business to create a customer record or other similar information. The Kaplan system delivers the database key to one business location rather than a plurality of service locations throughout the country. The delivery of the database key to the business requires an Integrated Services Digital Network (ISDN) or similar facility, which is an additional burden for the business.

An automatic routing system should not need to deliver a database key or message to the final destination, but would merely utilize the ANI information as an index to a table containing partitions of a country into small geographic areas, such as postal service zip+4 codes. These partitions would be further utilized to access one of a plurality of service locations that may be anywhere within the country.

A current system for telephone call routing is described in U.S. Pat. No. 4,757,267 to Riskin. Riskin employs automatic number identification (ANI) for routing calls from a caller to a dealer located within the same area code and prefix (first six digits of a 10-digit telephone number, the "6-digit number") as the caller. Because the area identified by the 6-digit number is fairly large and there may be several dealers within the area, the dealer location is usually selected from a list of several locations based on random selection, or weighted percentage assigned to each location. Alternatively, the caller is presented with a list of possible dealer locations for the large geographic area because the system does not know which service locations are closer than the others. Riskin uses the 6-digit number to determine the location of both the caller and the service location. Riskin assumes the location of the caller to be the location of the central office switch that services the caller's 6-digit exchange (which can be 0 to 5 miles from its true location), and assumes the location of the dealer location to be the location of the central office switch that services the dealer location's 6-digit exchange (which can be 0 to 5 miles from its true location) utilizing a coordinate system that is accurate to plus or minus 2300 feet. What is desired is a system that uses all ten digits of the calling and service location telephone numbers and the physical street address of the location of the numbers in connection with a GIS-type database (utilizing a coordinate system and associated coordinate data that is accurate to within 30 feet) to provide geographic precision to within 105 feet for the location of the calling and destination telephones.

Consequently there is a need for an automated telephone routing system that provides the ability to reduce costs by routing a very high percentage of calls made to a single national telephone number without any human intervention; the marketing advantage for a client of a single, easy to remember, toll free or nominal fee national telephone number; geographically precise results; and the ability of businesses to define custom service areas around each servicing location of any desired size and shape. Preferably, a client may define each location's service area as an area with a radius of any size or a polygon of any size and shape. A client can intermix radius and polygon definitions as well as have service areas be overlapping or non-overlapping.

Frequently, a caller may not need to have a telephone call actually completed to the service business location, but rather, the caller needs information about the business. For example, the caller may want to determine the location of the three closest service locations, or more specifically, the caller desires to know that the business is still open, or has inventory of a desired item, and so forth.

C. Prior Voice Response Unit Utilization

Traditionally, businesses, non-profit organizations and government agencies with one to tens of thousands of service locations provided customers multiple telephone number points of contact with usually at least one telephone number for each service location, department and individual. This put a major burden on customers and prospective customers to find, remember, dial and be connected to the correct intra-entity telephone number for the location or services desired. In the new world of electronic commerce, these entities have started advertising vanity telephone numbers as their preferred single initial point of customer contact. These vanity numbers are easy to remember telephone numbers, e.g., 1-800-FLORIST, that are selected by a business. The vanity telephone numbers typically have "800", "888" or "900" as area codes or local exchange prefixes "555" or "950".

Based on the large volume of calls going to these vanity numbers, customer demands for extended support hours of seven days a week and 24 hours a day, and the goal of reduced telephone busy and on-hold times has resulted in many vanity advertisers answering vanity number calls with Voice Response Units (VRU). The proliferation of vanity numbers and the utilization of the VRU have created a need to automate, through what is now called intelligent call processing, a higher percentage of calls being answered by the VRU.

In this context, automated intelligent call processing is defined as the capture of network-provided data, such as ANI and dialed number identification service (DNIS), and caller-provided data, such as data entered by Dual Tone Multi-Frequency (DTMF) through a Touch Tone telephone key pad or the caller speaking directly, at the VRU. The intelligent VRU further can decipher, validate, process and fulfill the caller's request by playing pre-recorded messages, creating call specific test messages and speaking them to the caller, and/or routing and connecting the caller to the servicing location. In contrast, semi-automated call processing means that components of the customer request can be automated through intelligent call processing but some portions of the request still require support during the call by a live operator.

For the VRU to handle a higher percentage of caller requests, more information must be immediately accessible to the VRU. This requires the real-time access to many different databases, stored on different computer systems. Recent advances in computer networking technology, networking standards, increases in speed and bandwidth, and reduction in costs for long distance data communications have made wide-area networking a common practice. This is demonstrated in part by the variety of computer-interface applications supported by computer network services, such as CompuServe, America Online, Microsoft Network and the Internet.

In the national telecommunications network with its nearly 200 million access points, most with only basic Touch Tone or old rotary telephone input and output capability, VRU database access has been primarily limited to client proprietary customer databases indexed by telephone number. This type of access works acceptably for many applications with existing customer calls. However, for new customers, new businesses or new applications that service different target markets, these internal databases are too sparse in coverage to make VRU database lookup applications economical. On the other hand, there are national databases, such as the GDT Zip+4 Latitude and Longitude files, that do not contain a telephone number. Accordingly, these databases, and derivatives of these databases that do not contain a telephone number field, have not been utilized in VRU telephone call processing applications.

The missing link in making almost unlimited amounts of data immediately available to the VRU is creating a standardized, precise and universal database linkage key that can be assigned to all telephone numbers in the United States and U.S. territories. This key needs to act as a direct and/or translator linkage mechanism between the telephone number and spatial, geographic, and client service location databases, where the service area may be of any defined size and shape. Since the common trait shared among the above-mentioned databases is their geographic/spatial location, definition and/or relationship, what is needed is a robust solution of a universal hierarchical geographic/spatial linkage key that is termed herein, the Spatial Key. Utilizing the Spatial Key, it becomes practical to automate many VRU applications that provide the caller with information and/or connect the caller with a servicing location.

Several applications of the spatial key linkage with a VRU would be desirable: (1) Providing the caller with the address (es) of the servicing location(s). This can be used by the caller to mail, pickup and/or drop off something to the selected servicing location. (2) Providing the caller with pre-stored micro-area directions to the service location(s). This is usually used with service locations that are very small in size, such as mail courier drop boxes or automated teller machines (ATMs) located in large physical entities, e.g., shopping centers or multi-story buildings. (3) Providing the caller with the location's open hours, drop-off times or pick-up times by use of the VRU.

SUMMARY OF THE INVENTION

The above-mentioned needs are satisfied by the present invention which includes a system and method for automatically processing telephone calls by either connecting the caller to a servicing location and/or providing the caller information regarding the servicing location.

The present invention provides a method of routing all published and unpublished telephone numbers, including unlisted numbers, secondary unpublished business lines, and public pay phones without any violation of federal, state and local laws. The present invention also provides a method for legally conforming to contracted franchise territory definitions executed between franchisers and franchisees by routing customer's calls precisely to the correct legal franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handling" process routes to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides a method for dynamically and instantaneously updating and integrating Client and Master Tables with no time lags. Furthermore, the present invention provides a method for automating the processing of information that is input by a customer using a customer interface that automatically routes telephone calls to customer requested destinations.

A derivative of the two table system (Master and Client tables) is a three table system. The three table system is an enhancement to the two table system. The Master Table and the Client table are used to determine the spatial service relationship of the caller provided telephone number and the servicing locations. However, in call processing where there are multiple service locations that service a caller, there is other service location dependent data that does not have any spatial attributes, e.g., hours open, days open, product inventories, that is required for selecting the best service location for the caller. This data is most efficiently stored in a third table called a Service Location table. There is one record per service location in this table which is indexed by service location identification (ID) or by service location telephone number. This table can also contain informational data, e.g., service location, name, address, general directions to a service location, a termination telephone number, a fax number and so forth, that can be spoken to the caller by a Voice Response Unit.

In one aspect of the present invention there is, in a telephone network, an automated call processing system, comprising an automated communications subsystem capable of receiving a caller-provided telephone number; means for determining a spatial key of the caller-provided telephone number; means responsive to the spatial key for retrieving client service location information corresponding to a selected servicing location, wherein the servicing location is selected if a location associated with the caller-provided telephone number spatially lies within a service area defined by the client as a geographic configuration of substantially any desired shape and size around the service location; means for communicating the servicing location and the corresponding client service location information to the caller; means for receiving and responding to the caller's service location information request; and an outbound calling module responsive to the caller's service location information request for transmitting the selected client servicing location information to the telephone network.

In another aspect of the present invention there is, in a telephone network, a method of automatically processing a telephone call, comprising the steps of: automatically generating client tables comprising a plurality of records, each record comprising a spatial key and client information indicative of a geographic location; providing a client location table for each client table, said client location table comprising a plurality of records, each record comprising a location ID and location-specific information; storing the client tables, client location tables, and a master table comprising a plurality of records, each record comprising a telephone number and a spatial key, in the telephone network; receiving a calling telephone number and a dialed telephone number from the network; indexing the master table with the received calling telephone number to obtain a master table record; retrieving a spatial key from the master table record; selecting one of the client tables from the plurality of client tables based on the dialed telephone number; indexing the selected client table with the retrieved spatial key to obtain a selected client table record; retrieving a location ID from the selected client table record; selecting one of the client location tables from the plurality of client location tables based on the dialed telephone number; indexing the selected client location table with the retrieved location ID to obtain a selected client location table record; and retrieving selected client location information from the selected client location table record.

In yet another aspect of the present invention there is an automated call processing system in a telephone network, comprising: a switch connected to the telephone network; a voice response unit (VRU) connected to the switch; a routing computer with a memory connected to the VRU by a computer network; a master file comprising a plurality of records, each record having a telephone number and a spatial key, the master file stored on the computer network; a client file comprising a plurality of records, each record having a spatial key and a client service location identification (ID), the client file being stored on the computer network, and wherein records are assigned to the client file based upon the service location ID, with respect to a geographic area of substantially any desired shape and size; a client service locations file comprising a plurality of records, each record having a location ID and service location-specific information; means, associated with the VRU, for receiving a caller telephone number and a dialed telephone number from the telephone network; means, associated with the VRU, for selecting one of a plurality of client files and service location files, accessible by the computer network, based on the dialed telephone number; and means, associated with the VRU, for linking the master file, the client file and client service location file to produce selected client information wherein the master file is indexed by the received caller telephone number to provide a selected spatial key, wherein the client file is indexed by the selected spatial key to provide a selected location ID, and wherein the client service location file is indexed by the location ID to provide location-specific client information.

BRIEF DESCRIPTION OF THE DRAWINGS

FIG. 1*c*, comprising FIGS. 1*d* and 1*e*, is a system level diagram of a presently preferred embodiment of the central switch linking process interconnecting a calling telephone and a destination telephone of the present invention;

DETAILED DESCRIPTION OF THE PREFERRED EMBODIMENTS

The following detailed description of the preferred embodiments presents a description of certain specific embodiments to assist in understanding the claims. However, the present invention can be embodied in a multitude of different ways as defined and covered by the claims.

Reference is now made to the drawings wherein like numerals refer to like parts throughout.

For convenience, the discussion of the preferred embodiments will be organized into the following twelve principal sections:

I. System Overview;
II. Routing Example;
III. General Client Table Build Process;
IV. Client Table Build Process for a Radius Defined Service Area;
V. Client Table Build Process for the Service Location Closest to the Caller;
VI. Client Table Build Process for a Polygon Defined Service Area;
VII. Overview of Three Table System;
VIII. Computer-Telephone Integration Network Configuration;
IX. Three Table System Example;
X. Final Call Processing;
XI. Three Table System Table Build Process; and
XII. Summary.

I. System Overview

The present invention includes an automated telephone routing system which receives input from a common carrier, such as AT&T and AT&T American Transtech. This input includes an updated national list of telephone numbers, telecommunication infrastructure, and exception handling support.

A system and method for automatically and seamlessly routing a telephone call from a calling telephone to a destination telephone selected by a client will be described. Optional information about the client service location can be provided to the caller if a particular client so desires. In addition, a method of creating the tables utilized by the routing system, according to criteria established by the client, will also be described.

Figures 1A, 1B:
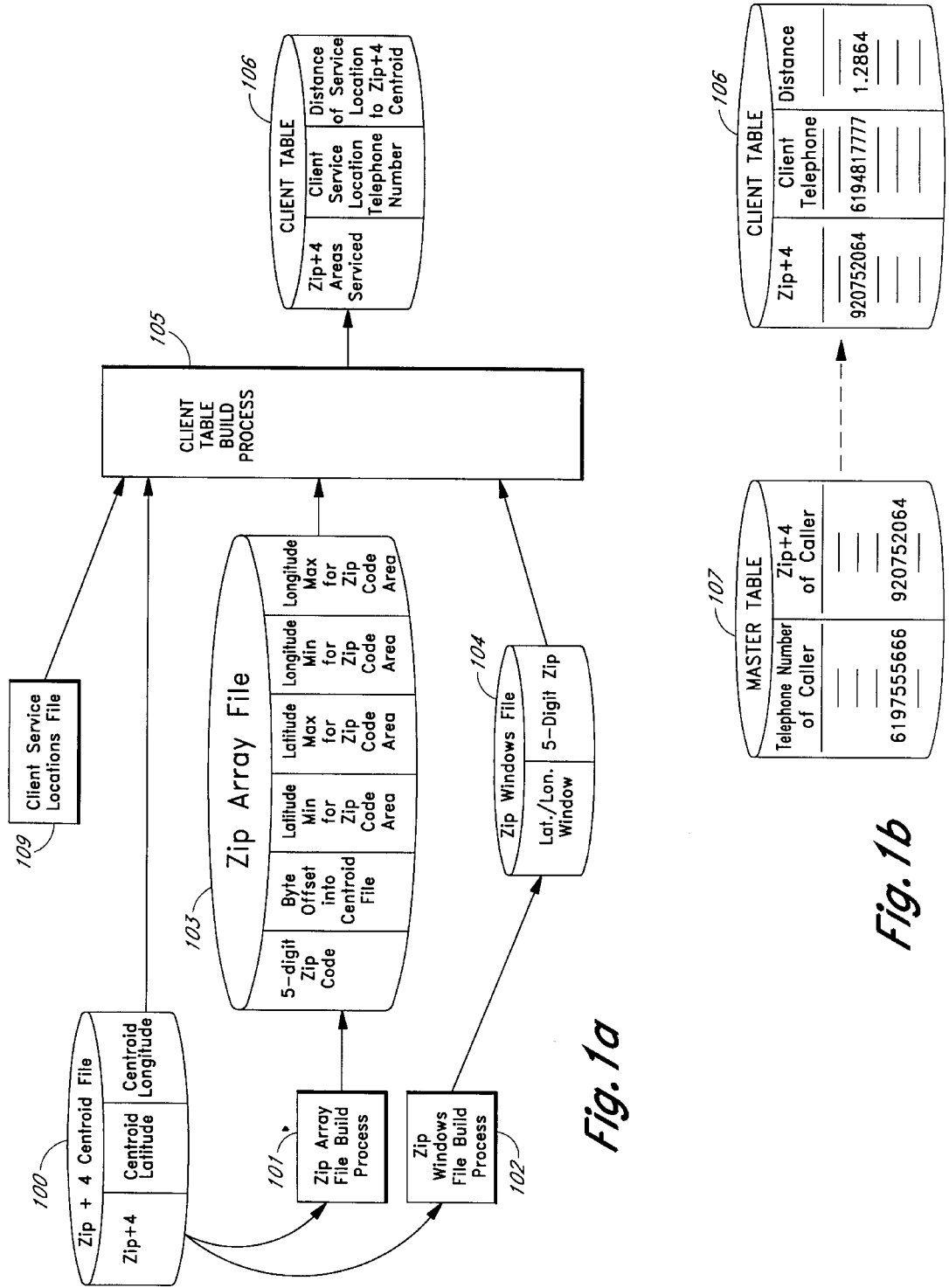
FIG. 1*a* is a block diagram of the files utilized in the presently preferred Client Table build process of the present invention.
FIG. 1*b* is a block diagram of a portion of a dynamic central switch linking process of the present invention that uses the result of the table build process of FIG. 1*a*.
Figure 1E:
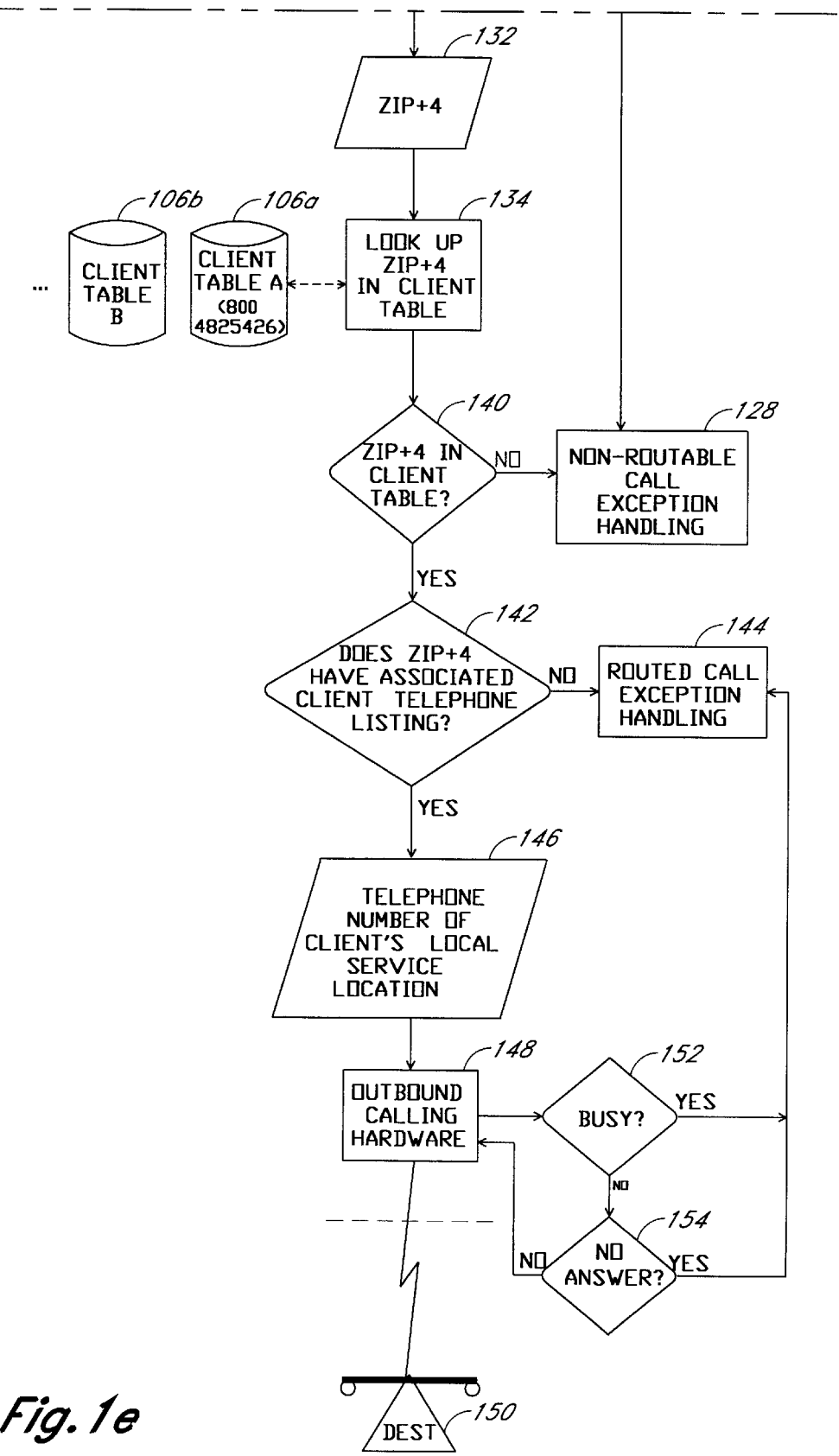

Referring to FIG. 1a, the number of calculations to be performed and permutations that must be tested is reduced in creating the calling telephone number-to-service location telephone number tables used in the "1-800" routing of the present invention. Accordingly, a zip windows file 104 (FIG. 1a) and a process 105 to spatially access and operate on this file are a part of the present invention. It will be understood that the zip windows file 104 is just one embodiment of a spatial windows file which could include different types of spatial keys. The zip windows file 104 contains a list of all zip codes that potentially touch a tenth of a degree (0.1°) latitude and longitude spatial window. By utilizing a set of latitude and longitude extremes (minimums and maximums) for a service area in process 105, a list of 5-digit zip codes that could overlap with the service area is generated. It is then only necessary to calculate distance or perform a point-in-polygon calculation between each service location and a small subset of zip+4 codes contained within each service area's returned list of 5-digit zip codes. File 104 and process 105 will be explained further and an example given hereinbelow.

Update problems and costs associated with continually updating and periodically rebuilding a hundred million plus record, telephone number-to-telephone number table for each business or client using the automated telephone routing system is solved by creating a dynamically linked, updatable system. Instead of creating a telephone number-to-telephone number table for each client, two tables linked by zip+4 codes, as shown in FIG. 1b, are created. A telephone number with its corresponding physical street address is assigned to a zip+4 code, and a Master Telephone Number to Zip+4 Table 107 (FIG. 1b) (the "Master Table") is built using the Postal Service's Zip+4 Address Coding Guide, and commercially available software, e.g., CODE-1® available from GROUP 1 Software, Inc. The preferred Master Table, presently maintained by AT&T American Transtech, is indexed or keyed by telephone number, and is updated on a daily basis. When phone numbers are added, changed or deleted, the table is updated. This table is also updated on a periodic basis to handle the approximate one hundred 5-digit zip code changes per quarter year, e.g., when a new zip code is created, telephone numbers in the new code area must be assigned a new zip+4 code. This represents a fairly small amount of change in relation to the 43,000 zip codes (5-digit) in the United States. At routing time, the present system allows all clients to use the same Master Telephone Number to Zip+4 Table 107.

Independently, and on an individual client basis, each of over 28 million zip+4 codes is assigned, based on their latitude and longitude centroid coordinates, to one or more service locations using standard distance or point in polygon calculations. Hence, the present invention builds a Client Zip+4 to Service Location Telephone Number Table 106 (the "Client Table", FIGS. 1a and 1b). A different table is built for each client or for every "1-800" telephone number that a client may have. The client table build process processes one client location record at a time. The routines required to process each record are a function of the location's service area definition: radius or polygon. Once an intermediate client file is created, the disk storage requirements can be reduced by eliminating locations that are not the closest location to the caller. The building of radius and polygon client table records as well as the post-build process of creating a "closest location" client file will be described hereinbelow.

The Client Table 106 is then preferably provided to AT&T American Transtech for centralized routing at a telephone switch. This table is indexed or keyed by zip+4 code and is updated for each client as they add and delete locations, when they change telephone numbers, and on a periodic basis to handle Post Office zip code changes.

Using the presently preferred system, both the Master Table 107 and the Client Tables 106 are independently maintained by separate organizations. Using the zip+4 code as a spatial key linkage, a calling phone number in the Master Table 107 is then dynamically linked, as shown in FIG. 1b, to a service location phone number in the Client Table 106 and the call is automatically routed. The spatial key is a single number that identifies a specific geographically defined area, line, or point that is defined by a set of coordinates. For simple geographies like points and rectangles the spatial key can be a coded version of the coordinate description of the geography.

The postal zip+4 code is the preferred spatial key used to link the master table to the client table, but there are other small geographic areas capable of having unique spatial keys, such as zip+6 code areas, census blocks, or very small latitude/longitude grids, tiles, windows, or quad-trees. This two-table indexing approach provides a much higher automated routing rate and a higher percentage of correctly routed calls in an environment where consumers are continually moving and businesses are opening, closing, and/or moving. In addition, the two-table indexing approach also acts as a "fire wall" or buffer between regulated telephone number information and client marketing information to satisfy government regulations.

The system of the present invention directly routes the telephone call from the caller to the closest service location in approximately 40 milliseconds using the AT&T telecommunications network. The system described by Riskin intercepts the call with a private switch, answers the call with a client recorded message and asks the caller to wait, while it takes approximately 15,000 milliseconds to find the closest service location and then call forwards the call to the service location.

To route a call, the system of the present invention looks up the caller's 10-digit telephone phone number in its 100,000,000 plus record Master Table, retrieves the spatial key that identifies the location of the caller's phone, looks up the spatial key in the 28,000,000 plus record Client Table, and retrieves the telephone number of the location that services the caller's spatial key or location. The system described by Riskin looks up the caller's 6-digit exchange in its 64,000 record Exchange file having only 18,000 unique coordinates, retrieves the V-H (vertical-horizontal) coordinates of the exchange, interleaves the V-H coordinates, and starts a binary-iterative, V-H key based, size search of the N record client service location database. The Riskin system iterates through this process, adjusting the size of the geographic areas searched, until it retrieves a number of service locations that fall within a predetermined range. Riskin then calculates the distance to each service location. If more than one location fits the criteria to be considered the closest distance, one location is randomly selected as the closest service location.

II. Routing Example

Figure 2:
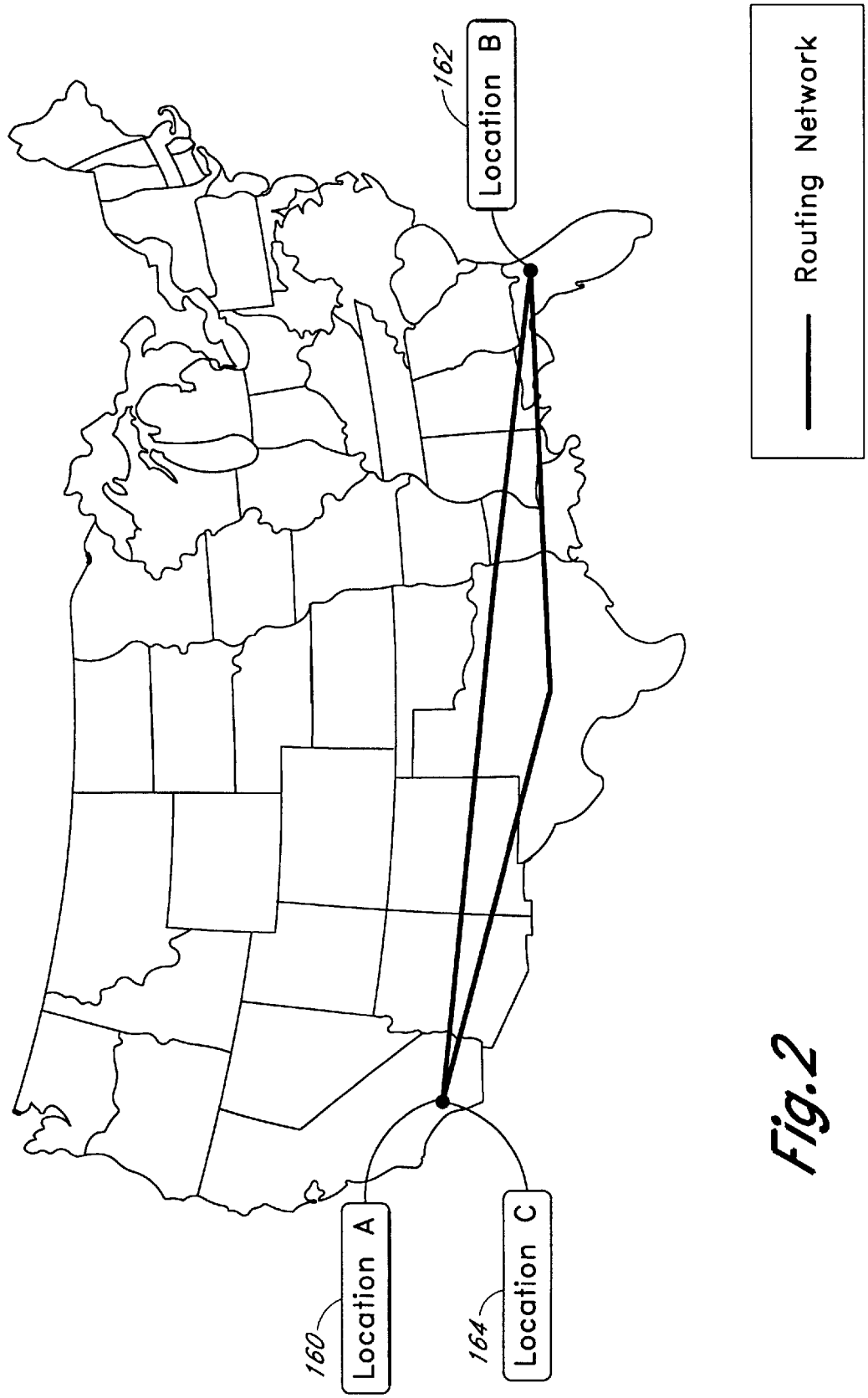
FIG. 2 is a map diagram illustrating an example of a routing network for the system of FIG. 1*c*.

Prior to discussing the building of Client Tables in more detail, it will be helpful to first discuss use of this table and the Master Table in a "1-800" routing example. Referring to a central switch process 108 shown in FIG. 1c and a routing network shown in FIG. 2, an example of telephone call routing will now be given. In this example, a caller dials 1-800-Italian to order a "MyPizza" pizza from his phone (619-755-5666) located at 498 Stevens Avenue in Solana Beach, Calif. 92075-2064. Of course, the present invention is not limited to use of "800" telephone numbers as other numbers may be used in other embodiments.

FIG. 1c includes process states and also data at 114, 132, and 146, indicated by parallelogram blocks. Also, the central switch process is handled inside a switch as will be described below.

The steps involved in having this call automatically routed to the caller's local MyPizza Restaurant are as follows:

1. A caller at "Location A" 160 (FIG. 2), dials 1-800-Italian at block 110 (FIG. 1c) to order, for example, a pizza.

2. Based on the 1-800 dialed and the caller's long distance carrier, the call is routed by various telephone companies to an intelligent central switch in Jacksonville, Fla., indicated on FIG. 2 by "Location B" 162. The process associated with the switch is shown in FIG. 1c as being below the dotted line just before state 112 and above the dotted line just after state 148. The central switch 111 is preferably a "4 ESST™" digital switch available from AT&T. The switch includes a general purpose computer (not shown) such as a network control point computer with a memory.

3. Once the Jacksonville switch has the call, it pulls the caller's telephone number from the calling information packet 114, by call decoding hardware 112 which performs Automatic Number Identification (ANI). The preferred information packet 114 corresponds to the operation parameter field of the SS7 TCAP message available at the switch 111. The hardware to perform ANI is described in U.S. Pat. No. 5,163,087 to Kaplan, and is hereby incorporated by reference. The number equivalent of 1-800-Italian is 1-800-482-5426, and the information packet looks as follows:

Packet: . . . 6197555666 . . . 18004825426 . . . The "1-800" number is an IN-WATS (inbound wide area telephone service) number and must be translated by a wide area carrier to a POTS (plain old telephone service) number to be routed to the switch 111. Upon receiving the POTS number, the switch 111 translates the number back to the WATS format.

4. Then, at decision state 116, the process 108 determines whether the client has chosen to give the caller an option to enter a telephone number on a Touch Tone telephone keypad or other means. In other embodiments, other characters are entered, such as a credit card number, an account number, or product order information, to enable other features of the system. In the presently preferred embodiment, the telephone number represents the location where the caller desires, for example, a product to be delivered or a service to be performed. As an example, if a client had a telephone number such as 800-FLORIST and desires the optional input feature, the caller could choose to have the flowers delivered to the address corresponding to a caller entered telephone number. If the decision state 116 is determined to be true, the process 108 moves to state 118 to capture the telephone number entered by the caller. This number is then used in place of the calling number in the information packet for further handling. However, if the decision state 116 is determined to be false, the original calling number is unchanged, and the process 108 moves to a decision state 120.

5. At decision state 120, the process 108 determines if the calling number in the information packet is that of a mobile telephone. A file in the computer of the switch 111 listing mobile telephone numbers is presently maintained by AT&T American Transtech and is updated on an as-needed basis. Mobile telephones are assigned a number from a set of prefixes unique to each area code in the U.S. Therefore the mobile telephone number file only needs to contain the area code and prefix combination (6 digits) to identify that the calling number is that of a mobile telephone. Because the mobile telephone user, as determined at decision state 120, is not associated with a fixed location, the process 108 moves to a state 128 for handling non-routable exceptions. An operator will then request location information from the mobile telephone caller. Additional information about state 128 will be provided below. If the caller is not using a mobile telephone, the process 108 continues from state 120 to state 122.

6. At state 122, the process 108 looks up the caller's telephone number preferably using, the well-known Indexed Sequential Access Method (ISAM) to index the Master Telephone Number to Zip+4 Table 107 (FIG. 1b). ISAM is a well known method of searching described in the book *Operating System Concepts* by Peterson and Silberschatz. Other searching techniques may be used in other embodiments. The Master Table 107 was described in the System Overview section. As an example, a segment of a Master Table 107 is shown in Table 1. This table is indexed by phone number and also contains the zip+4 code 132 of the physical address where the calling phone is physically located.

TABLE 1

Example: Master Telephone Number to Zip + 4 Table segment

| | Phone # | Zip + 4 |
|---|---|---|
| | . | . |
| | . | . |
| | 6197555664 | 920751111 |
| | 6197555665 | 920141313 |
| > | 6197555666 | 920752064 |
| | 6197555668 | 920071234 |
| | . | . |

7. A test is performed at a decision state 126 to determine if the calling number is listed in the Master Table 107. If not, the process 108 moves to state 128 wherein operator assistance is provided to route the call. The non-routable exception handling at state 128 is for situations wherein a Master Table 107 or Client Table (FIG. 1a) entry is missing, incorrect, or the caller is using a mobile telephone. In the presently preferred embodiment, operator assistance is provided by AT&T American Transtech. In general, only a small percentage of the calling numbers are not listed in the Master Table 107. If the calling number is listed in the Master Table 107, the process 108 advances to a decision state 130 to determine if there is a zip+4 code 132 corresponding to the calling number in the packet 114. If not, the process 108 moves to state 128 wherein operator assistance is provided to route the call as mentioned previously. If a zip+4 code 132 is located in the Master Table 107, the process 108 moves on to state 134.

8. Since the information packet 114 also contains the number dialed, at state 134 the process 108 opens the Client Zip+4 to Service Location Table A 106a that is associated with the client having the telephone number 800-482-5426. The Client Table 106 is selected from a plurality of Client Tables based on the telephone number dialed by the caller. Client Table B 106b and additional tables, as necessary, are for other clients or other phone numbers, e.g., another "800" number, of the same client. The Client Tables are built by the assignee of the present invention, the client, or a third party to the assignee's specifications. There are two types of Client Tables. If calls are to be routed to the closest location or to a service location servicing a non-overlapping polygon trade area, the first type of Client Table contains only a single entry per zip+4 code with its corresponding service phone number 146 and distance. In cases where the client wants a random or weighted selection, from multiple selections, whose service areas service the caller or provide the caller a choice, the second type of Client Table can have multiple records per zip+4 code, with each record having a different service telephone number and distance. The process 108 looks up the caller's zip+4 code in the MyPizza Client Table 106a using the Indexed Sequential Access Method.

9. A test is performed at a decision state 140 to determine if the zip+4 code 132 is listed in the Client Table 106a. If not, the process 108 moves to state 128 wherein operator assistance is provided to route the call. If the zip+4 code is in the Client Table 106a, the process 108 proceeds to a decision state 142 to determine whether there is a client telephone listing for the zip+4 code 132. If not, the process 108 moves to state 144 wherein operator assistance is provided to route the call, provide information, or take other action as determined by the client. A negative test result determined at state 142, may arise, for example, if there is no service location within a client specified radius of the calling party. The exception handling at state 144 is for situations where the call is correctly routed, but the calling party does not get what is expected, i.e., the call is not satisfactorily completed (as in states 142, 152, and 154). In these situations, the client may select from a set of alternatives that can be handled by an automated process. An example exception handling message is as follows: "We are sorry, but there is currently no service location within your area. If you desire to talk to a representative, please press zero."

If there is a client telephone number associated with the zip+4 code 132, the process 108 advances to state 148. As an example, a segment of Client Table 106a is shown in Table 2.

TABLE 2

Example: 800-482-5426 Client Table segment

| | ZIP + 4 | Phone # | Distance in miles |
|---|---|---|---|
| | . | . | . |
| | . | . | . |
| | . | . | . |
| | 920752060 | 6199423366 | 3.1456 |
| | 920752062 | 6199423366 | 2.1682 |
| > | 920752064 | 6194817777 | 1.2864 |
| | 920752065 | 6197591111 | 0.1234 |
| | . | . | . |
| | . | . | . |

10. After finding the caller's zip+4 code 132 and the corresponding service telephone number 146, the switch, at state 148, sends the information packet over the telephone network to ring at the telephone associated with the number 619-481-7777.

11. At block 150, the telephone at MyPizza located at 2688 Via De La Valle in Del Mar, Calif. 92014-1909, "Location C" 164 (FIG. 2), rings.

12. If the telephone at the client service location is "busy" 152 or there is "no answer" 154, the process 108 proceeds to the exception handling state 144 as described previously. At the client's request, the exception handling at state 144 may, for instance, route the call to the next closest service location. Otherwise, if the "busy" or "no answer" conditions are false, the telephone call is answered and the caller may, for example, order a pizza.

III. General Client Table Build Process

The process 105 (FIG. 1a) of creating or building a Client Table 106 for each client or each "800", or similar number, for the client will now be described. This process is preferably performed on a general purpose computer, such as an AT&T 3600 UNIX box. As previously mentioned, the present invention includes two types of service area definitions: radius and polygon. How these two definitions are incorporated into the client table build process will be discussed below. In addition, the post-build process of eliminating more distant records from the client table to create a client table containing only the closest service location to a caller will also be discussed. This is used to reduce disk storage in applications where there is no means for providing the caller a choice and only one service location telephone number can be passed to the telecommunications network. An example of the process steps will be given using a fictitious food service business.

The process for each type of service area definition utilizes four input files as shown in FIG. 1a. The zip+4 centroid file and zip windows file were briefly discussed in the System Overview section. Each input file is now further described. The following discussion again refers to FIG. 1a.

A. Client Service Locations File

The first file is a client service locations file 109 containing a list of service locations provided by the client. The service locations and their service areas are defined by either a latitude/longitude location and a radius or a latitude/longitude location and a latitude/longitude polygon. Further detail about file 109 is provided in conjunction with state 174 of FIG. 3 (radius) and state 604 of FIG. 12a (polygon).

B. Zip+4_Lat_Lon Centroid File

The second file is the zip+4 latitude and longitude centroid file 100 or zip+4_lat_lon centroid file previously described. This file is available from the U.S. Postal Service or from, for example, Geographic Data Technology, Inc. (GDT).

C. Zip Array File

The third file is a zip array file 103 created from the zip+4 latitude and longitude centroid file 100 and provides three benefits that improve processing efficiency.

The first benefit is building an array where the row number of the array is equal to a 5-digit zip code. This provides a very efficient method of indexing to a 5-digit zip code where the 5-digit zip code number is the row number of the array.

The second benefit is once the 5-digit zip code is accessed in the array, the exact byte offset of where the first zip+4 code for this 5-digit zip code starts in the zip+4 latitude and longitude centroid file 100 is known. Using this method, it is very efficient to advance to the location of the first zip+4 record and read all the zip+4 records for a 5-digit zip code in the over 28 million record zip+4 latitude and longitude centroid file 100.

The third benefit of the zip array file 103 is that for each five digit zip code, the file contains the latitude and longitude minimums and maximums for all the zip+4 codes in the 5-digit zip code. By checking to see if a radius or a polygon service area set of extremes overlap with the 5-digit zip code extremes, testing each zip+4 in a 5-digit zip code is eliminated, if it is determined beforehand that there is no spatial overlap between the zip+4 extremes in a 5-digit zip code and the radius or polygon service area.

The zip array file 103 is created using the GDT or Post Office supplied zip+4 latitude and longitude zip+4 centroid file 100. Each record in the centroid file 100 contains a zip+4 number, and the latitude and longitude defined centroid for each zip+4. A four step, zip array file build process 101, as follows, is used to create the zip array file 103:

1.) A 32-bit integer array of 99,999 rows and 6 columns is initialized to zero. Column one is initialized to the row number which is then utilized as the 5-digit zip code.

2.) For a 5-digit zip code, every zip+4 record in the zip+4 latitude and longitude centroid file 100 is read in a sequential manner. The byte offset for the first zip+4 within the 5-digit zip code is noted. Temporary variables are initialized and then used to determine the latitude and longitude minimums and maximums of the zip+4 centroids for the current 5-digit zip code. The greatest and least of both the latitudes and longitudes among all zip+4 codes for the current 5-digit zip code are then passed on to the next step.

3.) With each change in 5-digit zip code, the byte offset for the first zip+4 within a 5-digit zip code and the latitude and longitude minimums and maximums for all zip+4 codes within a five digit zip code are written to memory for the previous 5-digit zip code to its location in the zip array file 103. The latitude and longitude minimum and maximum values are then reinitialized, and the previous and current steps are repeated with the next 5-digit zip code until the end of the zip+4 centroid file 100 is reached.

4.) Upon reaching the end of the zip+4 centroid file 100, the last 5-digit zip code record is written to memory, and then the zip array file stored in memory is written to a mass storage device such as a magnetic disk.

The column definitions for each row of the zip array file 103 are as follows:

column (1) is the 5-digit zip code number;

column (2) is the byte_offset into the zip+4_lat_lon centroid file 100 of the location of the lowest numbered zip+4 for the 5-digit zip code of that row;

column (3) is a minimum latitude for the zip code of that row (zip_lat_min);

column (4) is a maximum latitude (zip_lat_max);

column (5) is a minimum longitude (zip_lon_min); and column (6) is a maximum longitude (zip_lon_max).

D. Zip Windows File

The fourth file is the zip_windows file 104. The purpose of this file is to build a linkage between a latitude and longitude defined area on the earth and the zip codes that could theoretically touch this area. This linkage provides benefit by making spatial computer searches of postal geography much faster and much more efficient.

The zip_windows file 104 is created from the GDT or Post Office zip+4 latitude and longitude centroid file 100 using latitude and longitude, digitized polygon zip code boundaries. The general concept is to divide the earth into one tenth of one degree (0.10) latitude and longitude rectangles, which, for example, are approximately 6.9 miles by 5.2 miles in dimension at 40° latitude, and then tabulate all zip codes that overlap each rectangle.

The zip_windows file 104 is created by a zip windows file build process 102 that reads each record from the over 28 million record zip+4 centroid file 100 and writes a corresponding record that contains a latitude and longitude (lat/lon) window and a 5-digit zip code. The lat/lon window field is created by multiplying the latitude in degrees times 10, taking the integer portion (INT) of the product, multiplying the integer portion by 10,000, and then adding the integer portion of the product of the longitude in degrees times 10.

For example, if the input zip+4 record is 920141909, the latitude is 32.9862 North and the longitude is 117.2522 West, the output zip_window record would be 3291172 for the lat/lon window and a zip code of 92014. After all records have been written to an initial or temporary zip_windows file (not shown), the file is then sorted by the lat/lon window value or key with the corresponding 5-digit zip code, and duplicate records are eliminated. The resultant final zip_windows file 104 is then written with each record composed of the lat/lon window key and the corresponding 5-digit zip code. Four lat/lon windows 210, 212, 214, 216, corresponding respectively to zip window keys 3301172, 3301171, 3291172, 3291171, are illustrated in FIG. 4.

Now that the input files utilized by the Client Table build process have been described, each of the three different service area definition build processes will be described.

IV. Client Table Build Process for a Radius Defined Service Area

Figure 3:
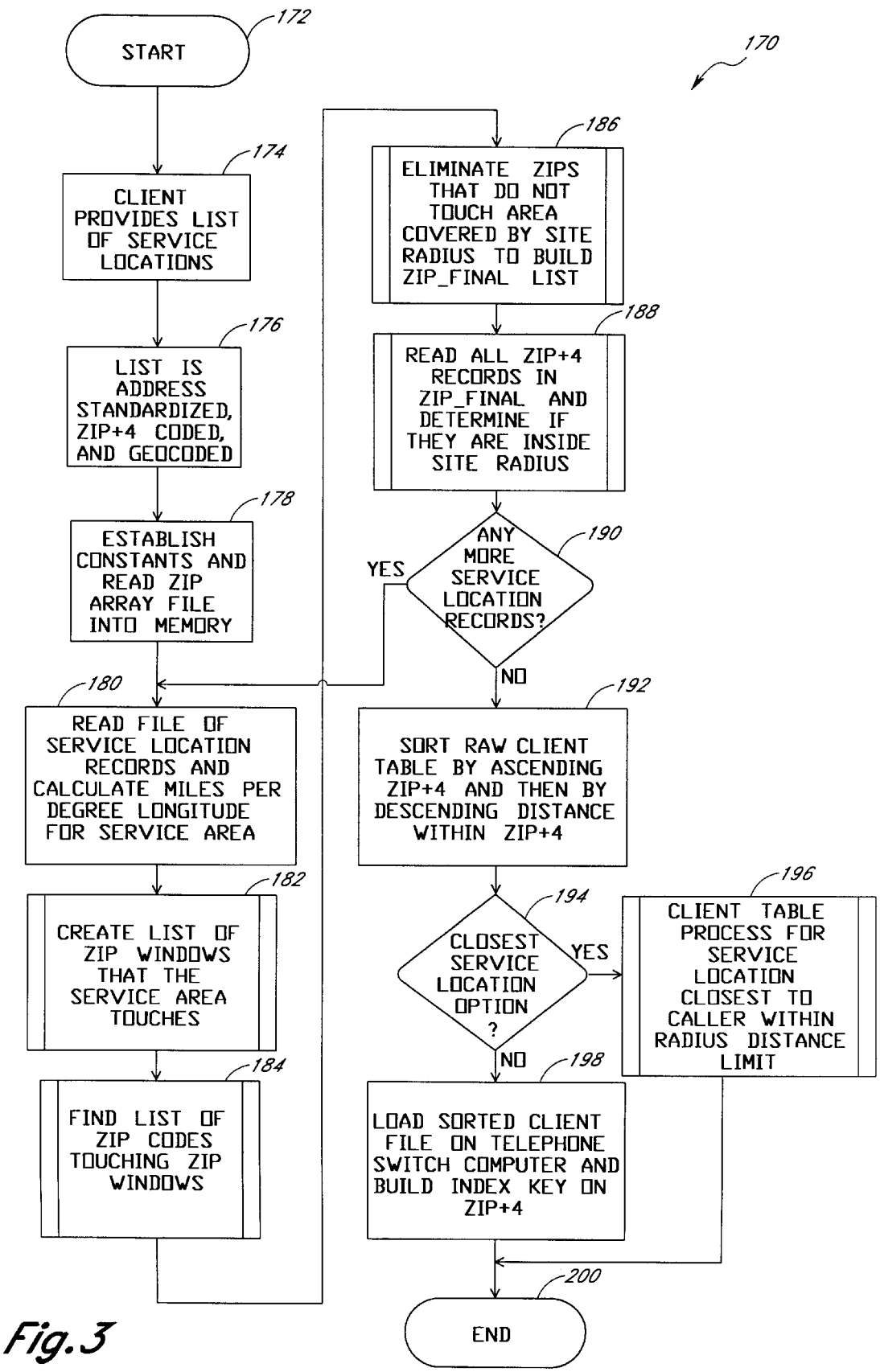
FIG. 3 is a top-level flow diagram of a process to build a client table using radius defined service areas for the system of FIG. 1*c*.
Figure 4:
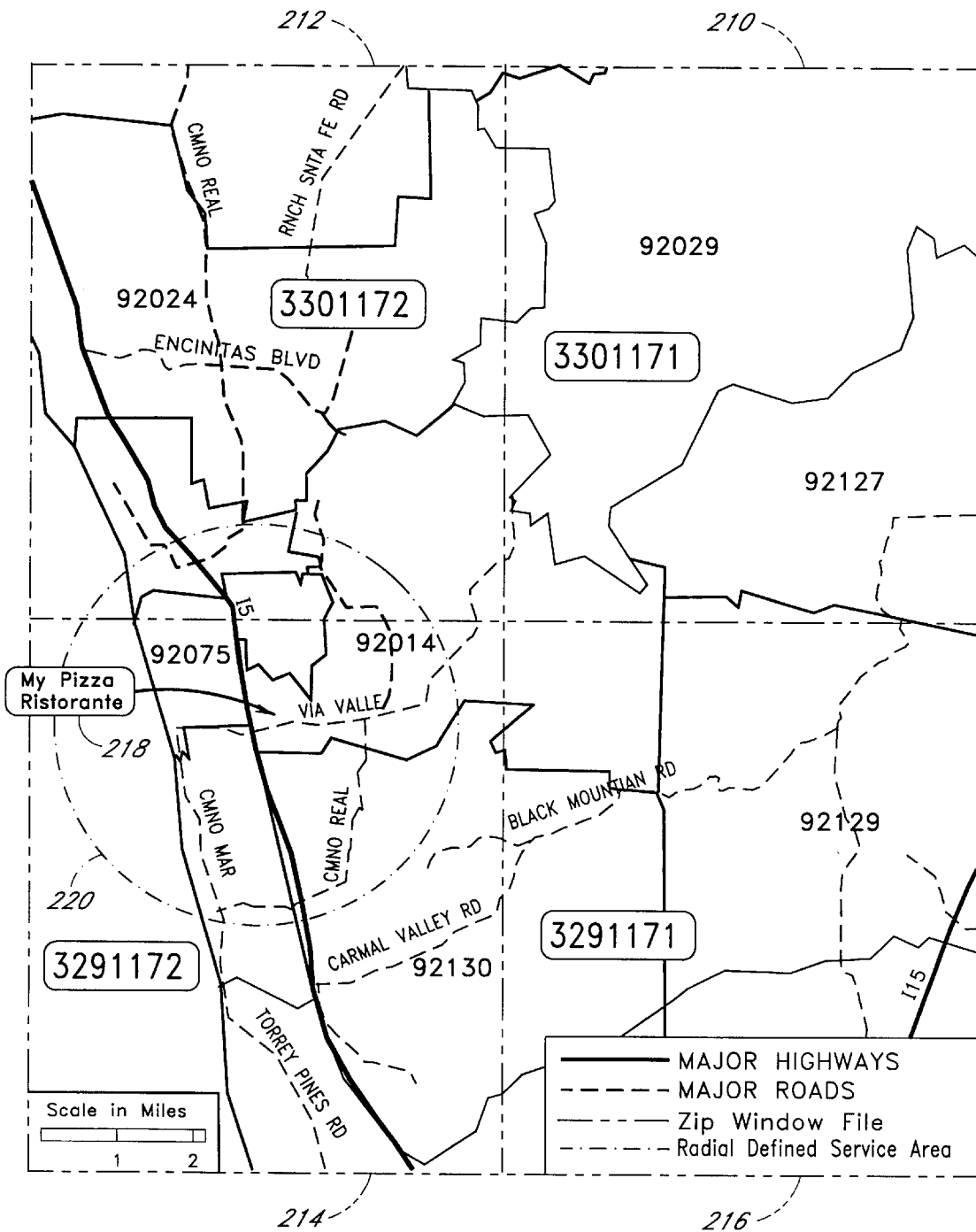
FIG. 4 is a map diagram illustrating an example area utilized in the description of the process shown in FIG. 3.

Referring generally to FIGS. 3 and 4, a Client Table Process 170 for a radius defined service area will be described. Process 170 is a specific version of the client table build process 105 shown in FIG. 1a.

The process 170 begins at a start state 172 and moves to state 174 wherein a client provides a client service locations file 109 (FIG. 1a) of service locations in machine readable form with information and format as shown in Table 3. The file 109 can be created by, for example, a commonly available word processing program or a database program, and submitted on a floppy disk or other suitable media. Table 3 includes example information for a service location 218 named MyPizza Ristorante. The map of FIG. 4 illustrates some of the same information including a circle 220 to show a 2.5 mile radius from the MyPizza Ristorante as the service area.

TABLE 3

Record layout in ASCII Characters

| | |
|---|---|
| Name of Service Location (30) Bytes | MyPizza Ristorante |
| Address (36) Bytes | 2688 Via De La Valle |
| City (30) Bytes | Del Mar |
| State (2) Bytes | CA |
| Zip Code (9) Bytes | 92014 |
| Telephone # (10) Bytes | 6194817777 |
| Radius in tenths of miles (4) Bytes | 25 |

Of course, other forms, information, and formats may be substituted in other embodiments.

The process 170 moves to state 176 wherein the list of service locations in file 109 is address standardized, zip+4 coded, and latitude and longitude geocoded using commercially available services through companies such as Group I and Geographic Data Technology. Table 4 is an example of a standardized record with latitude and longitude appended.

TABLE 4

| | |
|---|---|
| Name of Service Location (30) Bytes | MYPIZZA RISTORANTE |
| Address (36) Bytes | 2688 VIA DE LA VALLE |
| City (30) Bytes | DEL MAR |
| State (2) Bytes | CA |
| Zip Code (9) Bytes | 920141909 |

TABLE 4-continued

| Telephone # (10) Bytes | 6194817777 |
| Radius in tenths of miles (4) Bytes | 25 |
| Latitude in degrees (10) Bytes | 32.9862 |
| Longitude in degrees (12) Bytes | -117.2522 |

Moving to state 178, the process 170 establishes the constant of 68.9404 miles per degree latitude and reads the zip array file 103 (FIG. 1a) into memory of the computer. At state 180, the process 170 reads a record from the file of service location records and calculates the number of miles per degree longitude for the service location. The miles per degree longitude=68.9404*COSINE (latitude). For the example given in Table 4, at 32.9862 degrees latitude, the result is 57.8297 miles per degree longitude.

The process 170 proceeds to a function 182 which creates a list of zip windows that the service location touches. Touching a zip window means that at least part of the service area is in or overlaps the zip window. The zip windows 210, 212, 214, 216 for the example given in Table 4 are illustrated in FIG. 4. The function 182 will be further described in conjunction with FIG. 5 hereinbelow.

Moving to a function 184, the process 170 generates a list of 5-digit zip codes that touch any of the zip windows identified by function 182. This zip list is sorted in ascending order and duplicate zip codes are removed in the function 184. The function 184 will be further described in conjunction with FIG. 7 hereinbelow.

The process 170 proceeds to a function 186 wherein 5-digit zip codes that are not within the service location site radius specified in state 174 are removed from the zip list generated by function 184, and a zip final list is created. The function 186 will be further described in conjunction with FIG. 9 hereinbelow.

Advancing to function 188, the process 170 retrieves all the zip+4 records corresponding to the zip codes in the zip final list (generated by function 186), used in conjunction with a zip pointer list (also generated by function 186), and determines if the zip+4 is at or inside the service area radius. This determination also yields the distance from the service location to the zip+4 centroid (recalling that the zip+4 centroids are stored in the zip+4 centroid file 100). If the zip+4 is determined to be at or inside the service area radius, a raw Client Table record is written that includes the zip+4 code, the client telephone number for the instant service location, and the distance of the zip+4 centroid to the service location. The function 188 will be further described in conjunction with FIG. 10 hereinbelow.

The process 170 moves to a decision state 190 to determine if additional client service records are to be processed. If so, the loop of states 180 to 188 is repeated for the next service location record. If all service location records have been processed for the instant Client Table, the process 170 advances to state 192. At state 192, the process 170 sorts the raw records, written by function 188, by ascending zip+4 code and then by descending distance if the same zip+4 code is listed more than once. The same zip+4 code could be listed more than once if there are multiple service locations, each with a different client telephone number, within the client specified service area.

Moving to a decision state 194, a determination is made if the client has selected the post-build option of generating the client table for the service locations closest to the caller. If not, the client table build process is complete except for loading the file to the production system computer at state 198. However, if the client has selected the post-build option of "closest service location", as determined at decision state 194, the process 170 moves to a function 196 to finish the Client Table build process. The function 196 will be further described in conjunction with FIG. 11 hereinbelow.

If the client has not selected the "closest location" option at decision state 194, the process 170 moves to a state 198 wherein the sorted Client Table from state 192 is loaded into the computer in the telephone network switch 111 (FIG. 1c), and an index key on the zip+4 codes is built. Upon completion of either function 196 or state 198, the Client Table build process ends at state 200.

Figure 5:
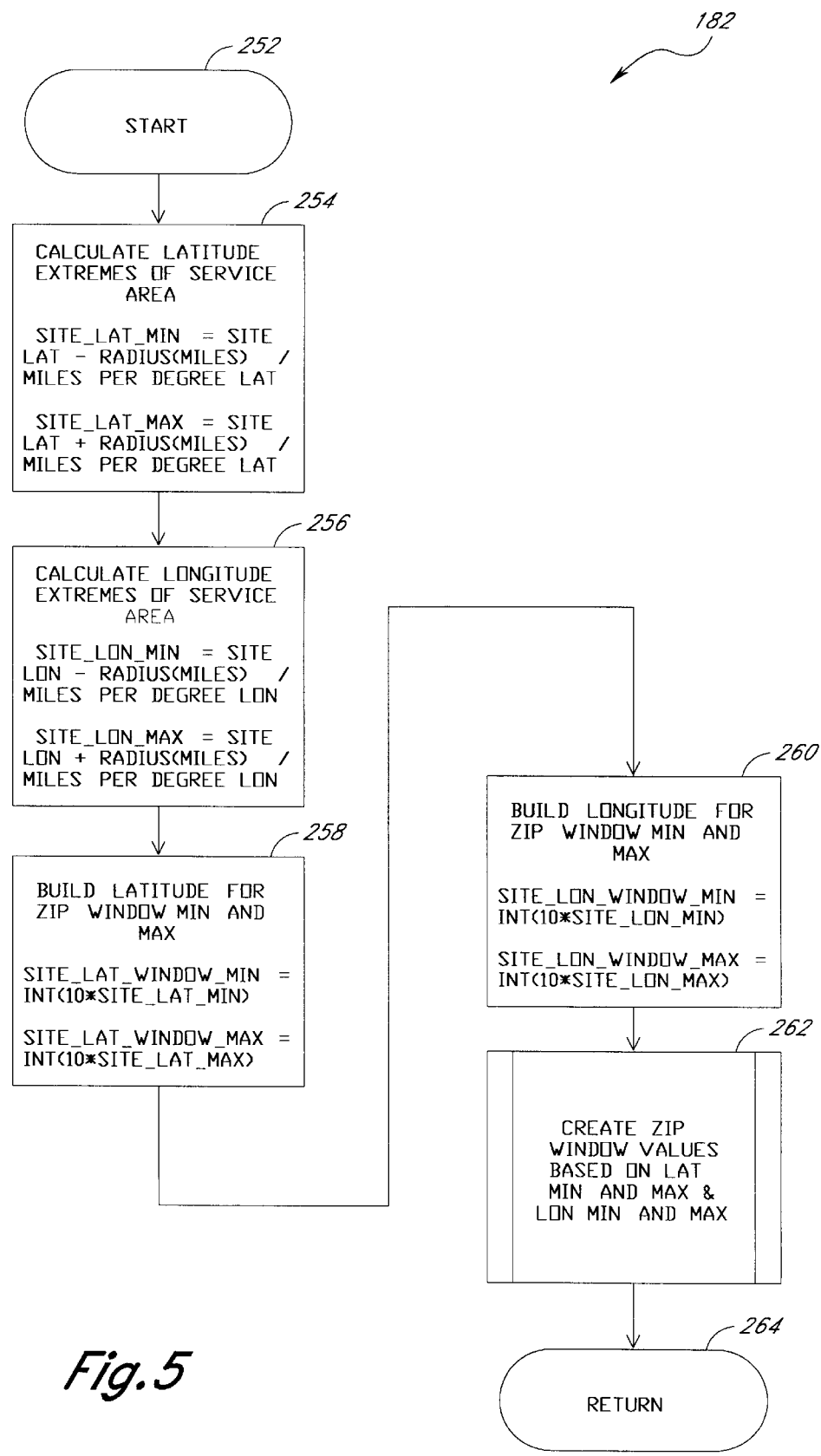
FIG. 5 is a flow diagram of the zip window list function indicated at 182 in FIG. 3.

Referring generally to FIG. 5, the function 182 defined in FIG. 3 will be described. Function 182 generates a list of zip windows that the site touches by first calculating site latitude and longitude extremes. For this calculation, the absolute value is used for both the latitude and longitude.

In another embodiment of the present invention, a prefix is assigned to the window key based on the sign of the latitude or longitude. The United States is located in the Northwest quadrant, and the key for this quadrant is zero(0). A leading zero has no impact on the value of the numeric key. The other quadrants are Northeast, east of the prime meridian at Greenwich, England in the Northern hemisphere; Southwest, west of the prime meridian in the Southern hemisphere; and Southeast, east of the prime meridian in the Southern hemisphere.

Since almost all countries of the world are only in one quadrant, using the absolute value of the latitude and longitude works well. In the few countries that are exceptions (that are in two quadrants), a different coordinate system may be used, e.g., the Ordinance Survey system used in the United Kingdom.

Beginning at a start state 252 shown in FIG. 5, the process 170 moves to a state 254 to calculate latitude extremes of the service area. Several abbreviations will be used hereinforward: "min" for minimum, "max" for maximum, "lat" for latitude, and "lon" for longitude.

Site_lat_min=site_lat−radius(miles)/miles per degree lat;

Site_lat_max=site_lat+radius(miles)/miles per degree lat.

Computation for the example service location and radius given in Table 4 yields:

Site_lat_min=32.9862−2.5/68.9404=32.9499;

Site_lat_max=32.9862+2.5/68.9404=33.0228.

The process continues at state 256 wherein longitude extremes of the service area are calculated:

Site_lon_min=site_lon−radius (miles)/miles per degree lon;

Site_lon_max=site_lon+radius (miles)/miles per degree lon.

Computation for the example service location and radius given in Table 4 yields:

Site_lon_min=117.2522−2.5/57.8297=117.2089;

Site_lon_max=117.2522+2.5/57.8297=117.2954.

Moving to states 258 and 260, the process 170 builds values for zip window minimum and maximum based on the site latitude and longitude, respectively. Computation using the above example and results yields:

Site_lat_window_min=Int(10*site_lat_min)=329;

Site_lat_window_max=Int(10*site_lat_max)=330;

Site_lon_window_min=Int(10*site_lon_min)=1172;

Site_lon_window_min=Int(10*site_lon_max)=1172.

Moving to a function 262, the process 170 generates zip windows based on latitude min and max values, and longitude min and max values and stores them in a zip_windows_list, which is distinct from the zip_windows file 104 (FIG. 1a). Function 262 will be further described below in conjunction with FIG. 6. The function 182 returns at state 264 to FIG. 3.

Figure 6:
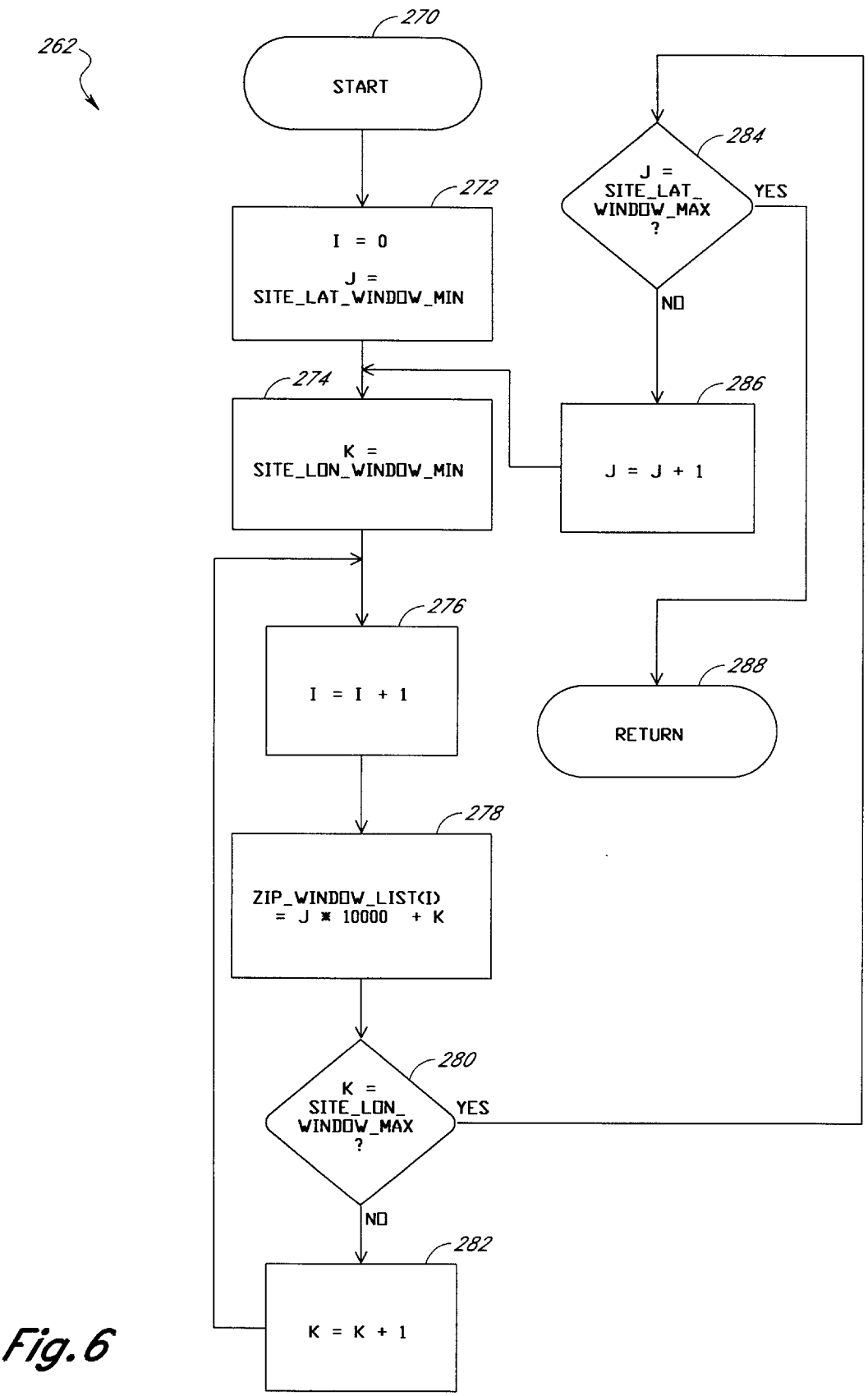
FIG. 6 is a flow diagram of the zip windows function indicated at 262 in FIG. 5.

Referring to FIG. 6, the function 262 defined in FIG. 5 will be described. Function 262 builds the actual zip_window list_for the service location. The function begins at a start state 270 and moves to state 272 wherein the variable I is set to equal zero (0), and the variable J is set to equal the value for the site latitude window minimum. After the initialization of state 272, the process 170 moves to state 274 wherein the variable K is set equal to the value for the site longitude window minimum. Moving to state 276, the value of variable I is incremented by one.

At state 278, a value of the zip_window_list, identified or addressed by the value of variable I, is calculated as the value of the variable J multiplied by 10000 and then adding the value of variable K. State 280 determines whether the value of K has reached the maximum value, and if not, the value of K is incremented by one (1) at state 282, and a loop to state 276 is performed. If K has reached the maximum site longitude value, the process 170 continues at state 284 to determine whether the value of J has reached the maximum value, and if not, the value of J is incremented by one (1) at state 286, and a loop to state 274 is performed. If J has reached the maximum site latitude value, the function 262 returns at state 288 to FIG. 5.

Continuing the example given in conjunction with FIG. 5, the result of function 262 is as follows:

Zip_window_list(1)=3291172

Zip_window_list(2)=3301172

Figure 7:
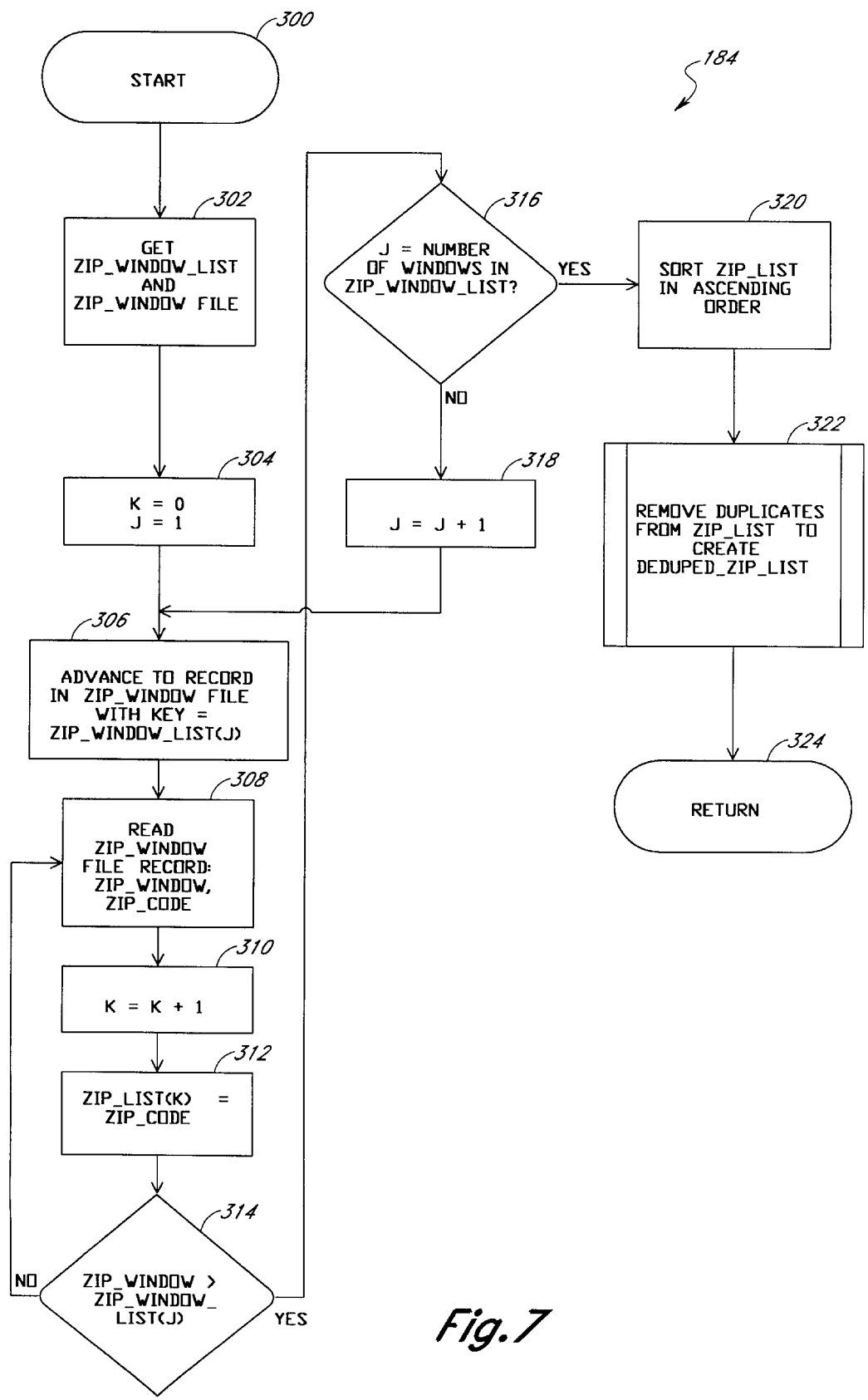
FIG. 7 is a flow diagram of the initial zip list function indicated at 184 in FIG. 3.

Referring to FIG. 7, the function 184 defined in FIG. 3 will be described. Function 184 generates a list of 5-digit zip codes touching the zip windows identified by function 182 (FIG. 5). Beginning at a start state 300, the process 170 moves to a state 302 and retrieves the zip_windows file 104 (FIG. 1a) previously described and the zip_window_list from function 182. The zip_windows file 104 is indexed by the zip_window key and contains a list of all zip codes that touch the zip window. A sample of the zip_windows file 104 is given in Table 5, which corresponds with FIG. 4.

TABLE 5

| Window | Zip_code |
|---|---|
| . | . |
| . | . |
| 3291172 | 92014 |
| 3291172 | 92075 |
| 3291172 | 92130 |
| . | . |
| 3301172 | 92007 |
| 3301172 | 92014 |
| 3301172 | 92024 |
| 3301172 | 92029 |
| 3301172 | 92075 |
| . | . |
| . | . |

Continuing at state 304, the process 170 initializes the variable K to the value of zero (0) and the variable J to the value of one (1). Then at state 306, the process 170 advances to the record in the zip_windows file 104 having the key equivalent to the value of the zip_window_list addressed by the variable J. At state 308, the record accessed at state 306 is read to get the zip_window and the associated zip code. Moving to state 310, the variable K is incremented by one (1), followed by state 312 wherein zip code read at state 308 is written to a zip_list addressed by the variable K. A check is then made at a decision state 314 to determine if the value of the zip_window from state 308 is greater than the value of the zip_window_list addressed by the variable J. If not, the next record in the zip_windows file 104 is read by looping back to state 308.

If the decision state 314 test is true, the process moves to a decision state 316 to determine if the value of J is equivalent to the number of windows in the zip_window_list. If not, the value of J is incremented by one (1) and a loop back to state 306 is performed to process the next window. If the decision state 316 is true, all windows in the zip_window_list have been processed, and the function 184 continues at state 320 wherein the zip_list of 5-digit zip codes is sorted in ascending order. For the continuing example, after state 320, the zip_list appears as follows:

92007

92014

92014

92024

92029

92075

92075

92130

Moving to a function 322, the process 170 removes duplicate entries in the zip_list to generate a deduped_zip_list. Function 322 will be further described in conjunction with FIG. 8 below. The function 184 returns at state 324 to FIG. 3.

Figure 8:
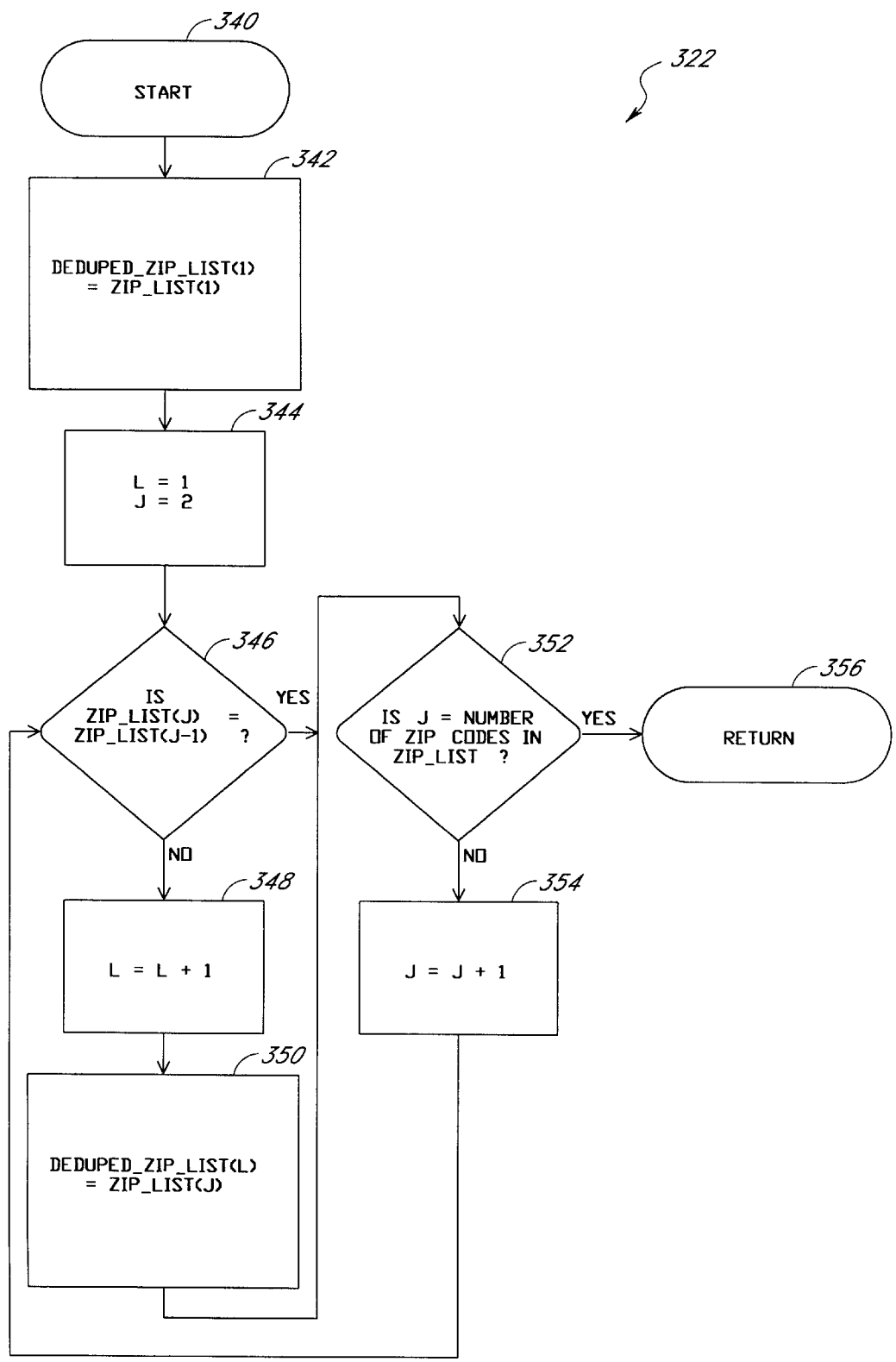
FIG. 8 is a flow diagram of the remove duplicates from zip list function indicated at 322 in FIG. 7.

Referring to FIG. 8, the function 322 defined in FIG. 7 will be described. Function 322 removes duplicate 5-digit zip codes from the zip_list as sorted in state 320 of FIG. 7. Beginning at a start state 340, the process 170 moves to a state 342, and the first entry of zip_list is defined to be the first entry of a deduped_zip_list. Proceeding to state 344, a variable L is assigned the value of one (1) and a variable J is assigned the value of two (2). Then at a decision state 346, the process 170 determines whether the value of zip_list addressed by J is equivalent to the value of zip_list addressed by "J minus one". If not, variable L is incremented by one at state 348, and the next entry in deduped_zip_list as addressed by L is written to be equivalent to the entry in the zip_list as addressed by J.

If the decision state 346 is false or at the completion of state 350, the process 170 moves to a decision state 352 to determine if the value of variable J is equal to the number of zip codes in the zip_list. If not, variable J is incremented by one at state 354, and the process 170 loops back to state 346 to check the next entry in zip_list. However, if all zip codes in zip_list are checked, as determined by state 352, the function 322 returns at state 356 to FIG. 7. For the continuing example, the deduped_zip_list at the completion of function 322 is as follows:

92007

92014

92024

92029

92075

92130

Figure 9:
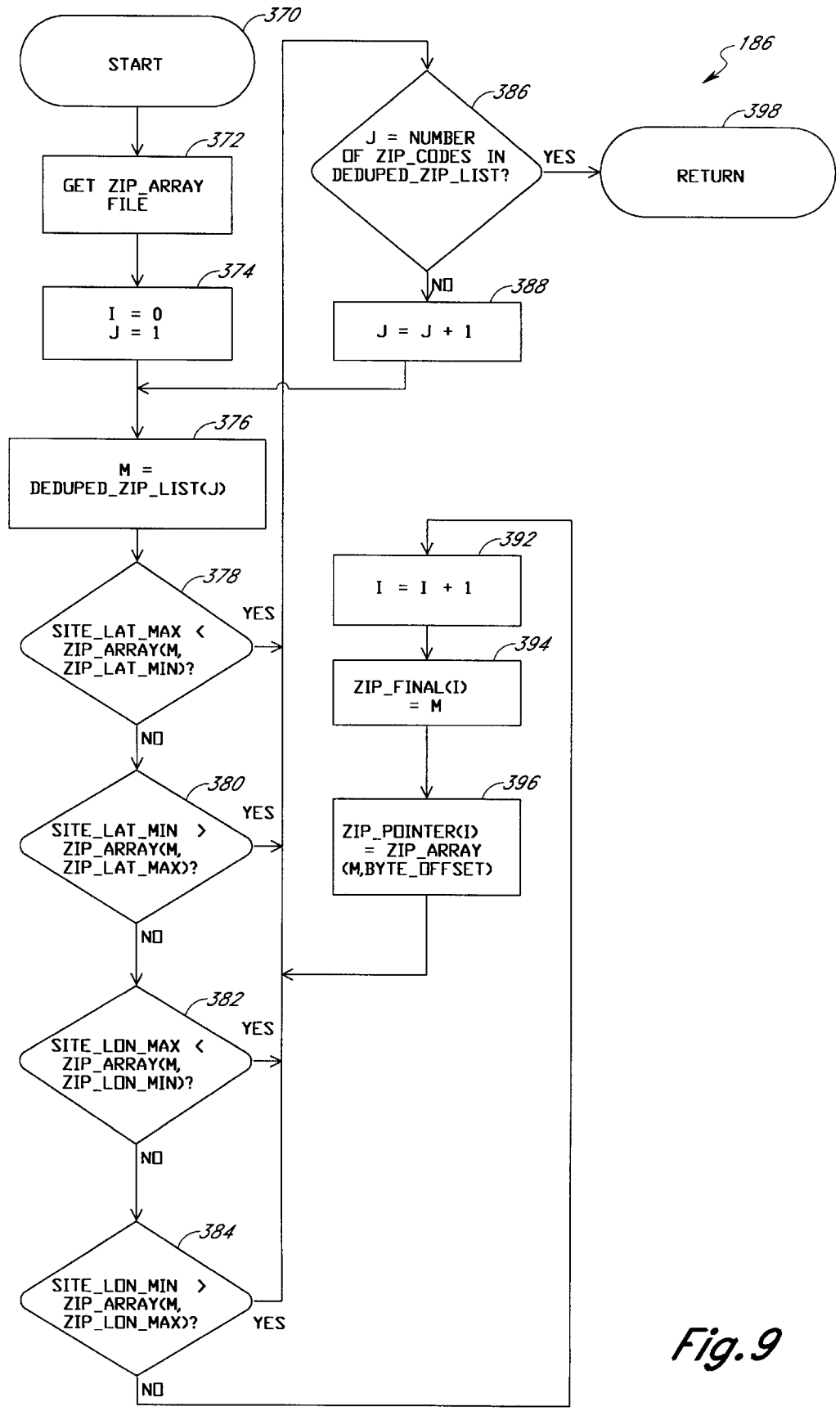
FIG. 9 is a flow diagram of the final zip list function indicated at 186 in FIG. 3.

Referring to FIG. 9, the function 186 defined in FIG. 3 will be described. Function 186 builds a zip_final list and a zip_pointer list by checking zip boundary extremes and getting an offset to the start of the zip+4_lat_lon centroid file 100 (FIG. 1a) from the zip array file 103. This procedure eliminates zip codes that do not touch the area covered by the radius of the service area. Beginning at a start state 370, the process 170 moves to a state 372 and accesses the zip array file 103 (FIG. 1a). Function 186 utilizes all columns, as previously described, of the zip array file 103 (FIG. 1a). Moving to state 374, variable I is set to a value of zero, and variable J is set to a value of one. Proceeding to state 376, variable M is set equivalent to the entry in deduped_zip_list, from function 184, addressed by J.

Using the site information calculated in Function 182 and the information from the zip array table, a series of checks are performed by decision states 378 to 384. At decision state 378, the process 170 determines whether the site_lat_max is less than the zip_lat_min for the zip array file entry addressed by the variable M. If so, the process 170 moves to a decision state 386. If not, the process continues at decision state 380. At decision state 380, the process 170 determines whether the site_lat_min is greater than the zip_lat_max for the zip array file entry addressed by the variable M. If so, the process 170 moves to decision state 386. If not, the process continues at decision state 382.

At decision state 382, the process 170 determines whether the site_lon_max is less than the zip_lon_min for the zip array file entry addressed by the variable M. If so, the process 170 moves to decision state 386. If not, the process continues at decision state 384. At decision state 384, the process 170 determines whether the site_lon_min is greater than the zip_lon_max for the zip array file entry addressed by the variable M. If so, the process 170 moves to decision state 386. If not, the process continues at state 392. To get to state 392, a determination has been made that the zip code does touch the area covered by the radius of the site. At state 392, variable I is incremented by one, and at state 394, the process 170 writes the value of M to the zip_final list entry addressed by I. Moving to state 396, the process 170 writes the value of byte_offset from the zip array file entry addressed by the variable M to the zip_pointer list entry addressed by I, and the process moves to state 386.

If any of the decision states 378 to 384 is true, the current zip code entry from deduped_zip_list is not further used. At decision state 386, a determination is made whether all entries in the deduped_zip_list have been checked. If not, J is incremented by one at state 388, and the process 170 loops back to state 376 to check the next entry. If all entries have been checked as determined by state 386, the function 186 returns at state 398 to FIG. 3. For the continuing example, the zip_final list at the completion of function 186 is as follows:

92007
92014
92075
92130

Figure 10:
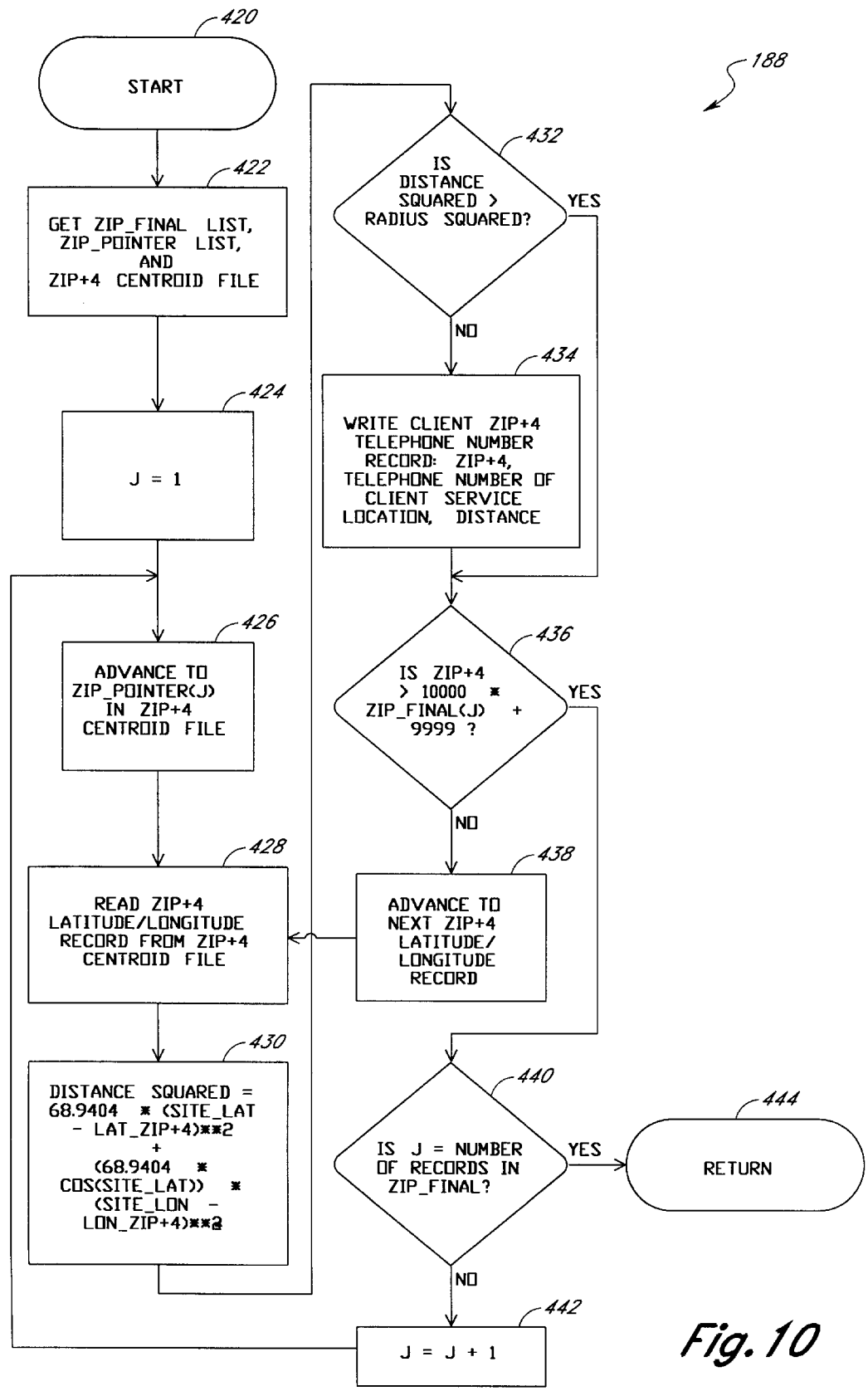
FIG. 10 is a flow diagram of the zip+4 site radius check function indicated at 188 in FIG. 3.

Referring to FIG. 10, the function 188 defined in FIG. 3 will be described. Function 188 reads all zip+4 records as identified by the combination of the zip_final list and zip_pointer list, and determines if the zip+4 centroids are inside the site radius. Beginning at a start state 420, the process 170 moves to a state 422 and gets the zip_final list, the zip_pointer list, and the zip+4 centroid file 100. At state 424, variable J is set to a value of one. Moving to state 426, the process 170 advances in the zip+4 centroid file to the address contained in the zip_pointer list addressed by the variable J. Then, at state 428, the zip+4 latitude/longitude record is read at the address from state 426. The zip+4 centroid file 100 (FIG. 1a) is sorted in ascending zip+4 order, and each record in this file contains three fields: zip+4 code, latitude in degrees, and longitude in degrees. Moving to state 430, the process 170 calculates the distance from the service location to the zip+4 centroid. The site latitude and longitude are available from state 176 while the zip+4 latitude and longitude are available from state 428. Moving to state 432, the process 170 determines if the distance squared from state 430 is greater than the radius squared (which is available from state 174). If not, the zip+4 code is inside the site radius, and the process 170 moves to state 434 to write a raw client table zip+4 telephone number record. This record contains the zip+4 code, the telephone number of the client service location, and the square root of the distance squared.

If the distance squared is greater than the radius squared, the zip+4 code is outside the site radius, and the process moves to a decision state 436. At state 436, the process 170 determines if the current zip+4 code is greater than 10000 times the value of the zip_final list entry addressed by the variable J plus 9999. The current zip+4 is compared to a value for the highest possible numbered zip+4 for the current zip code by appending 9999 to the 5-digit zip code. For example, if the zip code is 92007, the highest possible number for a zip+4 for this zip code is 920079999. While reading the zip+4 records for zip code 92007, if the zip+4 record read is greater than 920079999, then the end of zip+4 records for the 92007 zip code is passed, and the process 170 moves to the next zip code in the zip_final list. If the decision state 436 is false, the process 170 moves to state 438 and advances to the next zip+4 record for the same 5-digit zip code in the zip+4 centroid file 100. The next record is read by looping back to state 428.

If decision state 436 is true, the process 170 moves to a decision state 440 to determine if all records in the zip_final list have been read. If not, the variable J is incremented by one at state 442, and the process loops back to state 426 and repeats the procedure for the next 5-digit zip code in the zip_final list. If all 5-digit zip codes have been processed as determined by state 440, the function 188 returns at state 444 to FIG. 3. For the continuing example, a sample record of the raw Client table at the completion of state 434 is as follows:

Sample record: r

| Sample record: | 920752064 | 6194817777 | 1.2865. |
| --- | --- | --- | --- |

V. Client Table Build Process for the Service Location Closest to the Caller The "closest" process, function 196 (FIG. 3), is a post-build process for building a Client Table 106 created from radius defined service areas, polygon defined service areas or a mix of both types of service areas. The primary functions of the "closest" process are to reduce disk storage and clean up polygon digitizing errors that create minor overlaps in non-overlapping service areas. States 172 to 194 (FIG. 3) in the radius process or states 602 to 624 (FIG. 12a) in a polygon process must be completed to create an intermediate client table that can be reduced in size and or cleaned up by the post-build process 196.

Figure 11:
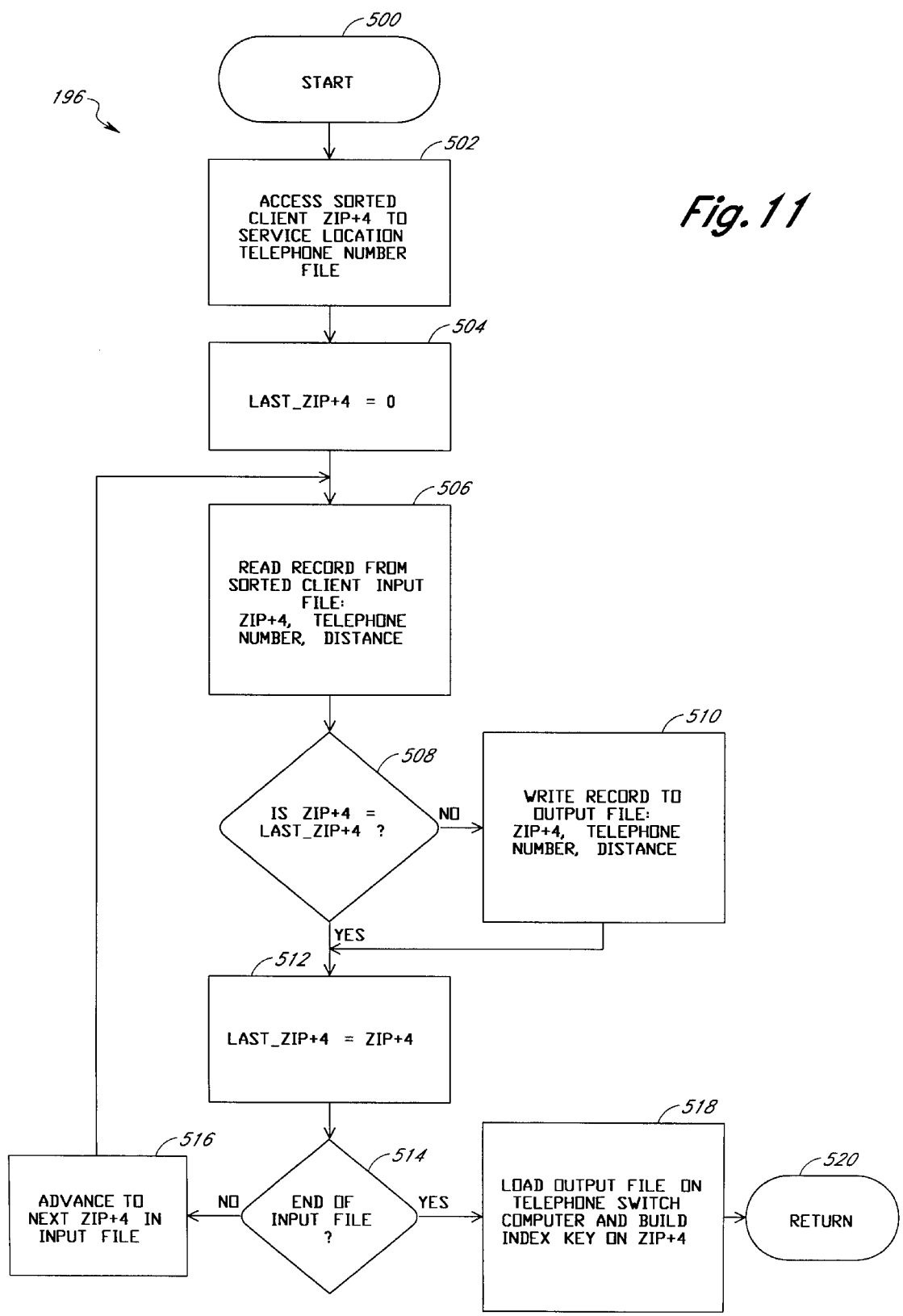
FIG. 11 is a flow diagram of the service location closest to the caller function indicated at 196 in FIG. 3.

Referring to FIG. 11, function 196 as defined in FIG. 3 will be described. Function 196 removes multiple assignments of a zip+4 code and keeps the one with the shortest distance. Beginning at a start state 500, function 196 accesses the sorted intermediate Client Table (not shown)

which is available at the completion of state 192. Moving to state 504, a variable "last_zip+4" is set equal to the value of zero. Then, at state 506, beginning with the first record, a record is read from the intermediate Client Table. Moving to a decision state 508, a determination is made whether the zip+4 just read in the record from state 506 is equivalent to the value of last_zip+4. If not, the current record is written to the Client Table 106 at state 510, followed by setting the variable last_zip+4 equivalent to the current zip+4 code at state 512.

At the completion of state 512, a decision state 514 determines if the end of the sorted intermediate Client Table has been reached. If not, the function 196 advances to the next zip+4 code in the intermediate Client Table and loops back to state 506 to process the next record. If the end of the intermediate Client Table has been reached as determined by state 514, the Client Table 106 is loaded in the computer of the telephone switch 111 and an index key on the zip+4 code is built. Function 196 returns at state 520 to state 200 of FIG. 3 to end the "closest" process.

VI. Client Table Build Process for a Polygon Defined Service Area

In general, there are two types of polygon defined service areas. The first type is an exclusive or non-overlapping trade area, and the second type is a non-exclusive or overlapping trade area.

For a non-overlapping polygon defined service area, each franchisee has a defined trade area, such as the area in which they deliver a product. The following situation is given to illustrate this concept. A customer could be located closer to, say, Franchisee B than Franchisee A, but if the customer is in the polygon area for Franchisee A, only the telephone number for Franchisee A will be in the Client Table 106 (FIG. 1a) record corresponding to the location of the customer. However, if the service areas for Franchisee A and Franchisee B are overlapping, the Client Table 106 would have one record with the telephone number and distance for Franchisee A, and another record with the telephone number and distance for Franchisee B. Therefore, the client table build process 105 accommodates both types of polygon defined service areas.

Figure 12A:
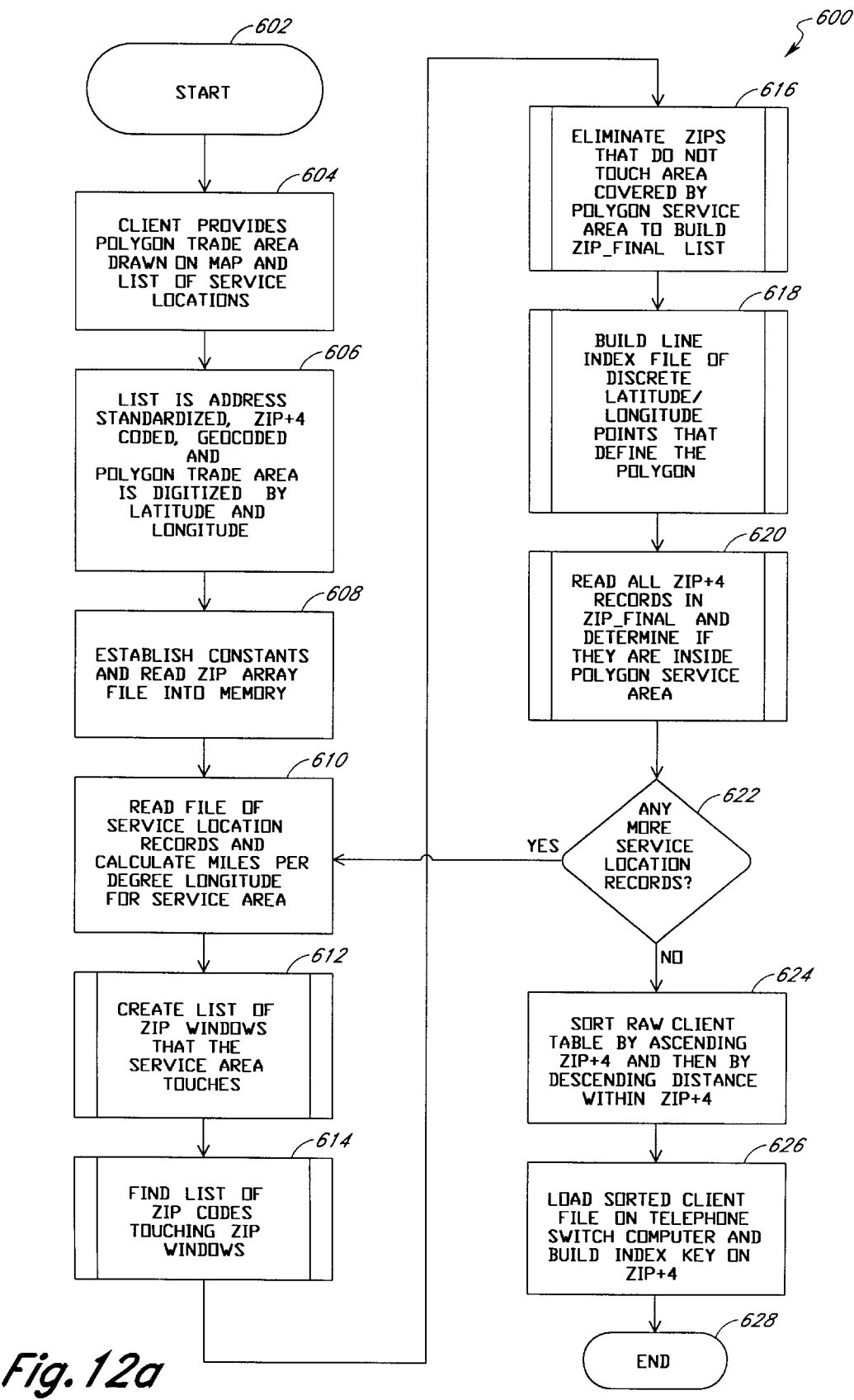
FIG. 12*a* is a top-level flow diagram of a process to build a client table using polygon defined service areas for the system of FIG. 1.
Figure 12B:
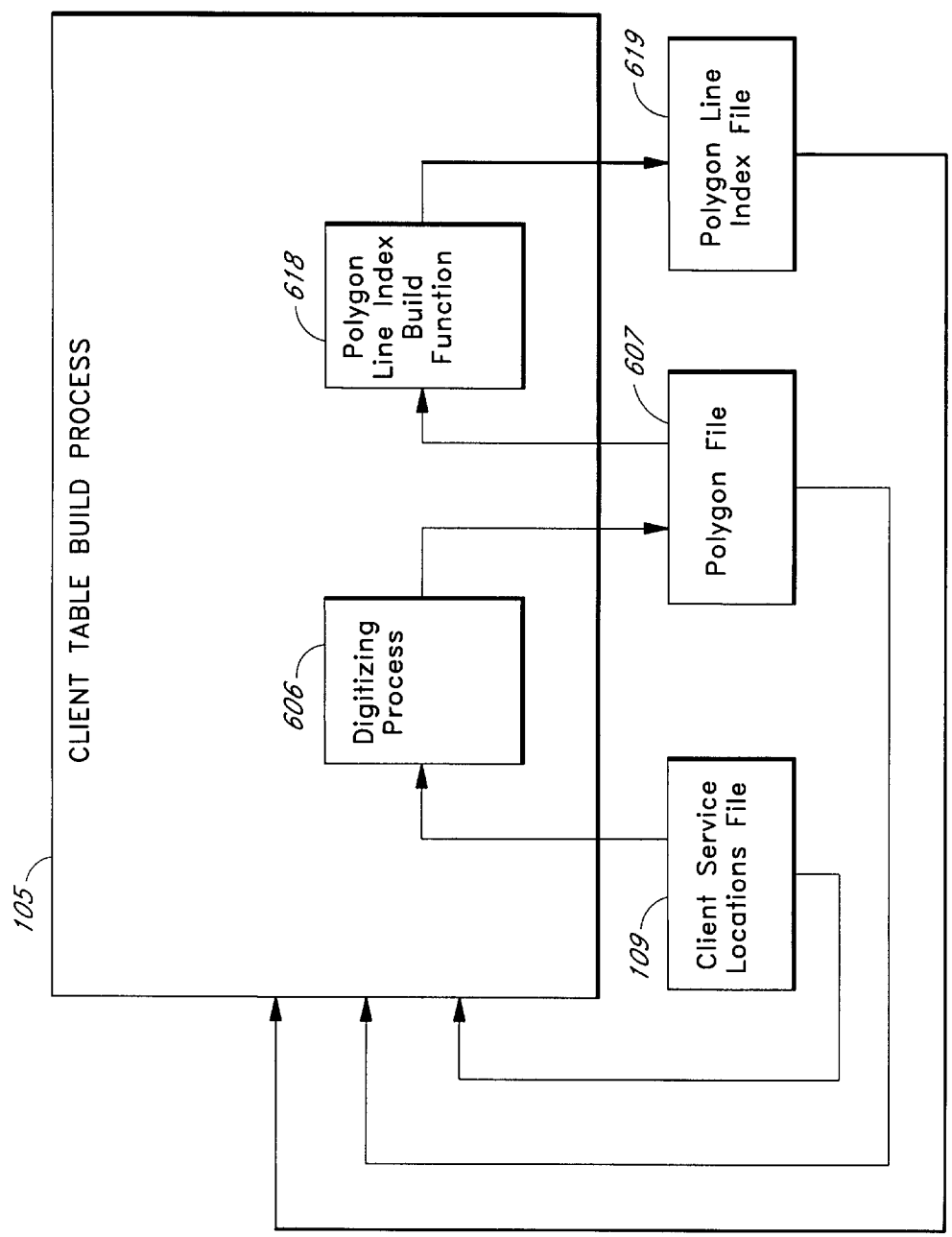
FIG. 12*b* is a block diagram of the files utilized in the process of FIG. 12*a*.
Figure 13:
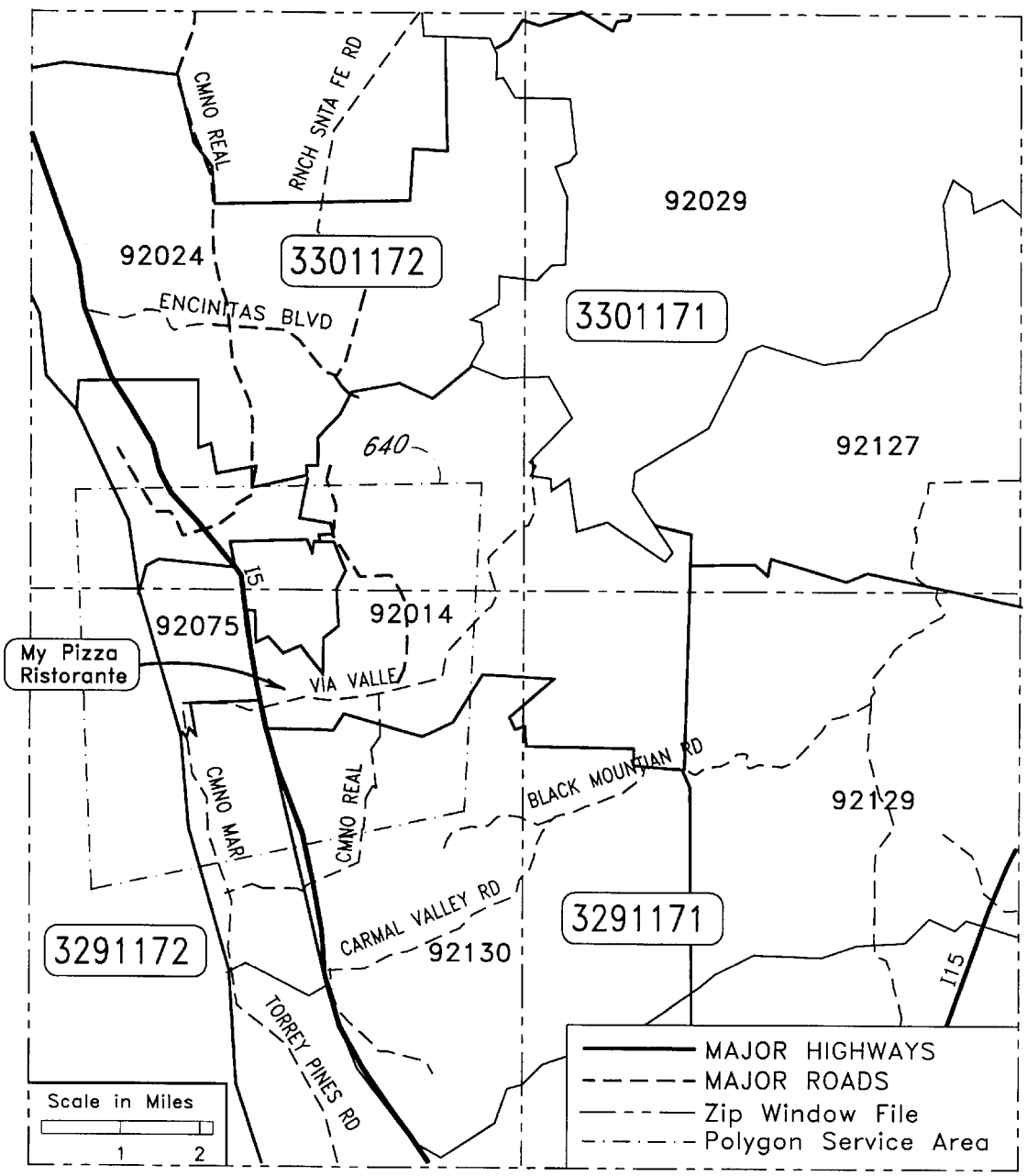
FIG. 13 is a diagram illustrating an example area utilized in the description of the process shown in FIG. 12*a*.

Referring generally to FIGS. 12a, 12b, and 13, a Client Table process 600 for a polygon defined service area will be described. Process 600 is another specific version of the general process 105 shown in FIG. 1a. Many parts of the polygon defined service area process 600 (also referred to as the polygon process) are identical with those of the radius defined service area process 170. Some functions have minor changes. Other functions are totally different. For functions that are almost identical only the differences will be identified and explained to avoid repetition. The new functions will be described in some detail.

The process 600 begins at a start state 602 and moves to state 604 wherein a client provides a client service locations file 109 (FIG. 1a) of service locations in machine readable form with information and format as previously shown in Table 3. The client also provides a detailed street map with the polygon service area of the service location drawn on the street map with the telephone number of the service location written inside the polygon service area. The map of FIG. 13 illustrates an example polygon service area 640.

The process 600 moves to state 606 wherein the list of service locations in file 109 is address standardized, zip+4 coded, and latitude and longitude geocoded using commercially available services through companies such as Group I and Geographic Data Technology. Table 4 is the example of a standardized record with latitude and longitude appended. In addition, the latitude and longitude vertices for the polygon service area drawn on the street map are digitized using a commercially available GIS system such as Infomark for Windows available from Equifax National Decision Systems. The digitizing process of state 606 assigns latitude and longitude coordinates for the vertices of the polygon and creates a polygon file 607 as shown in FIG. 12b. An example of the polygon file 607 is shown in Table 6 with the following data items:

TABLE 6

| | |
|---|---|
| Geocode: | 6194817777 |
| Name: | MyPizza Del Mar |
| Number of vertices: | 5 |
| Lat/Lon vertex pairs: | 33.0170 −117.2910 |
| | 32.9503 −117.2874 |
| | 32:9623 −117.2132 |
| | 33.0187 −117.2084 |
| | 33.0170 −117.2910 |

The last latitude/longitude vertex pair must equal the first pair to close the polygon. This example is for a very simple polygon. Typical franchise polygons are very complex; the polygon may follow non-linear street boundaries and contain hundreds of vertices. The geocode is the telephone number of the service location. The polygon file data is appended to the end of its corresponding record of the client service locations file 109, creating a variable length record.

Moving to state 608, the process 600 establishes the constant of 68.9404 miles per degree latitude and reads the zip array file 103 (FIG. 1a) into memory of the computer. At state 610, the process 600 reads a record from the client service location file 109 and calculates the number of miles per degree longitude for the service location. The miles per degree longitude=68.9404*COSINE (latitude). For the example given in Table 4, at 32.9862 degrees latitude the result is 57.8297 miles per degree longitude.

The process 600 proceeds to a function 612 which generates a list of zip windows that the service location touches. Touching a zip window means that at least part of the service area is in or overlaps the zip window. The zip windows for the example given in Table 4 are illustrated in FIG. 13. The function 612 will be further described in conjunction with FIG. 14 hereinbelow.

Figure 16:
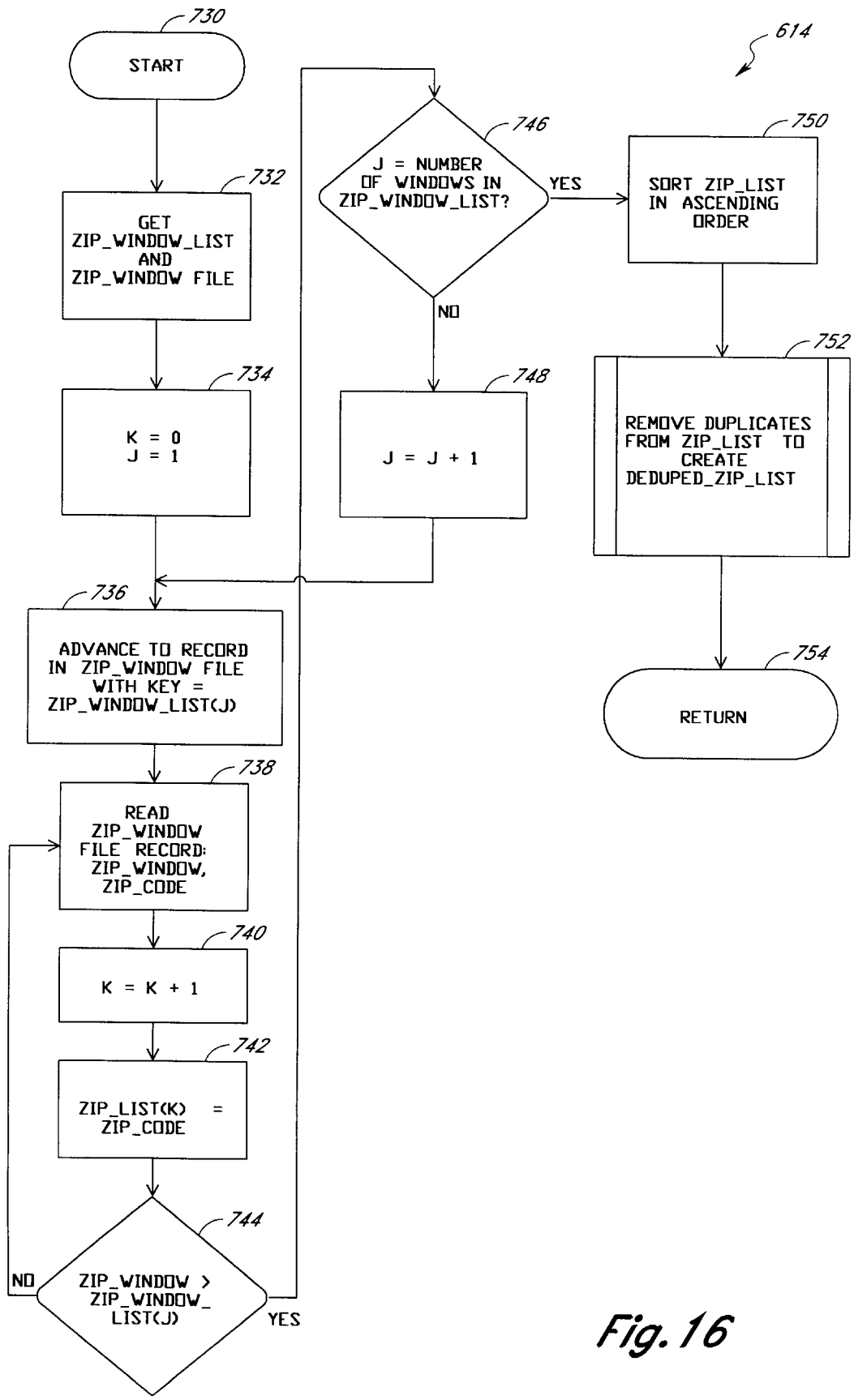
FIG. 16 is a flow diagram of the initial zip list function indicated at 614 in FIG. 12*a*.

Moving to a function 614, the process 600 generates a list of 5-digit zip codes that touch any of the zip windows identified by function 612. This zip list is sorted in ascending order and duplicate zip codes are removed in function 614. The function 614 will be further described in conjunction with FIG. 16 hereinbelow.

Figure 18:
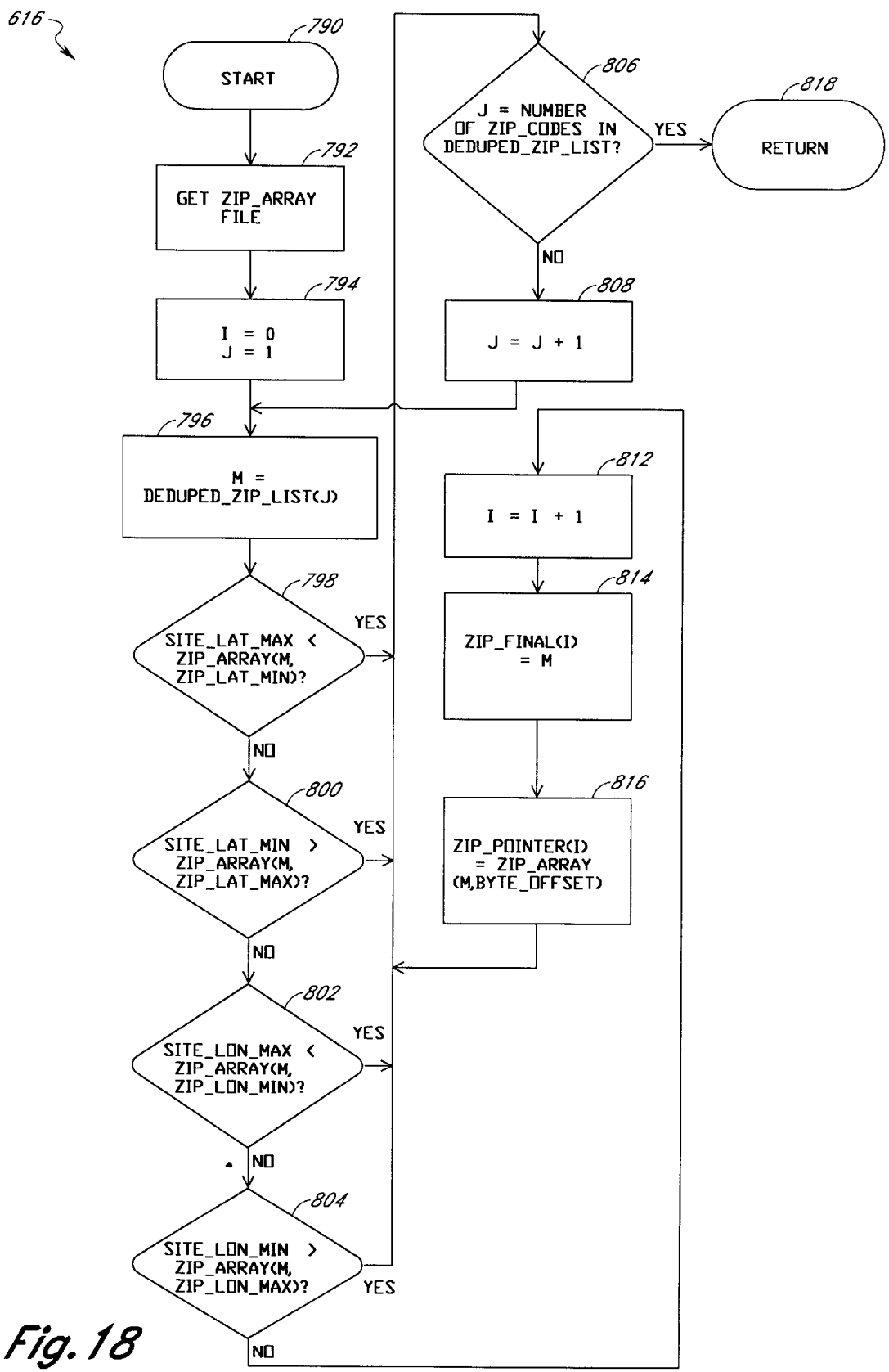
FIG. 18 is a flow diagram of the final zip list function indicated at 616 in FIG. 12*a*.

The process 600 proceeds to a function 616 wherein 5-digit zip codes that are not within the polygon service area specified in state 604 are removed from the zip list generated by function 614, and a zip final list is created. The function 616 will be further described in conjunction with FIG. 18 hereinbelow.

Advancing to function 618, the process 600 builds a line index file 619 shown in FIG. 12b of discrete latitude and longitude points that define the polygon. Function 618 will be further described in conjunction with FIG. 19a and 19b hereinbelow.

Continuing to function 620, the process 600 retrieves all the zip+4 records corresponding to the zip codes in the zip final list generated by function 616 and determines if the zip+4 code is at or inside the polygon service area. If so, a record is written in a raw Client Table (not shown) that includes the zip+4 code, the client telephone number for the instant service location, and the distance of the zip+4 centroid to the service location. The function 620 will be further described in conjunction with FIG. 20 hereinbelow.

The process 600 moves to a decision state 622 to determine if additional client service records are to be processed. If so, the loop of states 610 to 620 is repeated for the next service location record. If all service location records have been processed for the instant raw Client Table, the process 600 advances to state 624. At state 624, the process 600 sorts the raw records, written by function 620, by ascending zip+4 code and then by descending distance, if the same zip+4 code is listed more than once. The same zip+4 code could be listed more than once if there are multiple overlapping polygon service locations, each with a different client telephone number.

The process 600 then moves to a state 626 wherein the sorted Client Table from state 624 is loaded onto the computer of the telephone network switch 111, and an index key on the zip+4 codes is built. Upon completion of state 626, the Client Table build process 600 for a polygon defined service area ends at state 628.

Figure 14:
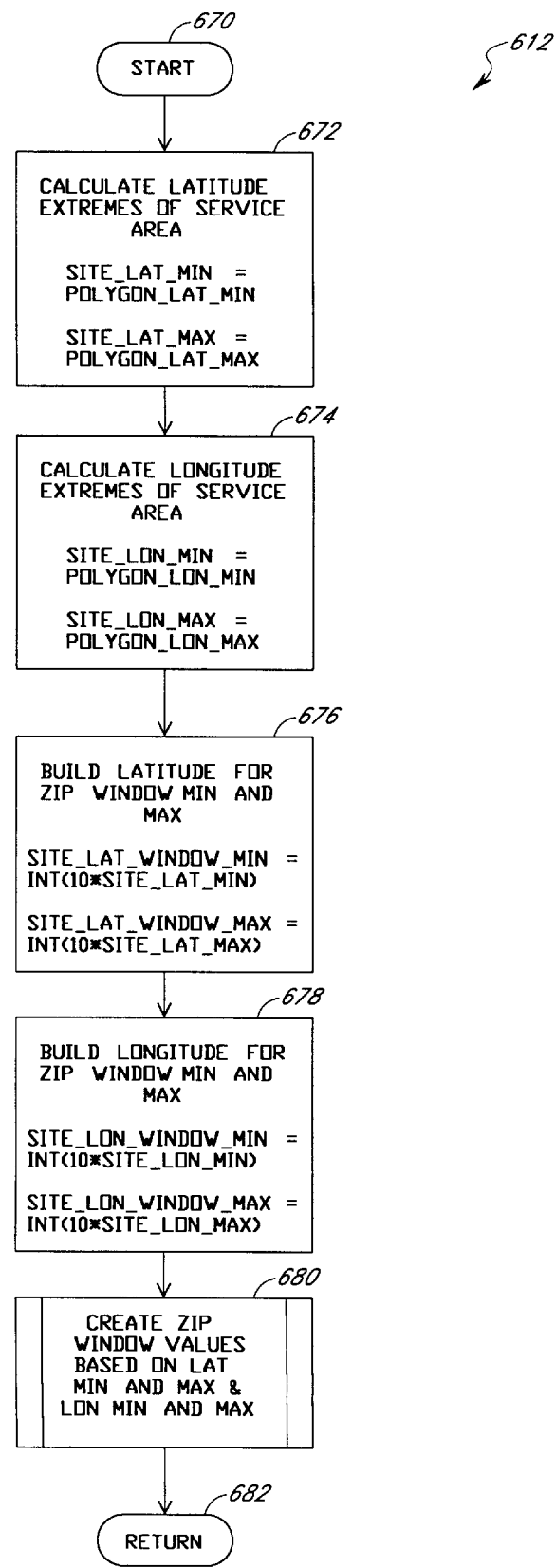
FIG. 14 is a flow diagram of the zip window list function indicated at 612 in FIG. 12*a*.

Referring generally to FIG. 14, the function 612 defined in FIG. 12a will be described. Function 612 generates a list of zip windows that the site touches by first calculating site latitude and longitude extremes. For this function, the absolute value is used for both the latitude and longitude.

Beginning at a start state 670, the process 600 moves to a state 672 to establish latitude extremes of the service area. The polygon file 607 is accessed to retrieve the polygon vertices latitude minimum and maximum values.

Site_lat_min=polygon_lat_min;

Site_lat_max=polygon_lat_max.

For the example service location and polygon given in Table 6, the results are as follows:

Site_lat_min=32.9503;

Site_lat_max=33.0187.

The process continues at state 674 wherein longitude extremes of the service area are established. The polygon vertices longitude minimum and maximum values are retrieved from the polygon file 607.

Site_lon_min=polygon_lon_min;

Site_lon_max=polygon_lon_max.

For the example service location and polygon given in Table 6, the results are as follows:

Site_lon_min=117.2084;

Site_lon_max=117.2910.

Figure 15:
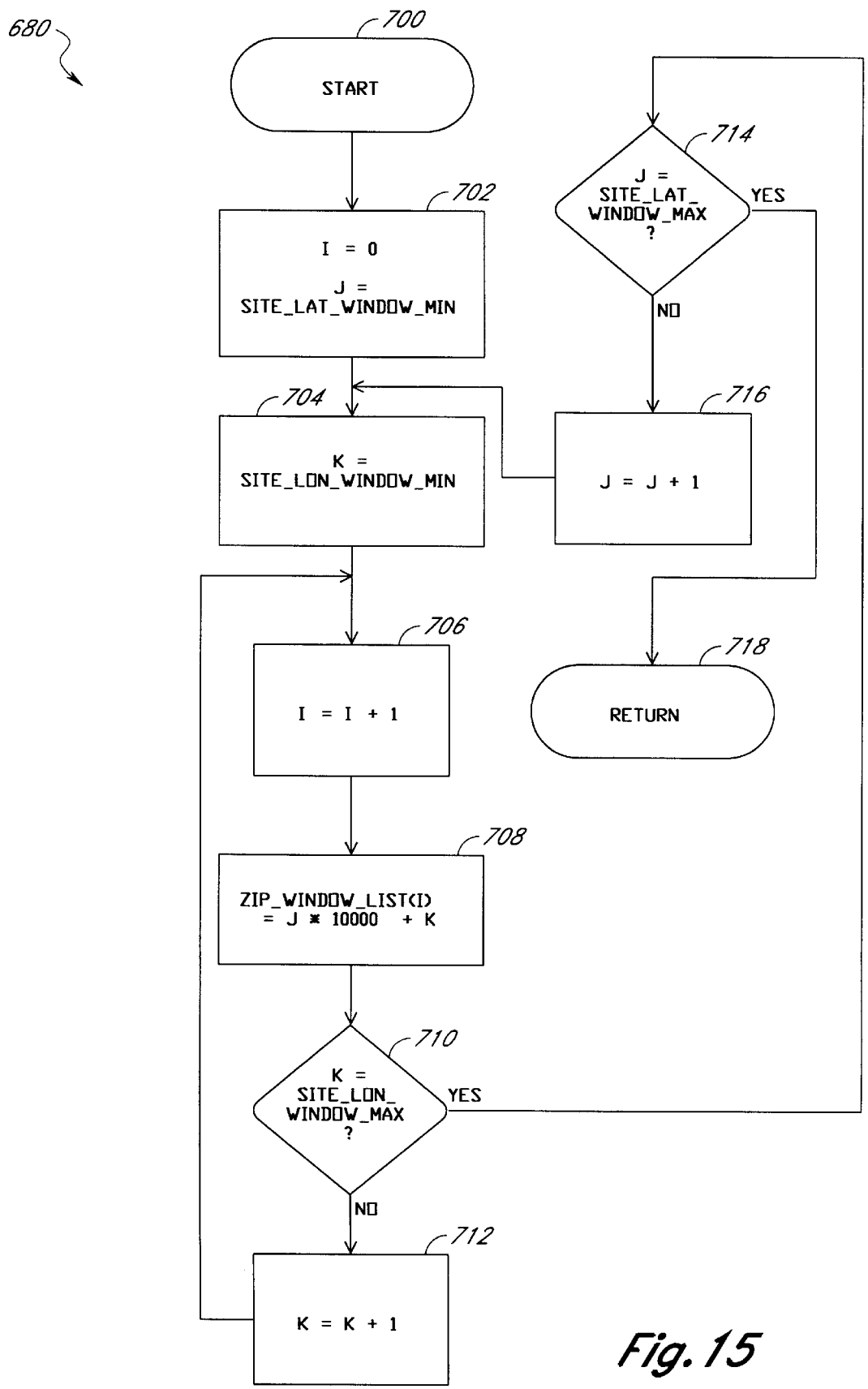
FIG. 15 is a flow diagram of the zip windows function indicated at 680 in FIG. 14.

States 676 and 678 are identical to states 258 and 260 of function 182 (FIG. 5). As defined in FIG. 14, function 680 (FIG. 15) is identical to function 262 (FIG. 6). Function 612 returns at state 682 to FIG. 12a.

Figure 17:
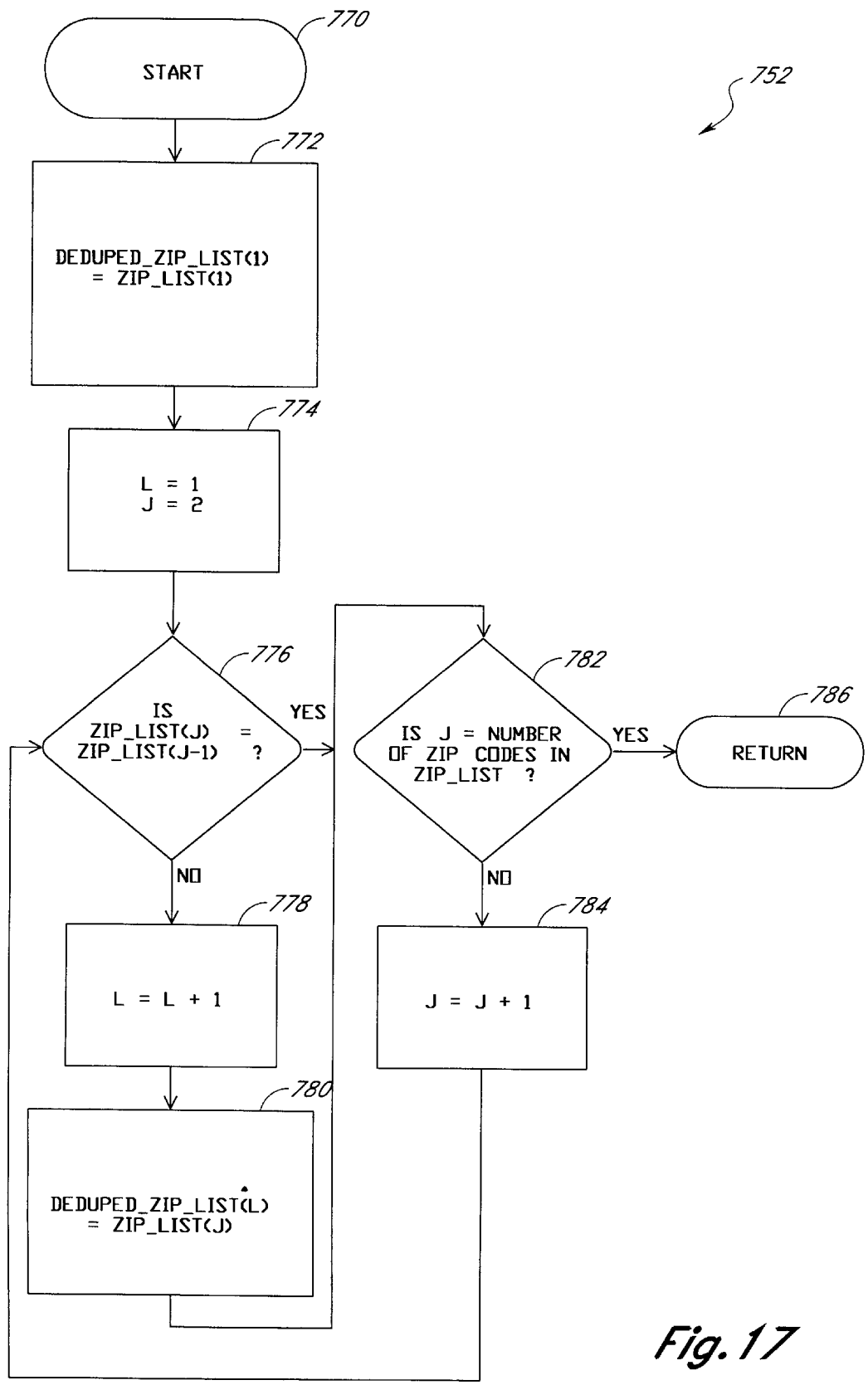
FIG. 17 is a flow diagram of the remove duplicates from zip list function indicated at 752 in FIG. 16.

As defined in FIG. 12a, function 614 (FIG. 16) is identical to function 184 (FIG. 7). As defined in FIG. 16, function 752 (FIG. 17) is identical to function 322 (FIG. 8). As defined in FIG. 12a, function 616 (FIG. 18) is identical to function 186 (FIG. 9).

Figure 19A:
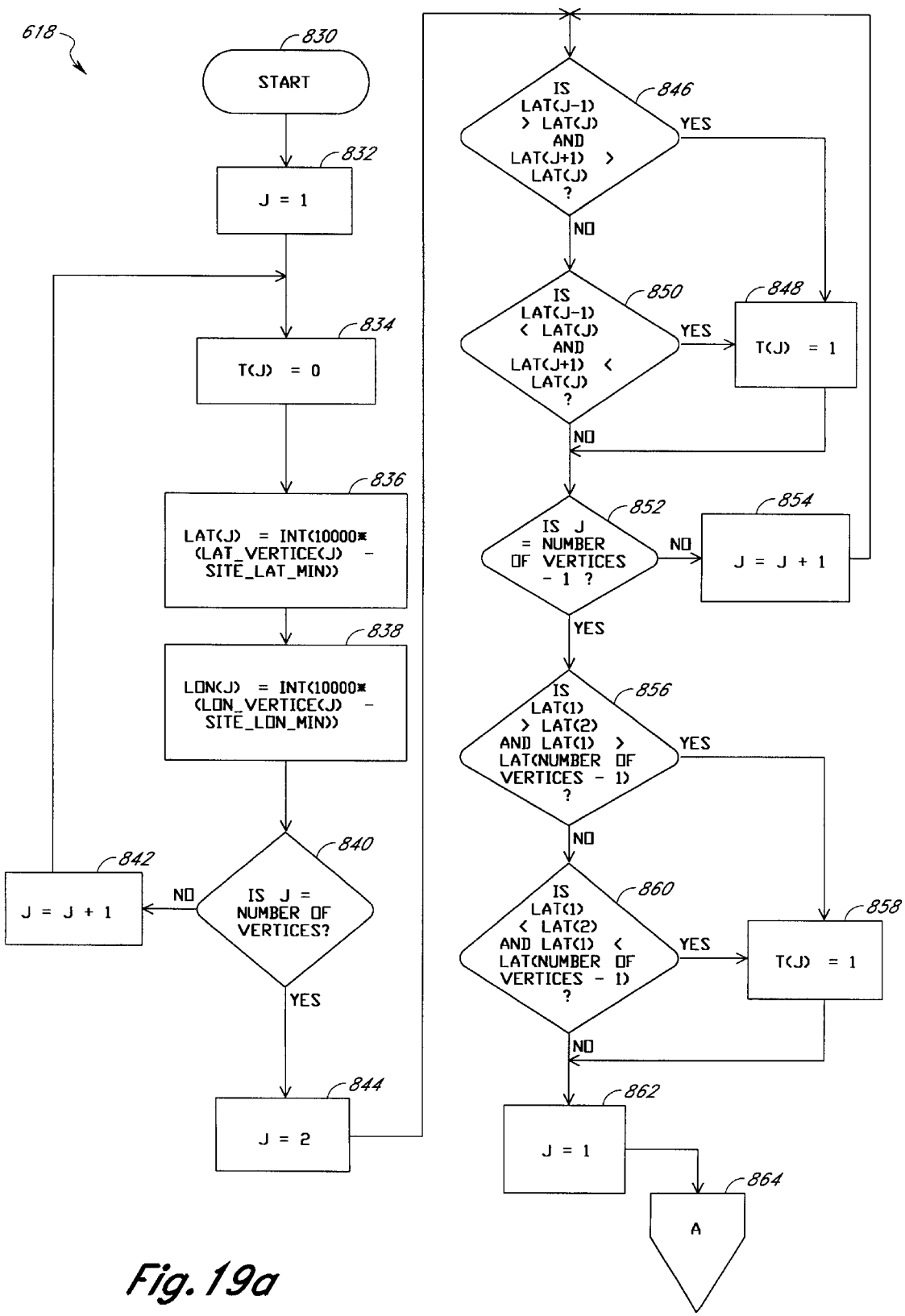
FIGS. 19*a* and 19*b* are a flow diagram of the line index file function indicated at 618 in FIG. 12*a*.
Figure 19B:
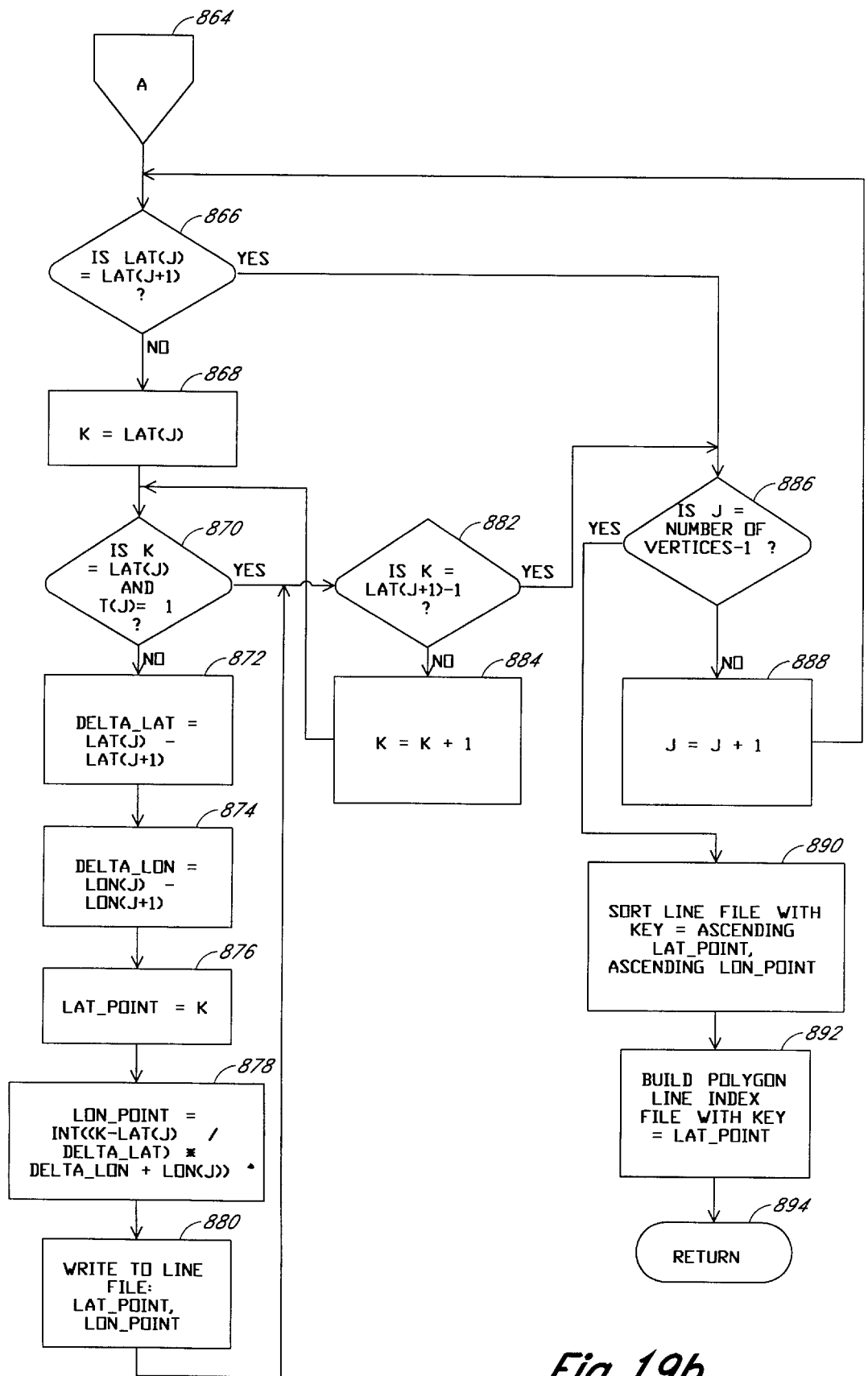

Referring to FIGS. 19a and 19b, the function 618 defined in FIG. 12a will be described. Function 618 builds the line index file 619 by rounding all modified polygon vertices latitudes and longitudes to an integer value, thereby creating a record of every discrete point along the line generated by connecting adjacent vertices listed in the polygon file 607. The modification performed to the polygon vertices is subtracting the site_lat_min or site_lon_min as will be seen below.

Beginning at a start state 830, the process 600 moves to a state 832 and initializes a variable J to equal the value one. Moving to state 834, the process 600 initializes a tangent (denoted by "T" in FIG. 19) array element addressed by the variable J to equal the value zero. At state 836, a latitude array (denoted by "LAT" in FIG. 19) element addressed by J is written to the value calculated by: subtracting site_lat_min (available from function 612, FIG. 14) from the vertices latitude (lat_vertices) addressed by J in the polygon file 607 (available from state 606), multiplying the result by 10,000, and then taking the integer (INT) portion of the product. Advancing to state 838, a longitude array (denoted by "LON" in FIG. 19) element addressed by J is written to the value calculated by: subtracting site_lon_min (available from function 612, FIG. 14) from the vertices longitude (lon_vertices) addressed by J in the polygon file 607 (available from state 606), multiplying the result by 10,000, and then taking the integer portion of the product.

At a decision state 840, the process 600 determines if all vertices in the polygon file 607 have been processed. The number of vertices is available from state 606 as shown in the example in Table 6. If not, variable J is incremented by one at state 842, and the process 600 loops back to state 834 to process the next vertices. If all vertices have been processed, variable J is set equal to the value two at state 844.

States 846 through 860 are used to find vertices that are tangent to a latitude line. States 846 through 854 form a loop to sequence through all elements of the LAT array to determine if either of the conditions of decision states 846 or 850 are met. If so, the element of the tangent array addressed by J is set equal to one. If not, the next element is checked, by incrementing J at state 854 and looping back to state 846, until the end of the LAT array is reached, i.e., all vertices are tested, and decision state 852 is true. Decision state 846 determines whether the values of the elements of array LAT immediately before and immediately after the current element are greater than the value of the current element. In other words, decision state 846 determines whether a latitude line is tangent to vertex(J). Decision state 850 determines whether the values of the elements of array LAT immediately before and immediately after the current element are less than the value of the current element. In other words, decision state 850 determines whether a latitude line is tangent to vertex(J).

When J equals the number of vertices minus one, the process 600 moves to states 856 through 860 to perform the follow tests:

--- decision state 856: If LAT(1) > LAT(2) AND LAT(1) > LAT(number_vertices-1) then T(J) = 1;
decision state 860: If LAT(1) < LAT(2) AND LAT(1) < LAT(number_vertices-1) then T(J) = 1.

---

Number_vertices is used to represent the number of vertices as available from state 606. Decision states 856 through 860 test for a special case of previous states 846 through 854 to determine if vertex(1) is tangent to a latitude line. If so, the element of the tangent array addressed by J is set equal to one.

At state 862, the process 600 sets variable J equal to one. Block 864 is an off page connector from FIG. 19a to FIG. 19b. Continuing on from block 864 on FIG. 19b, the process 600 generates a pseudo-line of discrete latitude points connecting the polygon vertices. Each point that defines the line is described by an X,Y coordinate. Each Y coordinate or latitude point is one ten-thousandth of a degree latitude apart on the Y axis.

Decision state 866 checks for parallel latitude lines, and if true, the process 600 moves to decision state 886 to determine if all vertices have been processed. If not, J is incremented by one at state 888, and the process loops back to decision state 866 to check the next element of array LAT. If LAT(J) does not equal LAT(J+1) as determined by decision state 866, the process 600 moves to state 868, sets a variable K to equal the value of LAT(J), and moves to state 870.

State 870 is used to leave out latitude tangent vertices points. State 870 determines if K is equivalent to LAT(J) and T(J) equals one. If so, the process 600 moves to decision state 882 to determine if K should be incremented by one at state 884, or if K has reached the value "LAT(J+1)–1" and decision state 886 is to be performed. If K is incremented at state 884, the process 600 loops back to decision state 870.

If decision state 870 is false, the process 600 moves to state 872 to calculate a variable "delta_lat" to be "LAT(J) –LAT(J+1)". At state 874, a variable "delta_lon" is calculated as the difference between the value of the array LON element addressed by J and the value of the array LON element addressed by J plus one. Moving to state 876, a variable "lat_point" is set equivalent to the value of variable K. State 878 is used to calculate a longitude (variable "lon_point") for latitude line point using the following equation:

$$lon\_point=INT((K-LAT(J)/delta\_lat)*delta\_lon+LON(J)).$$

Moving to state 880, the process 600 writes the values of lat_point and lon_point to the line index file and then loops back to decision state 882 to check on the value of K.

At decision state 886, if J equals the number of vertices minus one, all vertices have been processed, and the process 600 moves to state 890. At state 890, the process 600 sorts the line index file by ascending latitude point, and then by ascending longitude point within the latitude point. Moving to state 894, process 600 builds the polygon line index file 619 using the latitude point as the indexing key. Function 618 returns at state 894 to FIG. 12a.

Figure 20:
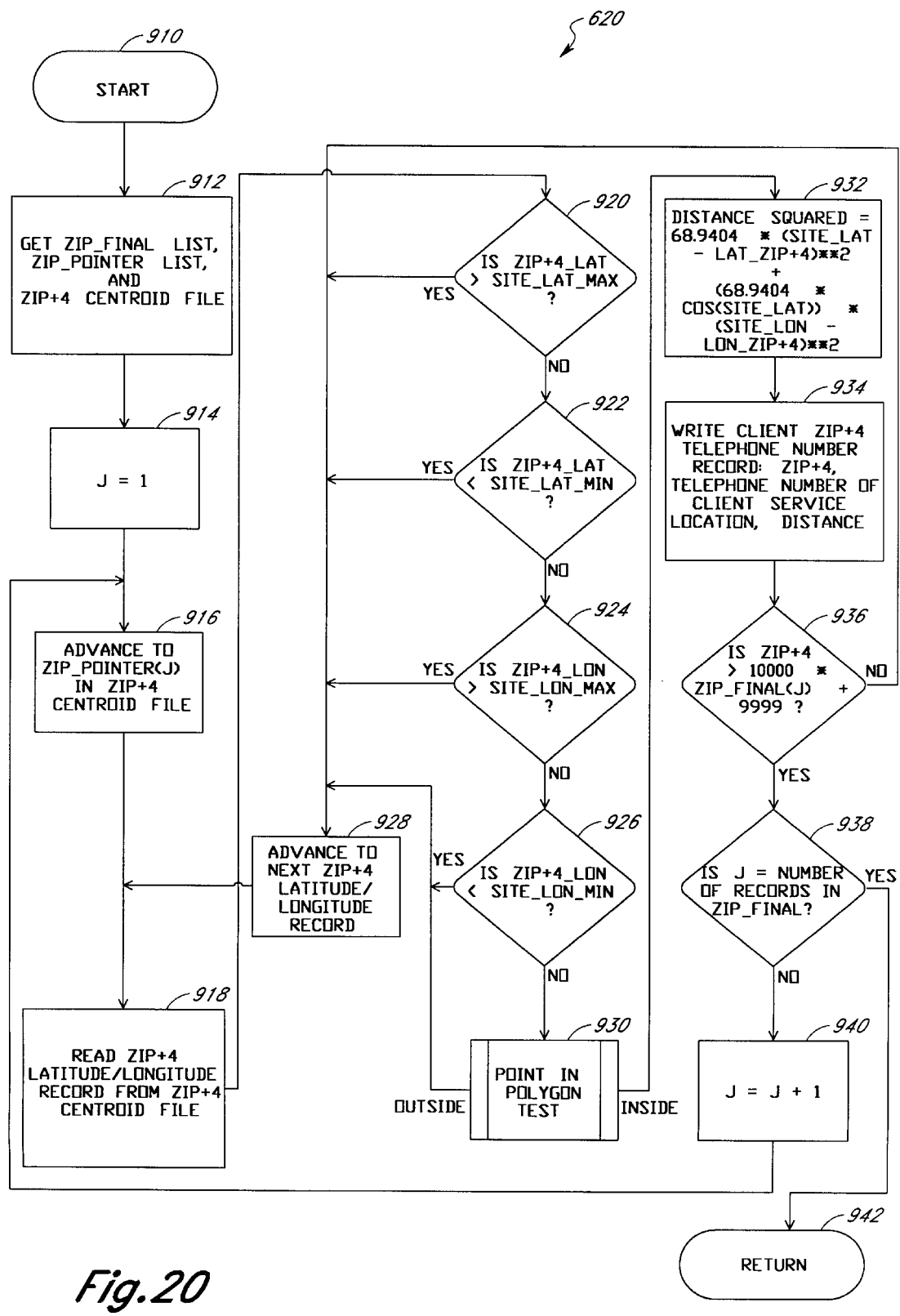
FIG. 20 is a flow diagram of the zip+4 site polygon check function indicated at 620 in FIG. 12*a*.

Referring to FIG. 20, the function 620 defined in FIG. 12a will be described. Function 620 reads all zip+4 records as identified by the combination of the zip_final list and zip_pointer list, and determines if the zip+4 centroids are inside the polygon service area.

Beginning at a start state 910, the states 912 through 918 are identical to states 422 through 428 of function 188 (FIG. 10). Then beginning at state 920 through state 926, the process 600 compares the latitude and longitude of the zip+4 centroid to the minimums and maximums of the site latitude and longitude available from function 612 (FIG. 14). In other words, the process 600 determines if the zip+4 centroid is inside the latitude and longitude extremes of the polygon service area. If not, at state 928 the process 600 advances to point to the next zip+4 record and then loops back to state 918 to read the zip+4 record.

However, if the zip+4 centroid is determined to be inside the latitude and longitude extremes of the polygon service area by states 920 through 926, the process 600 moves a function 930. Function 930 is a final test to determine if the zip+4 centroid is indeed inside the polygon. The point-in-polygon test of function 930 returns with either an "inside" flag or "outside" flag. If the zip+4 centroid is not inside the polygon, the "outside" flag is set by function 930, and the process 600 moves to state 928 to advance to the next zip+4 record. However, if the zip+4 centroid is inside the polygon, the "inside" flag is set by function 930, and the process 600 moves to state 932 to perform a distance calculation. State 932 is identical to state 430 of function 188 (FIG. 10). States 934 through 940 and 928 are identical to states 434 through 442 of function 188. Function 620 returns at state 942 to FIG. 12a.

Figure 21:
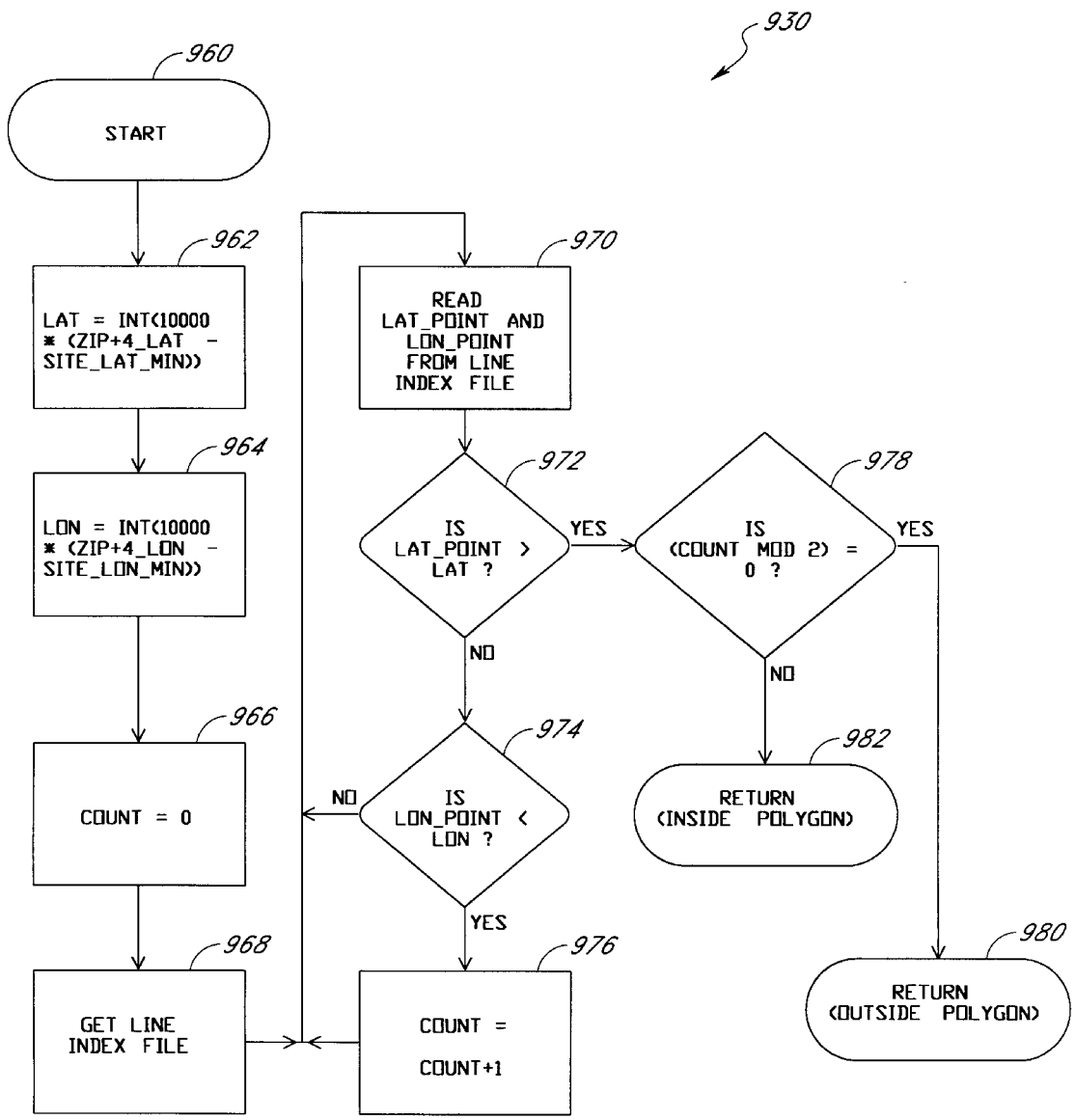
FIG. 21 is a flow diagram of the point in polygon test function indicated at 930 in FIG. 20.

Referring to FIG. 21, the function 930 defined in FIG. 20 will be described. Function 930 tests to determine if the zip+4 centroid is inside the polygon. Function 930 conceptually draws a line from the zip+4 latitude in a negative longitude direction and then counts the number of times the line crosses the polygon boundary. If the line crosses an odd number of times, the zip+4 centroid is inside the polygon, but an even number of line crossings determines that the zip+4 centroid is outside the polygon.

Beginning at a start state 960, the process 600 moves to state 962 to calculate a value for a variable "lat" by: subtracting site_lat_min (available from function 612, FIG. 14) from zip+4_lat (available from the zip+4 centroid file 100), multiplying the result by 10,000, and then taking the integer (INT) portion of the product. Moving to state 964, the process 600 calculates a value for a variable "lon" by: subtracting site_lon_min (available from function 612) from zip+4_lon (available from the zip+4 centroid file 100), multiplying the result by 10,000, and then taking the integer portion of the product.

Moving to state 966, the process 600 initializes the variable "count" to a value of zero and proceeds to state 968 to access the line index file 619. At state 970, the process 600 reads the polygon line index file 619 (available from function 618, FIG. 19) to retrieve the values for the variables "lat_point" and "lon_point". The process 600 advances in the polygon line index file 619 to the first occurrence of "lat" in the file by use of the file ISAM index. Moving to a decision state 972, the process 600 determines if "lat_point" is greater than "lat". If "lat_point" is greater than "lat", then all records in the polygon line index file 619 have been read. If not, a test is performed at a decision state 974 to determine if "lon_point" is less than "lon". If "lon_point" is less than "lon", a line drawn from the zip+4 centroid toward negative infinity is defined to cross a polygon line. At state 976, "count" is incremented by one to indicate the line crossing exists, and the process 600 loops back to state 970. However, if decision state 974 is false, the process 600 loops back to state 970 to perform the next read of the line index file 619.

If process 600 determines at decision state 972 that "lat_point" is greater than "lat", process 600 moves to a decision state 978 to check if "count MODULUS 2" is equal to zero. If so, an even number of line crossings exist, the "outside" flag is then set, and the function 930 returns at state 980 to FIG. 20. If decision state 978 is false, i.e., "count MODULUS 2" is not equal to zero, an odd number of line crossings exist which denotes that the zip+4 centroid is inside the polygon. The process 600 sets the "inside" flag, and the function 930 returns at state 982 to FIG. 20.

VII. Overview of Three Table System

Figure 22:
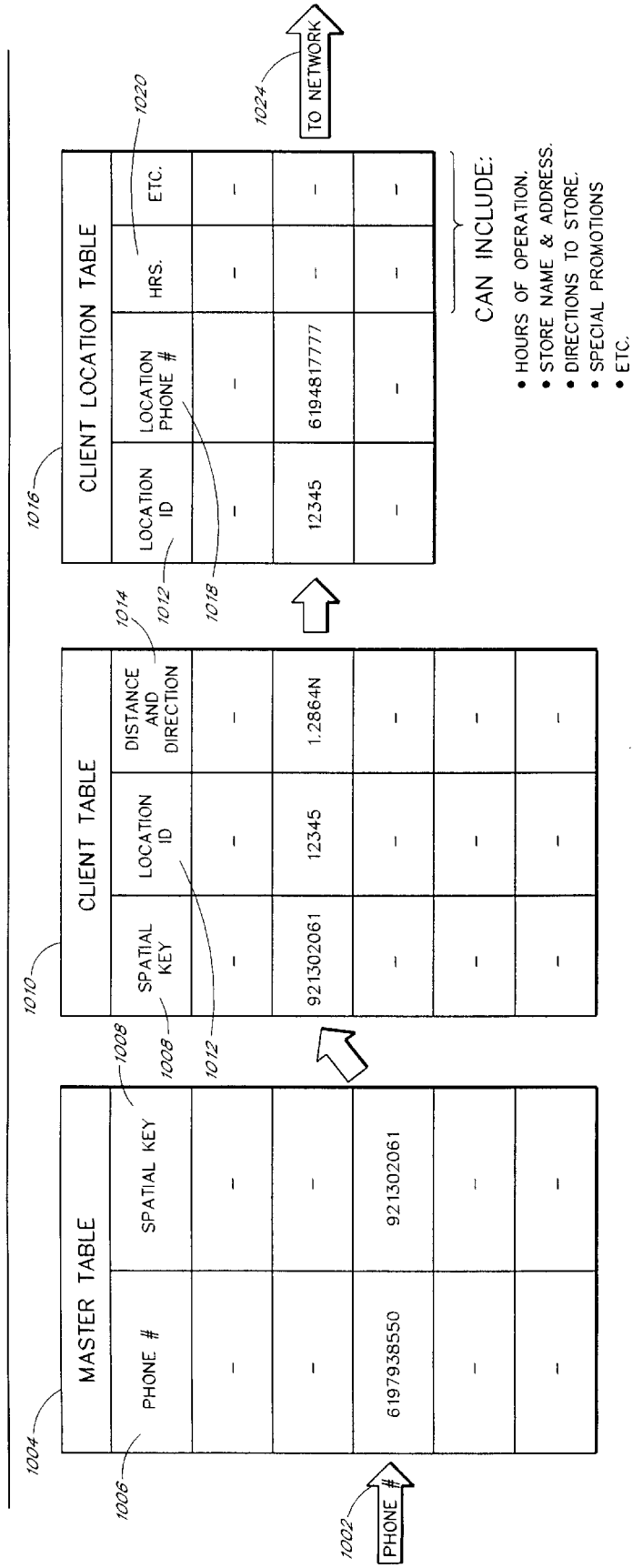
FIG. 22 is a block diagram of a portion of a three table system embodiment of a dynamic central switch linking process.

A derivative of the Two Table system (Master and Client tables) shown in FIG.s 1b and 1c is a Three Table system 1000. Referring to FIG. 22, the Three Table system 1000 is an enhancement to the two table system. The Master Table 1004 and the Client Table 1010 are used to determine the spatial service relationship of the caller provided telephone number and the servicing locations. The Master Table 1004 preferably has records with a field for a 10-digit telephone number 1006 and a field for a spatial key 1008 corresponding with the telephone number. A telephone number 1002 of the caller is generated by ANI or caller ID technology, or is provided by the caller, such as, for example, via entry on a touch tone keypad. The Client table 1010 preferably has records with a field 1008 for the spatial key, a field 1012 for the location ID, and a field 1014 for the distance and compass direction between the location corresponding to the spatial key and the location corresponding to the location ID.

The compass direction is expressed as the direction from the location corresponding to the spatial key (the caller location) to the location corresponding to the location ID (the service location) as one of the following eight values: E, NE, N, NW, W, SW, S, SE. This is determined in the client table build process by the sign and the ratio (TAN) of the delta latitude over the delta longitude, both expressed in miles. In polar coordinates, due East is 0° or 360°, and in this direction scheme, E is the segment between 337.5° and 22.5°. The other seven directions are defined in the order above by adding 45° in a counter clockwise manner to the previous direction maximum. For example, NE is 22.5° to 67.5°, N is 67.5° to 112.5°, and so forth.

However, in call processing where there are multiple service locations that service a caller, there is other service location dependent data that does not have any spatial attributes, e.g., hours open, days open, product inventories, that is required for selecting the best service location for the caller. This data is most efficiently stored in a third table 1016 called a Service Location table or a Client Location table. There is one record per service location in this table which is indexed by a service location ID 1012 or service location telephone number 1018. In some instances, the client may have fields for both the service location ID 1012 and service location telephone number 1018, and in other instances, only one of the fields, e.g., location ID, may be present. This table 1016 can also contain informational data 1024 in other fields, e.g., service location, name, address, general directions to a service location, a fax number, hours open 1020, days of week open, and so forth, that can be sent to the network and spoken to the caller by a Voice Response Unit. The service location telephone number is optionally sent to the network for connecting the caller to the service location.

The Three Table system 1000 provides the same benefits as the two table system plus it provides access to more information about the service location. With the access to the additional information, the caller may not need to talk to a person at the service location, thus saving time and resources for the client.

The service location ID may be an arbitrary code established by the client to uniquely identify each service location. One possible code is the telephone number of the service location. A service location ID that is not the servicing location telephone number provides the following additional benefits:

1. Supports locational information for locations that do not have a telephone, such as ATMs, Express Mail drop boxes and USPS drop boxes. Telephone communication with these locations is unavailable.

2. Provides an easier mechanism to update when a service location has a telephone number change: updating a single Service Location table record in contrast to updating many Client Table records in a Two Table system.

3. Provides an easier way for deleting or rerouting a service location that is temporarily or permanently unable to provide service.

VIII. Computer-Telephone Integration Network Configuration

Figure 23:
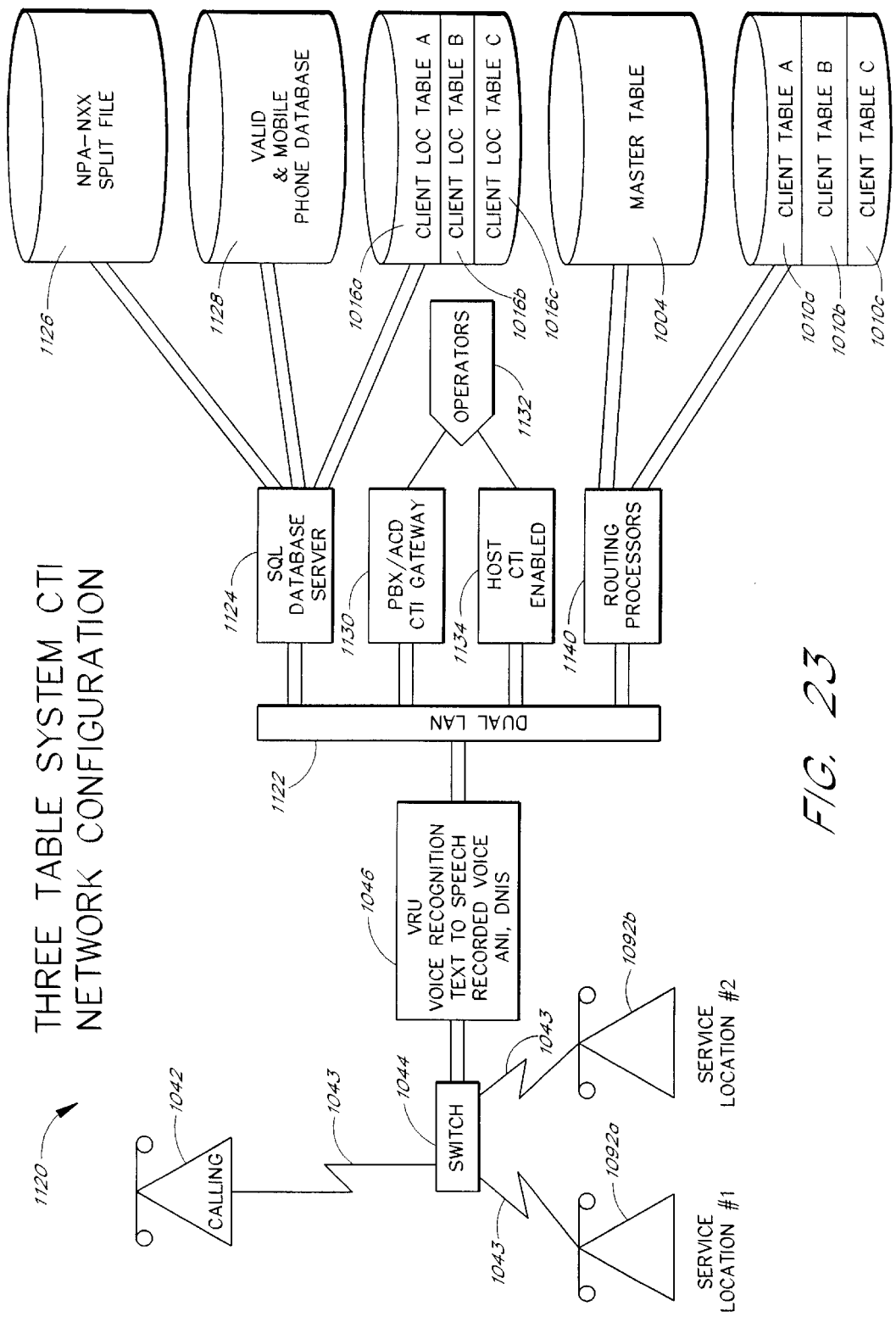
FIG. 23 is a block diagram of a network configuration utilized at a switch for the three table system.

Referring to FIG. 23, a preferred Three Table system network configuration 1120 will be described. The network configuration 1120 utilizes the tables described in conjunction with FIG. 22. A telephone call, placed at a calling telephone 1042, is first processed by a switch (not shown) at the Local Exchange Carrier (LEC), such as Pacific Bell or Southwest Bell, near the caller. The switch at the LEC assigns an Automatic Number Identification (ANI) that is independent of the telephone used. Caller ID technology provides an alternate way of getting the caller's number, but the technology is presently state regulated as to availability, and the technology can be blocked under certain circumstances. According to AT&T, over 98% of all switches currently assign and pass a 10-digit ANI. The call, and the ANI and Dialed Number Identification Service (DNIS) numbers are then passed through a national long-distance network carrier, such as AT&T, MCI, or Sprint, to a terminating switch. The terminating switch can be connected to another switch at the LEC servicing the terminating location or it can be connected directly to the long distance network, as is the case with an AT&T MEGACOM 800 switch or an AT&T MULTIQuest 900 switch. The preferred implementation in this Computer Telephone Integration (CTI) network is a direct connect to the AT&T long distance network 1043 using an AT&T 4 ESS switch 1044.

The terminating switch 1044 passes the call, ANI and DNIS to a Voice Response Unit (VRU) 1046. The VRU 1046, such as an AT&T Conversant System, is the hub in providing CTI. It has the ability to control call processing by accepting the voice signal, ANI and DNIS from the telephone network 1043, speaking recorded voice messages to the caller, translating caller voice commands, e.g. , "1", "2", "3", "Yes" and "No", to computer data codes, translating computer text into synthesized speech and speaking it to the caller. The VRU 1046 also communicates with other telephone and computer network systems via communication protocols, such as ISDN and TCP/IP, over a Local Area Network (LAN) 1122 to obtain additional information required for processing the call and optionally connects the caller to a servicing location telephone, e.g., 1092a, or transfers the caller to the servicing location. The LAN 1122 is dual wired for redundancy.

The VRU 1046 first communicates with a Standard Query Language (SQL) database server 1124 to update, validate and determine the type of the caller-provided telephone number. The type of telephone number refers to whether it is a U.S. POTS telephone number or not, e.g., a non-POTS number may be for a pager or a cellular or personal communication service (PCS) telephone, and a non-U.S. number may be for a Canadian telephone. The caller-provided telephone number is either the result of a normal caller-initiated telephone call (ANI or Caller-ID), or as the result of state 1052 (FIG. 24) where the caller provides an alternate telephone number. The preferred SQL Server provider is Oracle. The preferred server is an AT&T 3600 UNIX box. Other servers or database software types may be used in other embodiments.

The database server 1124 has two databases that provide the information to update, validate and classify the telephone number. The first is a Bellcore NPANXX split file 1126. The "NPANXX" represents the first six digits of a ten digit telephone number, corresponding to area code and exchange. This file 1126 provides a list of NPANXXs that are in the process of being split into new area codes and exchanges. If the caller provided NPANXX is in this list, the caller's NPANXX is changed to the new NPANXX. Thus, the caller-provided telephone number is updated. Next, the caller's NPANXX is compared against Bellcore's V&H coordinate file 1128 which lists all valid NPANXXs and the types of telephone services supported by the NPANXX. Both the NPANXX Split File 1126 and the V&H coordinate file 1128 are extracts from Bellcore's Local Exchange Routing Guide (LERG). The LERG is the master database used by all common carriers for routing calls in the North American Dialing Plan telecommunications network. If the caller provided NPANXX is listed in the V&H file 1128 as a U.S. Plain Old Telephone Service (POTS) number, the caller's time zone and daylight savings time indicator are returned. If on the other hand, the caller's NPANXX's is invalid, the VRU 1046 requests the caller to provide another telephone number. If the NPANXX is valid, but a non-U.S. number, such as a Canadian telephone number, a cellular telephone number, or a special purpose telephone number, such as "NPA_555", a prerecorded message related to the caller's telephone type will be played to the caller and the caller will be asked to enter another telephone number, or the caller will be connected to an exceptions call handling operator 1132.

If the caller's NPANXX is determined to be a valid U.S. POTS number, the VRU 1046 sends an inter-process communication request containing the caller-provided telephone number and DNIS to the routing processor 1140 which is a UNIX-based computer, such as an AT&T 3600, which has access to the Master Table 1004 and the Client Table 1010 corresponding to the DNIS. Of course, other routing processors or operating software types may be used in other embodiments. The routing processor 1140 processes the request and preferably returns a status code, and if successful, a list of service location IDs and distances, sorted in ascending distance order. If the return status code is an unsuccessful type, the VRU 1046 either plays a prerecorded message for the caller or connects the caller to the exceptions handling operator 1132.

If the routing processor request is returned as successful, the VRU 1046 then makes inquiries to the database server 1124 for the Service (client) locations database 1016 associated with the caller's DNIS and retrieves records associated with the service location IDs returned by the routing processor 1140. These retrieved records contain information such as the service location telephone number, days and hours of operation, name, address and micro-area directions, time zone, daylight saving indicator, and so forth. Next the VRU 1046 determines which servicing locations are currently open to handle the caller's request. Depending upon the client application, the VRU 1046 provides to the caller, via recorded voice or synthesized text to speech, service location information and/or connects the caller directly with the closest or selected currently open serving location.

If the call requires operator exception handling, the VRU 1046 connects the caller to the operator 1132, using a video display, through a CTI public branch exchange (PBX)/automatic call distributer (ACD) 1130 and host system 1134. The PBX/ACD 1130, such as a System 75 available from AT&T, provides the caller's voice to the operator 1132. The host system is preferably a 3090 mainframe, available from IBM. The host system 1134 provides database data from the server 1124 on the operator's video display. The host system 1134 is supported by AT&T American Transtech in Jacksonville, Fla. The operator 1132 handles the request and passes the information required to connect the caller to a servicing dealer or terminate the call with a pre-recorded message back to the VRU 1046.

There are two choices in connecting the caller to the servicing dealer. The VRU 1046 can generate a second call from the VRU 1046 to the servicing location and connect the caller to the servicing location through the VRU 1046, or the VRU 1046 can use an AT&T advanced feature called Transfer Connect and transfer the call directly to the servicing dealer. The latter is the preferred implementation because it reduces telecommunications costs and VRU port capacity requirements.

The Servicing location answers the call using a conventional telephone 1092. The servicing location can then handle the caller's request.

A Master table update is performed in a situation where a caller is trying to be connected to a servicing location and has provided a valid telephone number that is not in the Master Table. The call is transferred to the exceptions handling operator 1132 for whom the telephone number and DNIS are passed via ISDN to the host computer system 1134 and are shown on the operator's video display. The operator 1132 asks the caller for the caller's address and key enters it. The operator then presses a function key that calls a program which USPS standardizes the address and assigns a spatial key for the address. The operator 1132 confirms the standardized address with the caller. Having confirmed the standardized and Spatial Key coded address, the operator 1132 then presses another function key that passes the spatial key and the DNIS to a program that retrieves a list of servicing location(s) with corresponding telephone numbers on the video display of the operator. The operator asks the caller which location they prefer and then transfers the call by highlighting the selected service location and pressing another function key. The telephone number provided by the caller along with the associated spatial key are captured, stored on disk, and retrieved later by another process that updates the Master Table.

IX. Three Table System Example

Figure 24:
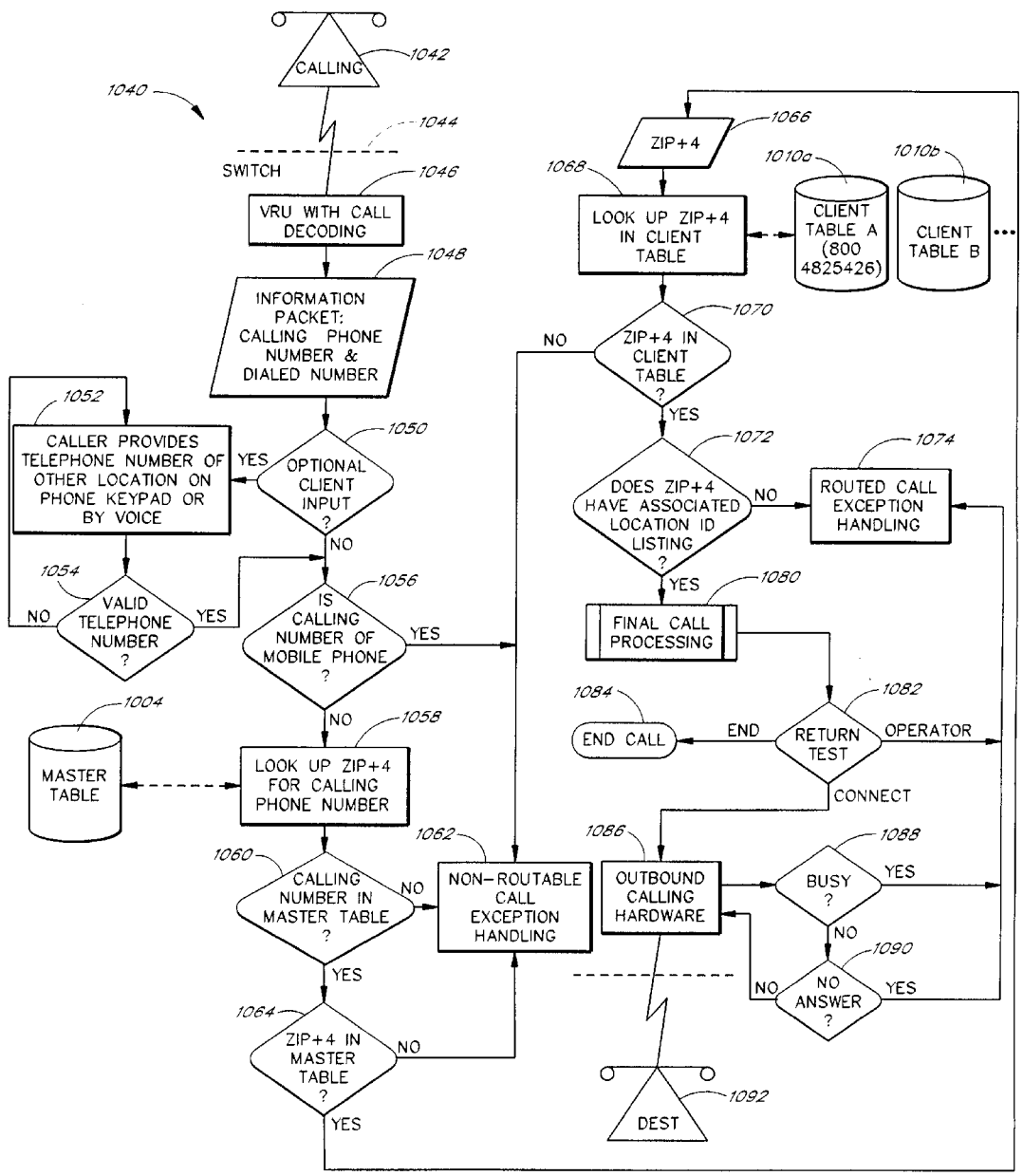
FIG. 24 is a flow diagram of a presently preferred embodiment of the central switch linking process for providing information to a caller and optionally interconnecting a calling telephone and a destination telephone using the tables of FIG. 22 and the network configuration of FIG. 23.

Referring to FIGS. 22 and 24, a central switch linking process 1040 will be described. The process is used to provide information to a caller and optionally interconnect a calling telephone 1042 and a destination telephone 1092 using the Three Table system 1000. The process 1040 utilizes the network configuration 1080 described in FIG. 23. The process 1040 is similar to process 108 shown in FIG. 1c and previously described above. To avoid repetition, only the main differences between process 108 and process 1040 will be described. Note that the objective of process 108 is to route and connect the telephone call from the calling telephone to the destination telephone at the client service location. The objective of process 1040 is to provide information to the caller, and optionally route and connect the calling telephone to the destination telephone.

The process 1040 starts with the caller dialing, for example, an "800" type number using a conventional telephone 1042. The telephone 1042 can either be a touch tone or a rotary telephone. With a touch tone telephone, the caller is able to provide input via the telephone key pad using Dual Tone Multi-Frequency (DTMF) or by voice. With the rotary telephone, input is limited to voice. There are numerous touch tone and rotary telephone manufacturers. They manufacture many differ makes and models, such as cordless phones and cellular telephones. Alternately, the caller may initiate a call by the use of a computer having a DTMF tone generation circuit, such as a personal digital assistant (PDA).

The voice response unit (VRU) 1046 (FIG. 23), having a call decoding capability, is utilized by the system 1000. The VRU 1046 utilizes ANI and DNIS technology to generate an information packet 1048 containing a calling telephone number and a dialed telephone number. The VRU was previously described in conjunction with FIG. 23.

At state 1050, the process determines if the client has provided for optional client input. If so, the process 1040 moves to state 1052, wherein the caller provides a telephone number of another person or business and therefore, a new associated location. The new telephone number can be entered by the caller using a DTMF keypad, e.g., on a touch tone telephone, by a computer or other device that can store touch tone data, or by speaking the information to the VRU. In other embodiments, other data may be entered or provided by the caller to enable other features of the system. In the presently preferred system 1000, the process 1040 next proceeds to a decision state 1054 to determine if the telephone number obtained at state 1052 is valid. To determine validity, the system looks up the NPANXX portion of the telephone number in the NPANXX split file 1126 (FIG. 23) and updates the telephone number, if required. The system then looks up the original or updated (as applicable) NPANXX in the V&H Coordinate file 1128 to determine if it is valid. If the original or updated NPANXX is valid, the system classifies the telephone number by type, i.e., whether or not the number is for a U.S. POTS telephone. If the telephone number is a valid U.S. POTS number, the process continues at state 1056. If not, the process 1040 moves back to state 1052 to request that a new entry be made by the caller.

Function 1080 and states 1072, 1082 and 1084 replace states 142 and 146 of FIG. 1c. If it is determined at state 1070 that the current spatial key, which is a zip+4 code in the presently preferred embodiment, is in the Client Table, process 1040 moves to a decision state 1072. At state 1072, process 1040 determines if the record having the current zip+4 has a field containing a location ID. There can be more than one record having the current zip+4, i.e., there may be multiple client service locations having service areas that cover the zip+4 of the caller or caller-provided location. These records are tested at decision state 1072. If no record having the current zip+4 has a location ID, process 1040 moves to state 1074 for routed call exception handling wherein, preferably, operator assistance 1132 (FIG. 23) is provided to route the call, provide information, or take other action as determined by the client. If at least one record, having the current zip+4, has an associated location ID, as determined at state 1072, process 1040 continues at function 1080 for final call processing. Function 1080 will be further described in conjunction with FIG. 25.

At the completion of the final call processing function 1080, three return paths are possible and are indicated by return designators. The currently active or set return designator is determined by a return test at a decision state 1082. If a first return designator of "operator" is set, process 1040 moves to state 1074 for routed call exception handling. If a second return designator of "end" is set, process 1040 moves to an end state 1084, terminates the present call, and ends process 1040. If a third return designator of "connect" is set, process 1040 moves to state 1086 where an outbound calling module of the VRU 1046 attempts to make a voice connection. The switch 1044, at state 1086, sends the information packet over the telephone network 1043 (FIG. 23) to ring at the telephone 1092 associated with the selected client service location.

X. Final Call Processing

Figure 25:
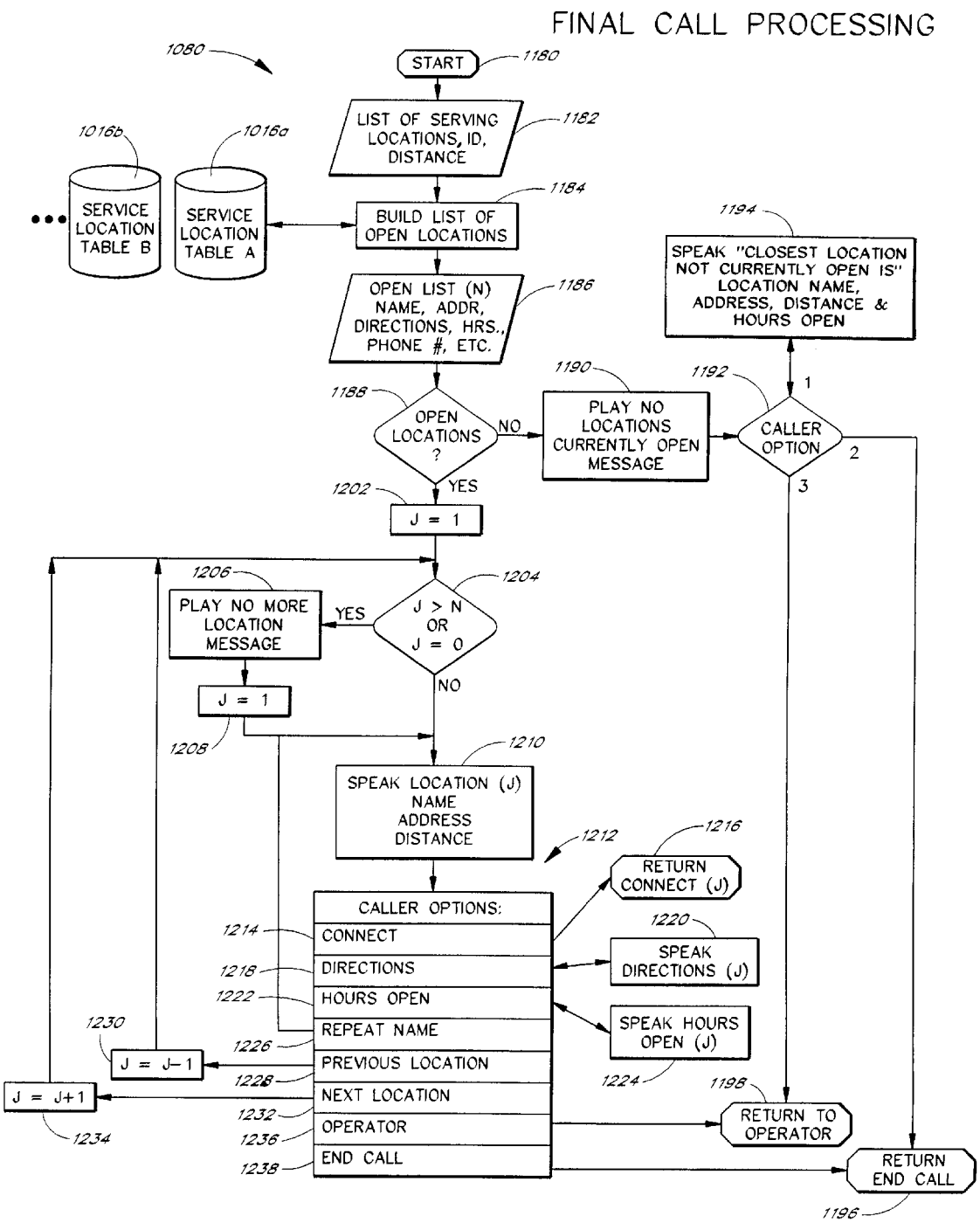
FIG. 25 is a flow diagram of the final call processing function indicated at 1080 in FIG. 24.

Referring to FIG. 25, the final call processing function 1080, identified in FIG. 24, will be described. Beginning at a start state 1180, process 1040 moves to a state 1182 wherein data utilized by the function 1080 is accessed. This data preferably includes a list of service location IDs with an associated distance (from the service location to the location of the caller-provided telephone number) as determined from the records provided at states 1068–1072 (FIG. 24). This list is ordered by distance, with the closest service location first. Proceeding to state 1184 and using the list accessed at state 1182, process 1040 builds a list of open locations by accessing the service location table 1016 identified by the DNIS from the plurality of service location tables in the system 1000. Using the data from state 1184, the records having the identified location IDs and that are open at the time of the telephone call are compiled as an open list of "IN" records at state 1186. Alternately, if the service location is unmanned, such as a mail courier drop-off box, the list is built for locations for which there is a pick-up later than the time of the telephone call. If no service location from the list of state 1182 is currently open, state 1184 preferably generates a list (state 1186) of closest not-open service locations to the location of the caller-provided telephone number. Such a list of closest not-open service locations has a client-specified number (N) of locations, where the list is arranged in order of closest location being first. Thus, if any client locations in the list of state 1182 are open or have a pickup time after the time of the call, the list of state 1186 contains open locations, but if no locations are open or have a pickup time after the time of the call, the list of state 1186 contains not-open locations.

Continuing at a decision state 1188, process 1040 determines if the locations in the list from state 1186 are open at the time of the telephone call. If not, i.e., there are no open locations at the time of the present telephone call, process 1040 moves to state 1190 and recites a message to the caller that "no locations are currently open". Proceeding to a decision state 1192, process 1040 preferably presents three options to the caller. The first option is at state 1194, wherein the caller hears a message spoken by the VRU 1046 (FIG. 23): "The closest location not currently open is" followed by the service location name, address, distance and hours/days open. The message recited at state 1194 informs the caller that although all client service locations are currently closed, the name, address and open hours/days are provided for the client service location that is closest to the location of the caller-provided telephone number. At the completion of state 1194, process 1040 returns to decision state 1192. If the caller selects the first option again at decision state 1192, the next closest location in the list of not-open locations from state 1186 is accessed at state 1194 and is recited to the caller by the VRU.

If the second caller option is chosen at decision state 1192, process 1040 proceeds to state 1196, wherein a return with a "end call" designator is performed. The final call processing function 1080 returns to the process 1040 (FIG. 24) at state 1082, wherein the system subsequently ends the telephone call.

If the third caller option is chosen at decision state 1192, process 1040 proceeds to state 1198, wherein a return with an "operator" designator is performed. The final call processing function 1080 returns to the process 1040 (FIG. 24) at state 1082, wherein the system subsequently accesses the operator.

Returning to decision state 1188, if it is determined that at least one client location is open at the time of the telephone call, process 1040 continues at state 1202, wherein a variable "J" is initialized to a value of one. Moving to a decision state 1204, process 1040 determines whether "J" is greater than the number of open list records "N", or if "J" is equal to zero. If so, process 1040 proceeds to state 1206 wherein the VRU 1046 (FIG. 23) plays a "no more locations" message to the caller. The variable "J" is then set to a value of one at state 1208. If the conditions at decision state 1204 are not true or at the completion of state 1208, process 1040 moves to state 1210 wherein the location "J" from the open list (of state 1186) is recited to the caller by the VRU 1046, including the name and address of the service location, and the distance to the service location from the caller-provided telephone number.

Advancing to a caller options block 1212, the VRU 1046 recites a list of eight preferable options for the caller to choose among for the next action performed. Other embodiments of the invention may include more options, less options, or a different set of options. The first option is "connect" at state 1214. If this option is selected by the caller, the process 1040 moves to return state 1216, wherein a return with a "connect" designator identifying the current ("J") record of the open list of locations is performed. The final call processing function 1080 returns to the process 1040 (FIG. 24) at state 1082, wherein the system subsequently attempts to connect the caller to the client service location.

The second option is "directions" at state 1218. If this option is selected by the caller, the process 1040 moves to state 1220, wherein the VRU 1046 speaks directions to the location identified in the current ("J") record of the open list of locations. The directions provided are pre-stored micro-area directions to the service location. These directions are usually used for service locations that are small in size, such as mail courier drop boxes or automated teller machines (ATMs) located in large physical entities, e.g., shopping centers or multi-story buildings. The micro-area directions are provided by the client and are stored in the service location file. "The drop box is located in the northeast corner of the ABC Shopping Center in front of the XYZ Drug Store" is an example of micro-area directions. At the completion of state 1220, the caller is allowed to select an option from the caller options block 1212.

The third option is "hours open" at state 1222. If this option is selected by the caller, the process 1040 moves to state 1224, wherein the VRU 1046 speaks the open hours for the location identified in the current ("J") record of the open list of locations. At the completion of state 1224, the caller is allowed to select an option from the caller options block 1212.

The fourth option is "repeat name" at state 1226. If this option is selected by the caller, the process 1040 moves back to state 1210, wherein the name, address and distance to the location "J" from the open list (of state 1186) is recited to the caller by the VRU 1046.

The fifth option is "previous location" at state 1228. If this option is selected by the caller, the process 1040 moves to state 1230, wherein "J" is set to the value of "J−1". Process 1040 then moves back to decision state 1204 to determine if an attempt is made to go to a improper service location record, i.e., which is not part of the open list of state 1186.

The sixth option is "next location" at state 1232. If this option is selected by the caller, the process 1040 moves to state 1234, wherein "J" is set to the value of "J+1". Process 1040 then moves back to decision state 1204 to determine if an attempt is made to go to a improper service location record.

The seventh option is "operator" at state 1236. If this option is selected by the caller, the process 1040 moves to return state 1198, wherein a return with the "operator" designator is performed. The final call processing function 1080 returns to the process 1040 (FIG. 24) at state 1082.

The eighth option is "end call" at state 1238. If this option is selected by the caller, the process 1040 moves to return state 1196, wherein a return with the "end call" designator is performed. The final call processing function 1080 returns to the process 1040 (FIG. 24) at state 1082.

XI. Three Table System Table Build Process

The first two tables, the Master Table and the Client Table are created in a manner similar to that for the Two Table System. The major differences from that previously described will now be explained. The third table, the Client or Service Location Table 1016 (FIG. 22) is generated using client supplied data for a set of client defined fields, as previously described. The client may optionally provide the location IDs in the location ID field 1012. If the location IDs are not provided by the client, the location ID information is added to the Client Location Table 1016 during final preparation of the table.

One difference for building the Client Table is that the location IDs are needed for the client service locations file 109, first described in FIG. 1a. Again, the client may optionally provide the location IDs in a modified file 109', or if the location IDs are not provided by the client, the location ID information is appended for each client service location prior to a client table build process 105' (FIG. 1a) for the Three Table system. The result of the process 105' is a Client Table (1010, FIG. 22) having a location ID field in place of the client service location telephone number field (106, FIG. 1a).

Several other differences from the prior client table build process 105 are changes at state 434 of FIG. 10 and state 934 of FIG. 20, wherein the "telephone number of client service location" is replaced by "location ID" for the new process 105'. Further, at states 502, 506, 510 of FIG. 11, "telephone number" is replaced by "location ID" for the new process 105'.

The same Master Table that was used for the Two Table system can also be used in the Three Table system 1000. Therefore, no further changes are necessary.

XII. Summary

The present invention utilizes telephone numbers as an index to a table containing partitions of a country into small geographic areas, such as postal service zip+4 codes. These partitions are further utilized to access one of a plurality of service locations that may be anywhere within the country.

The automated telephone routing system of the present invention provides the ability to reduce costs by routing a very high percentage of calls made to a single national telephone number without any human intervention and the marketing advantage for a client of a single, easy to remember, toll free or nominal fee national telephone number. The system also provides geographically precise results due to the use of all ten digits of the calling and called telephone numbers which correspond with the zip+4 codes for the locations of these numbers. The automated routing system provides the ability for a business to choose among different types of destination service area definitions. Preferably, a client may define each location's service area as an area with a radius of any size or a polygon of any size and shape. A client can intermix radius and polygon definitions as well as have overlapping or non-overlapping service areas.

Flexibility is provided in defining how a particular client location is selected to terminate a call. A client is able to specify that a caller within a preselected radius of any distance (to a tenth of a mile) about a particular location is to be connected; or that the closest client location to the caller is to be connected; or that a caller within a preselected polygon about a particular client location is to be connected, where the polygon edges can be any length. The polygon area can represent either an exclusive territory, or can overlap with other polygons of other client locations if the territory is non-exclusive. Additionally, each client location can have a different area type, with possibly different radii or dimensions, if required. Added flexibility is provided in the non-exclusive polygon type or radius type areas, wherein a random or weighted selection from multiple locations within the area is possible.

The present invention provides a method of routing all published and unpublished telephone numbers, including unlisted numbers, secondary unpublished business lines, and public pay phones without any violation of federal, state and local laws. The present invention also provides a method for legally conforming to contracted franchise territory definitions executed between franchisers and franchisees by routing customer's calls precisely to the correct legal franchisee area. Additionally, the present invention provides a method for precisely routing telephone calls based on any geographic definition including postal geography, census geography, telecommunications geography, special grid coordinate geography, and all custom geography.

The present invention provides a method for automatically routing and processing customer calls that do not meet the pre-set client protocols. This "exceptions handling" process routes the call to a "live" operator who executes preset exceptions handling protocols. The present invention also provides for a method of integrating unrelated geographic information systems and database technology, telecommunications systems and database technology, postal systems and database technology, and computer technology into a common applications driven architecture. Additionally, the present invention provides methods for automatically and independently updating both the Client and Master Tables, and instantly and dynamically linking these two tables during call processing. Furthermore, the present invention provides a method for automating the processing of information that is input by a customer using a customer interface that automatically routes telephone calls to customer requested destinations.

The two table system provides a single updatable Master Table (telephone number to Spatial Key) to support multiple clients, where each Client Table is updated independently from other Client Tables and from the Master Table. This design maximizes transaction processing capacity in terms of calls per second that can be connected to a servicing location when the Client Table contains the service location telephone number as the service location ID.

As another embodiment of the invention, the Three Table system provides the same benefits as the Two Table system plus it provides access to more information about the service location. When the location ID in the Client Table is not the servicing location telephone number, performance is reduced in terms of transactions per second for direct connect applications. However, the caller can automatically receive desired information about the service location or locations having a predetermined relationship to the caller location (or location identified by the caller). Optionally, the caller can be connected to the service location for a voice conversation. Information that can be received by the caller includes the client's service location name, the address, distance and compass direction to the service location, directions to the service location, days open, hours open, and so forth. The directions to the service location can be of varying scope depending on the needs of the client and/or types of locations. For well known places, such as a shopping center or a large multi-story building, micro-area directions provide the way to readily locate the service location within the center or building.

A benefit of the Three Table system is that since it is an enhancement of the Two Table system, it is relatively straightforward to implement. The same Master Table is used as for the Two Table system. The same Client Table building process as for the Two Table system is essentially used, but with a substitution of location ID for the client telephone number to allow more flexibility for the client.

While the above detailed description has shown, described, and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. In a telephone network, an automated call processing system, comprising:

an automated communications subsystem capable of receiving a caller-provided telephone number;

means for determining a spatial key of the caller-provided telephone number;

means responsive to the spatial key for retrieving client service location information corresponding to a selected service location, wherein the service location is selected if a location associated with the caller-provided telephone number spatially lies within a service area defined by the client as a geographic configuration of substantially any desired shape and size around the service location;

means for communicating the selected service location and the retrieved client service location information to the caller;

means for receiving and responding to a caller's service location information request; and an outbound calling module responsive to the caller's service location information request for transmitting the retrieved client service location information to the telephone network.

2. The system defined in claim 1, wherein the caller communicates with the selected service location by a routed telephone call.

3. The system defined in claim 1, wherein the telephone network comprises a computer-telephone integrated network.

4. The system defined in claim 1, wherein the selected service location is one of a list of service locations, and wherein the system further comprises:

means responsive to the retrieved client service location information for eliminating service locations from the list of service locations to generate a final list of service locations; and means for communicating the final list of service locations and the retrieved client service location information to the caller.

5. The system defined in claim 1, wherein the automated communications subsystem additionally updates the caller-provided telephone number.

6. The system defined in claim 1, wherein the automated communications subsystem additionally validates the caller-provided telephone number.

7. The system defined in claim 1, wherein the automated communications subsystem additionally classifies the caller-provided telephone number.

8. The system defined in claim 1, wherein the automated communications subsystem comprises a voice response unit (VRU).

9. The system defined in claim 8, wherein the VRU utilizes automatic number identification (ANI).

10. The system defined in claim 8, wherein the VRU utilizes a dialed number identification service (DNIS).

11. The system defined in claim 8, wherein the VRU utilizes voice recognition.

12. The system defined in claim 1, wherein the caller utilizes a DTMF-capable device to supply the caller-provided telephone number.

13. The system defined in claim 1, wherein the means for communicating the selected service location and the retrieved client service location information to the caller utilizes a pre-recorded voice message.

14. The system defined in claim 1, wherein the means for communicating the selected service location and the retrieved client service location information to the caller utilizes a computer-synthesized text to speech capability.

15. The system defined in claim 1, wherein the retrieved client service location information comprises hours that the selected service location is open.

16. The system defined in claim 1, wherein the retrieved client service location information comprises days that the selected service location is open.

17. The system defined in claim 1, wherein the retrieved client service location information comprises first and last pickup times at the selected service location.

18. The system defined in claim 1, wherein telephonic communication with the selected service location is unavailable.

19. In a telephone network, a method of automatically processing a telephone call, comprising the steps of:
   automatically generating a plurality of client tables each client table comprising a plurality of records, each record comprising a spatial key and client information indicative of a geographic location;
   providing a location table for each client table, at least one of said location tables comprising a plurality of records, each record comprising a location identification (ID) and location-specific information;
   storing the client tables, location tables, and a master table comprising a plurality of records, each record comprising a telephone number and a spatial key, in the telephone network;
   receiving a calling telephone number and a dialed telephone number from the network;
   indexing the master table with the received calling telephone number to obtain a master table record;
   retrieving a spatial key from the master table record;
   selecting one of the client tables based on the dialed telephone number;
   indexing the selected client table with the retrieved spatial key to obtain a selected client table record;
   retrieving a location ID from the selected client table record;
   selecting one of the location tables based on the dialed telephone number;
   indexing the selected location table with the retrieved location ID to obtain a selected location table record; and
   retrieving client location information from the selected location table record.

20. The method defined in claim 19, additionally comprising the step of transmitting the retrieved client location information to the network.

21. The method defined in claim 19, wherein the step of generating a plurality of client tables comprises, for each client table, the step of providing a client service locations file containing a plurality of service location addresses, each service location having a client-defined geographic service area of substantially any desired shape and size.

22. The method defined in claim 21, wherein one of the service areas is defined by a radius.

23. The method defined in claim 21, wherein one of the service areas is defined by a polygon.

24. The method defined in claim 19, wherein the dialed telephone number is an "800" number.

25. The method defined in claim 19, wherein each spatial key uniquely identifies an area in a coordinate system.

26. The method defined in claim 25, wherein the coordinate system comprises longitude and latitude coordinates.

27. The method defined in claim 26, wherein one of the spatial keys comprises a zip+4 code.

28. The method defined in claim 25, wherein the coordinate system comprises Ordinance Survey coordinates.

29. The method defined in claim 19, wherein telephonic communication with the client location associated with the selected location table record is unavailable.

30. The method defined in claim 19, additionally comprising the step of updating a single location table record when a client location has a telephone number change.

31. An automated call processing system in a telephone network, comprising:
   a switch connected to the telephone network;
   a voice response unit (VRU) connected to the switch;
   a routing computer with a memory connected to the VRU;
   a master file comprising a plurality of records, each record having a telephone number and a spatial key, the master file accessible by the routing computer;
   a plurality of client files, each client file comprising a plurality of records, each record having a spatial key and a client service location identification (ID), the client file accessible by the routing computer, and wherein records are assigned to the client file based upon the service location ID, with respect to a geographic area of substantially any desired shape and size;
   a plurality of service location files, each service location file comprising a plurality of records, each record having a service location ID and service location-specific information;
   means, associated with the VRU, for receiving a caller telephone number and a dialed telephone number from the telephone network;
   means, associated with the VRU, for selecting one of the client files and one of the service location files, based on the dialed telephone number; and
   means, associated with the VRU, for linking the master file, the selected client file and the selected service location file to produce selected client information wherein the master file is indexed by the received caller telephone number to provide a selected spatial key, wherein the selected client file is indexed by the selected spatial key to provide a selected service location ID, and wherein the selected service location file is indexed by the selected service location ID to provide location-specific client information.

32. The system defined in claim 31, additionally comprising means, associated with the VRU, to accept input from the caller and provide caller-selected information regarding a selected service location to the caller.

33. The system defined in claim 31, additionally comprising an outbound calling module associated with the VRU for transmitting the selected client information to the telephone network.

34. The system defined in claim 31, wherein the selected client information comprises a telephone number associated with a client service location identified by the selected service location ID.

35. The system defined in claim 34, wherein after a client service location has a telephone number change, a telephone number associated with a single service location file record is updated.

36. The system defined in claim 31, wherein the telephone network is a North American Standard public telephone network.

37. The system defined in claim 31, wherein the switch comprises a digital trunk switching system.

38. The system defined in claim 31, wherein the selected spatial key comprises a postal code.

39. The system defined in claim 38, wherein the postal code comprises a zip+4 code.

40. The system defined in claim 31, wherein the receiving means includes means for Automatic Number Identification (ANI).

41. The system defined in claim 31, wherein the service location file is provided by the client.

42. The system defined in claim 31, wherein the service location-specific information comprises at least one of the following: hours the service location is open, days the service location is open, location name, contact name, address of the service location, and telephone number of the service location.

43. The system defined in claim 31, wherein telephonic communication with a service location indexed by the service location ID in the service location file is unavailable.

44. The system defined in claim 31, wherein each client file record includes a distance designation, wherein said designated distance is from a centroid of the spatial key associated with the caller telephone number to a client service location stored in the record.

45. The system defined in claim 44, wherein the location-specific client information includes the distance designation.

46. The system defined in claim 31, wherein each client file record includes a compass direction, wherein said direction is from a centroid of the spatial key associated with the caller telephone number to a client service location stored in the record.

47. The system defined in claim 46, wherein the location-specific client information includes the compass direction.

48. The system defined in claim 31, wherein the routing computer is connected to the VRU by a computer network.

49. The system defined in claim 48, wherein the master file and the service location files are accessible to the routing computer through the computer network.

50. In a telephone network, an automated call processing method, comprising the steps of:

receiving a caller-provided telephone number;
determining a spatial key of the caller-provided telephone number;
retrieving client service location information corresponding to a selected service location in response to the spatial key, wherein the service location is selected if a location associated with the caller-provided telephone number spatially lies within a service area defined by the client as a geographic configuration of substantially any desired shape and size around the service location;
communicating the retrieved client service location information to the caller;
receiving and responding to a caller's service location information request; and
transmitting the retrieved client service location information to the telephone network.

51. The method defined in claim 50, additionally comprising the step of connecting the caller to the selected service location by utilizing the retrieved client service location information.

52. The method defined in claim 50, wherein the telephone network comprises a computer-telephone integrated network.

53. The method defined in claim 50, wherein the selected service location is one of a list of service locations, and wherein the method further comprises the steps of:

eliminating service locations from the list of service locations to generate a final list of service locations; and
communicating client service location information corresponding to the final list of service locations to the caller.

54. The method defined in claim 50, additionally comprising the step of updating the caller-provided telephone number.

55. The method defined in claim 50, additionally comprising the step of validating the caller-provided telephone number.

56. The method defined in claim 50, additionally comprising the step of classifying the caller-provided telephone number.

57. The method defined in claim 50, wherein the caller-provided telephone number is received from a DTMF-capable device.

58. The method defined in claim 50, wherein the step of communicating the retrieved client service location information to the caller utilizes computer-synthesized text to speech capability.

59. The method defined in claim 50, wherein the client service location information comprises first and last pickup times at the service location.

60. The method defined in claim 50, wherein the client service location information comprises a telephone number corresponding to the service location.

61. The method defined in claim 50, wherein telephonic communication with the service location is unavailable.

62. In an automated call processing system, including a master file, a plurality of client files and a plurality of service location files, for a telephone network, a method of call processing, the method comprising the steps of:

receiving a caller telephone number and a dialed telephone number from the telephone network;
selecting one of the client files and one of the service location files based on the dialed telephone number; and
linking the master file, the selected client file and the selected service location file to produce selected client information wherein the master file is indexed by the received caller telephone number to provide a selected spatial key, wherein the selected client file is indexed by the selected spatial key to provide a selected service location identification (ID), and wherein the selected service location file is indexed by the selected service location ID to provide location-specific client information.

63. The method defined in claim 62, additionally comprising the step of transmitting the selected client information to the telephone network.

64. The method defined in claim 62, wherein the selected client information comprises a telephone number associated with a client service location identified by the selected service location ID.

65. The method defined in claim 64, additionally comprising the step of updating a telephone number associated with a single service location file record after a client service location has a telephone number change.

66. The method defined in claim 62, wherein the selected spatial key comprises a postal code.

67. The method defined in claim 66, wherein the postal code comprises a zip+4 code.

68. The method defined in claim 62, wherein the service location-specific information comprises at least one of the following: hours the service location is open, days the service location is open, location name, contact name, address of the service location, and telephone number of the service location.

69. The method defined in claim 62, wherein telephonic communication with a service location indexed by the service location ID in the service location file is unavailable.

70. The method defined in claim 62, wherein the selected client file includes a record comprising a distance designation, wherein said designated distance is from a centroid of the spatial key associated with the caller telephone number to a client service location stored in the record.

71. The method defined in claim 70, wherein the location-specific client information includes the distance designation.

72. In a telephone network, a method of automatically processing a telephone call, comprising the steps of:

providing a plurality of client tables, each client table comprising a plurality of records, each record comprising a location identification (ID);

providing a location table for each client table, at least one of said location tables comprising a plurality of records, each record comprising client location information;

storing the client tables, location tables, and a master table comprising a plurality of records, each record comprising a spatial key, in the telephone network;

receiving a calling telephone number and a dialed telephone number from the network;

indexing the master table with the received calling telephone number to obtain a master table record;

retrieving a spatial key from the master table record;

selecting one of the client tables based on the dialed telephone number;

indexing the selected client table with the retrieved spatial key to obtain a selected client table record;

retrieving a location ID from the selected client table record;

selecting one of the location tables based on the dialed telephone number;

indexing the selected location table with the retrieved location ID to obtain a selected location table record; and retrieving client location information from the selected location table record.

73. The method defined in claim 72, additionally comprising the step of transmitting the retrieved client location information to the network.

74. The method defined in claim 72, additionally comprising the step of automatically generating the plurality of client tables.

75. The method defined in claim 74, wherein the step of automatically generating the plurality of client tables comprises, for each client table, the step of providing a client service locations file containing a plurality of service location addresses, each service location having a client-defined geographic service area of substantially any desired shape and size.

76. The method defined in claim 75, wherein one of the service areas is defined by a radius.

77. The method defined in claim 75, wherein one of the service areas is defined by a polygon.

78. The method defined in claim 72, wherein the dialed telephone number is an "800" number.

79. The method defined in claim 72, wherein the dialed telephone number is an "888" number.

80. The method defined in claim 72, wherein each spatial key uniquely identifies an area in a coordinate system.

81. The method defined in claim 80, wherein the coordinate system comprises Ordinance Survey coordinates.

82. The method defined in claim 80, wherein the coordinate system comprises longitude and latitude coordinates.

83. The method defined in claim 82, wherein one of the spatial keys comprises a zip+4 code.

84. The method defined in claim 72, wherein telephonic communication with the client location associated with the selected location table record is unavailable.

85. The method defined in claim 72, additionally comprising the step of updating a single location table record when a client location has a telephone number change.

* * * * *